US012293733B2

(12) United States Patent
Wang et al.

(10) Patent No.: US 12,293,733 B2
(45) Date of Patent: May 6, 2025

(54) DRIVE METHOD FOR DISPLAY PANEL DISPLAYING DISPLAY FRAMES AT DIFFERENT REFRESH RATES

(71) Applicants: HEFEI BOE DISPLAY TECHNOLOGY CO., LTD., Anhui (CN); BOE Technology Group Co., Ltd., Beijing (CN)

(72) Inventors: Huiming Wang, Beijing (CN); Liugang Zhou, Beijing (CN); Chunyang Nie, Beijing (CN); Wenlong Feng, Beijing (CN); Yue Yang, Beijing (CN); Jianwei Sun, Beijing (CN); Heng Zhang, Beijing (CN)

(73) Assignees: HEFEI BOE DISPLAY TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/028,328

(22) PCT Filed: May 25, 2022

(86) PCT No.: PCT/CN2022/095034

§ 371 (c)(1),
(2) Date: Mar. 24, 2023

(87) PCT Pub. No.: WO2023/225914

PCT Pub. Date: Nov. 30, 2023

(65) Prior Publication Data

US 2024/0321226 A1 Sep. 26, 2024

(51) Int. Cl.
*G09G 3/36* (2006.01)

(52) U.S. Cl.
CPC ......... *G09G 3/3607* (2013.01); *G09G 3/3677* (2013.01); *G09G 3/3688* (2013.01);
(Continued)

(58) Field of Classification Search
CPC ...... G09G 3/36; G09G 3/3607; G09G 3/3611; G09G 3/3614; G09G 3/3618;
(Continued)

(56) References Cited

U.S. PATENT DOCUMENTS

2014/0368484 A1* 12/2014 Tanaka ................ G09G 3/3696 345/94
2016/0027393 A1* 1/2016 Yoshiga .............. G09G 3/3648 345/94

(Continued)

FOREIGN PATENT DOCUMENTS

CN 105869601 A 8/2016
CN 106297643 A 1/2017

(Continued)

*Primary Examiner* — Ke Xiao
*Assistant Examiner* — Nelson Lam
(74) *Attorney, Agent, or Firm* — ArentFox Schiff LLP; Michael Fainberg

(57) ABSTRACT

A drive method for a display panel (100) includes: obtaining display data corresponding to a current display frame, and a current refresh rate (S10); determining a target rate level corresponding to the current refresh rate according to the current refresh rate and prestored rate levels corresponding one-to-one to different refresh rate intervals (S20); and controlling sub-pixels in the display panel (100) to be charged with a data voltage according to the target rate level and the display data (S30).

20 Claims, 40 Drawing Sheets

(52) U.S. Cl.
CPC . *G09G 2310/08* (2013.01); *G09G 2320/0233* (2013.01); *G09G 2320/0247* (2013.01); *G09G 2330/021* (2013.01)

(58) Field of Classification Search
CPC .... G09G 3/3622; G09G 3/3625; G09G 3/364; G09G 3/3644; G09G 3/3648; G09G 3/3655; G09G 3/3659; G09G 3/3666; G09G 3/3674; G09G 3/3681; G09G 3/3685; G09G 3/3688; G09G 3/3692; G09G 3/3696; G09G 2320/0233
USPC .................................................... 345/87–104
See application file for complete search history.

(56) References Cited

U.S. PATENT DOCUMENTS

| | | | | |
|---|---|---|---|---|
| 2016/0125785 | A1* | 5/2016 | Wang | G09G 3/3648 345/582 |
| 2018/0061311 | A1* | 3/2018 | Lin | G09G 3/32 |
| 2018/0122290 | A1 | 5/2018 | Jung | |
| 2018/0190212 | A1 | 7/2018 | Liu et al. | |
| 2021/0193023 | A1 | 6/2021 | Zhao et al. | |
| 2022/0309977 | A1* | 9/2022 | Lu | G09G 3/20 |
| 2022/0327984 | A1* | 10/2022 | Zhao | G09G 5/005 |
| 2023/0089652 | A1* | 3/2023 | Li | G09G 3/3655 345/212 |
| 2023/0178050 | A1* | 6/2023 | Lee | G06F 3/041 345/213 |
| 2023/0215347 | A1* | 7/2023 | Lei | G09G 3/20 345/204 |

FOREIGN PATENT DOCUMENTS

| | | | |
|---|---|---|---|
| CN | 107978291 | A | 5/2018 |
| CN | 110992868 | A | 4/2020 |
| CN | 111540331 | A | 8/2020 |
| CN | 112767867 | A | 5/2021 |
| CN | 113393818 | A | 9/2021 |
| CN | 113823233 | A | 12/2021 |
| CN | 113990269 | A | 1/2022 |
| CN | 114283750 | A | 4/2022 |
| CN | 114387929 | A | 4/2022 |

* cited by examiner

LUT1

| | 0 | 16 | 32 | 48 | 64 | 80 | 96 | 112 | 128 | 144 | 160 | 176 | 192 | 208 | 224 | 240 | 255 |
|---|---|---|---|---|---|---|---|---|---|---|---|---|---|---|---|---|---|
| 0 | L1-1 | L1-2 | L1-3 | L1-4 | L1-5 | L1-6 | L1-7 | L1-8 | L1-9 | L1-10 | L1-11 | L1-12 | L1-13 | L1-14 | L1-15 | L1-16 | L1-17 |
| 16 | L2-1 | L2-2 | L2-3 | L2-4 | L2-5 | L2-6 | L2-7 | L2-8 | L2-9 | L2-10 | L2-11 | L2-12 | L2-13 | L2-14 | L2-15 | L2-16 | L2-17 |
| 32 | L3-1 | L3-2 | L3-3 | L3-4 | L3-5 | L3-6 | L3-7 | L3-8 | L3-9 | L3-10 | L3-11 | L3-12 | L3-13 | L3-14 | L3-15 | L3-16 | L3-17 |
| 48 | L4-1 | L4-2 | L4-3 | L4-4 | L4-5 | L4-6 | L4-7 | L4-8 | L4-9 | L4-10 | L4-11 | L4-12 | L4-13 | L4-14 | L4-15 | L4-16 | L4-17 |
| 64 | L5-1 | L5-2 | L5-3 | L5-4 | L5-5 | L5-6 | L5-7 | L5-8 | L5-9 | L5-10 | L5-11 | L5-12 | L5-13 | L5-14 | L5-15 | L5-16 | L5-17 |
| 80 | L6-1 | L6-2 | L6-3 | L6-4 | L6-5 | L6-6 | L6-7 | L6-8 | L6-9 | L6-10 | L6-11 | L6-12 | L6-13 | L6-14 | L6-15 | L6-16 | L6-17 |
| 96 | L7-1 | L7-2 | L7-3 | L7-4 | L7-5 | L7-6 | L7-7 | L7-8 | L7-9 | L7-10 | L7-11 | L7-12 | L7-13 | L7-14 | L7-15 | L7-16 | L7-17 |
| 112 | L8-1 | L8-2 | L8-3 | L8-4 | L8-5 | L8-6 | L8-7 | L8-8 | L8-9 | L8-10 | L8-11 | L8-12 | L8-13 | L8-14 | L8-15 | L8-16 | L8-17 |
| 128 | L9-1 | L9-2 | L9-3 | L9-4 | L9-5 | L9-6 | L9-7 | L9-8 | L9-9 | L9-10 | L9-11 | L9-12 | L9-13 | L9-14 | L9-15 | L9-16 | L9-17 |
| 144 | L10-1 | L10-2 | L10-3 | L10-4 | L10-5 | L10-6 | L10-7 | L10-8 | L10-9 | L10-10 | L10-11 | L10-12 | L10-13 | L10-14 | L10-15 | L10-16 | L10-17 |
| 160 | L11-1 | L11-2 | L11-3 | L11-4 | L11-5 | L11-6 | L11-7 | L11-8 | L11-9 | L11-10 | L11-11 | L11-12 | L11-13 | L11-14 | L11-15 | L11-16 | L11-17 |
| 176 | L12-1 | L12-2 | L12-3 | L12-4 | L12-5 | L12-6 | L12-7 | L12-8 | L12-9 | L12-10 | L12-11 | L12-12 | L12-13 | L12-14 | L12-15 | L12-16 | L12-17 |
| 192 | L13-1 | L13-2 | L13-3 | L13-4 | L13-5 | L13-6 | L13-7 | L13-8 | L13-9 | L13-10 | L13-11 | L13-12 | L13-13 | L13-14 | L13-15 | L13-16 | L13-17 |
| 208 | L14-1 | L14-2 | L14-3 | L14-4 | L14-5 | L14-6 | L14-7 | L14-8 | L14-9 | L14-10 | L14-11 | L14-12 | L14-13 | L14-14 | L14-15 | L14-16 | L14-17 |
| 224 | L15-1 | L15-2 | L15-3 | L15-4 | L15-5 | L15-6 | L15-7 | L15-8 | L15-9 | L15-10 | L15-11 | L15-12 | L15-13 | L15-14 | L15-15 | L15-16 | L15-17 |
| 240 | L16-1 | L16-2 | L16-3 | L16-4 | L16-5 | L16-6 | L16-7 | L16-8 | L16-9 | L16-10 | L16-11 | L16-12 | L16-13 | L16-14 | L16-15 | L16-16 | L16-17 |
| 255 | L17-1 | L17-2 | L17-3 | L17-4 | L17-5 | L17-6 | L17-7 | L17-8 | L17-9 | L17-10 | L17-11 | L17-12 | L17-13 | L17-14 | L17-15 | L17-16 | L17-17 |

Fig. 33

LUT3

| | 0 | 16 | 32 | 48 | 64 | 80 | 96 | 112 | 128 | 144 | 160 | 176 | 192 | 208 | 224 | 240 | 255 |
|---|---|---|---|---|---|---|---|---|---|---|---|---|---|---|---|---|---|
| 0 | Z1-1 | Z1-2 | Z1-3 | Z1-4 | Z1-5 | Z1-6 | Z1-7 | Z1-8 | Z1-9 | Z1-10 | Z1-11 | Z1-12 | Z1-13 | Z1-14 | Z1-15 | Z1-16 | Z1-17 |
| 16 | Z2-1 | Z2-2 | Z2-3 | Z2-4 | Z2-5 | Z2-6 | Z2-7 | Z2-8 | Z2-9 | Z2-10 | Z2-11 | Z2-12 | Z2-13 | Z2-14 | Z2-15 | Z2-16 | Z2-17 |
| 32 | Z3-1 | Z3-2 | Z3-3 | Z3-4 | Z3-5 | Z3-6 | Z3-7 | Z3-8 | Z3-9 | Z3-10 | Z3-11 | Z3-12 | Z3-13 | Z3-14 | Z3-15 | Z3-16 | Z3-17 |
| 48 | Z4-1 | Z4-2 | Z4-3 | Z4-4 | Z4-5 | Z4-6 | Z4-7 | Z4-8 | Z4-9 | Z4-10 | Z4-11 | Z4-12 | Z4-13 | Z4-14 | Z4-15 | Z4-16 | Z4-17 |
| 64 | Z5-1 | Z5-2 | Z5-3 | Z5-4 | Z5-5 | Z5-6 | Z5-7 | Z5-8 | Z5-9 | Z5-10 | Z5-11 | Z5-12 | Z5-13 | Z5-14 | Z5-15 | Z5-16 | Z5-17 |
| 80 | Z6-1 | Z6-2 | Z6-3 | Z6-4 | Z6-5 | Z6-6 | Z6-7 | Z6-8 | Z6-9 | Z6-10 | Z6-11 | Z6-12 | Z6-13 | Z6-14 | Z6-15 | Z6-16 | Z6-17 |
| 96 | Z7-1 | Z7-2 | Z7-3 | Z7-4 | Z7-5 | Z7-6 | Z7-7 | Z7-8 | Z7-9 | Z7-10 | Z7-11 | Z7-12 | Z7-13 | Z7-14 | Z7-15 | Z7-16 | Z7-17 |
| 112 | Z8-1 | Z8-2 | Z8-3 | Z8-4 | Z8-5 | Z8-6 | Z8-7 | Z8-8 | Z8-9 | Z8-10 | Z8-11 | Z8-12 | Z8-13 | Z8-14 | Z8-15 | Z8-16 | Z8-17 |
| 128 | Z9-1 | Z9-2 | Z9-3 | Z9-4 | Z9-5 | Z9-6 | Z9-7 | Z9-8 | Z9-9 | Z9-10 | Z9-11 | Z9-12 | Z9-13 | Z9-14 | Z9-15 | Z9-16 | Z9-17 |
| 144 | Z10-1 | Z10-2 | Z10-3 | Z10-4 | Z10-5 | Z10-6 | Z10-7 | Z10-8 | Z10-9 | Z10-10 | Z10-11 | Z10-12 | Z10-13 | Z10-14 | Z10-15 | Z10-16 | Z10-17 |
| 160 | Z11-1 | Z11-2 | Z11-3 | Z11-4 | Z11-5 | Z11-6 | Z11-7 | Z11-8 | Z11-9 | Z11-10 | Z11-11 | Z11-12 | Z11-13 | Z11-14 | Z11-15 | Z11-16 | Z11-17 |
| 176 | Z12-1 | Z12-2 | Z12-3 | Z12-4 | Z12-5 | Z12-6 | Z12-7 | Z12-8 | Z12-9 | Z12-10 | Z12-11 | Z12-12 | Z12-13 | Z12-14 | Z12-15 | Z12-16 | Z12-17 |
| 192 | Z13-1 | Z13-2 | Z13-3 | Z13-4 | Z13-5 | Z13-6 | Z13-7 | Z13-8 | Z13-9 | Z13-10 | Z13-11 | Z13-12 | Z13-13 | Z13-14 | Z13-15 | Z13-16 | Z13-17 |
| 208 | Z14-1 | Z14-2 | Z14-3 | Z14-4 | Z14-5 | Z14-6 | Z14-7 | Z14-8 | Z14-9 | Z14-10 | Z14-11 | Z14-12 | Z14-13 | Z14-14 | Z14-15 | Z14-16 | Z14-17 |
| 224 | Z15-1 | Z15-2 | Z15-3 | Z15-4 | Z15-5 | Z15-6 | Z15-7 | Z15-8 | Z15-9 | Z15-10 | Z15-11 | Z15-12 | Z15-13 | Z15-14 | Z15-15 | Z15-16 | Z15-17 |
| 240 | Z16-1 | Z16-2 | Z16-3 | Z16-4 | Z16-5 | Z16-6 | Z16-7 | Z16-8 | Z16-9 | Z16-10 | Z16-11 | Z16-12 | Z16-13 | Z16-14 | Z16-15 | Z16-16 | Z16-17 |
| 255 | Z17-1 | Z17-2 | Z17-3 | Z17-4 | Z17-5 | Z17-6 | Z17-7 | Z17-8 | Z17-9 | Z17-10 | Z17-11 | Z17-12 | Z17-13 | Z17-14 | Z17-15 | Z17-16 | Z17-17 |

Fig. 34

LUT7

| | 0 | 16 | 32 | 48 | 64 | 80 | 96 | 112 | 128 | 144 | 160 | 176 | 192 | 208 | 224 | 240 | 255 |
|---|---|---|---|---|---|---|---|---|---|---|---|---|---|---|---|---|---|
| 0 | H1-1 | H1-2 | H1-3 | H1-4 | H1-5 | H1-6 | H1-7 | H1-8 | H1-9 | H1-10 | H1-11 | H1-12 | H1-13 | H1-14 | H1-15 | H1-16 | H1-17 |
| 16 | H2-1 | H2-2 | H2-3 | H2-4 | H2-5 | H2-6 | H2-7 | H2-8 | H2-9 | H2-10 | H2-11 | H2-12 | H2-13 | H2-14 | H2-15 | H2-16 | H2-17 |
| 32 | H3-1 | H3-2 | H3-3 | H3-4 | H3-5 | H3-6 | H3-7 | H3-8 | H3-9 | H3-10 | H3-11 | H3-12 | H3-13 | H3-14 | H3-15 | H3-16 | H3-17 |
| 48 | H4-1 | H4-2 | H4-3 | H4-4 | H4-5 | H4-6 | H4-7 | H4-8 | H4-9 | H4-10 | H4-11 | H4-12 | H4-13 | H4-14 | H4-15 | H4-16 | H4-17 |
| 64 | H5-1 | H5-2 | H5-3 | H5-4 | H5-5 | H5-6 | H5-7 | H5-8 | H5-9 | H5-10 | H5-11 | H5-12 | H5-13 | H5-14 | H5-15 | H5-16 | H5-17 |
| 80 | H6-1 | H6-2 | H6-3 | H6-4 | H6-5 | H6-6 | H6-7 | H6-8 | H6-9 | H6-10 | H6-11 | H6-12 | H6-13 | H6-14 | H6-15 | H6-16 | H6-17 |
| 96 | H7-1 | H7-2 | H7-3 | H7-4 | H7-5 | H7-6 | H7-7 | H7-8 | H7-9 | H7-10 | H7-11 | H7-12 | H7-13 | H7-14 | H7-15 | H7-16 | H7-17 |
| 112 | H8-1 | H8-2 | H8-3 | H8-4 | H8-5 | H8-6 | H8-7 | H8-8 | H8-9 | H8-10 | H8-11 | H8-12 | H8-13 | H8-14 | H8-15 | H8-16 | H8-17 |
| 128 | H9-1 | H9-2 | H9-3 | H9-4 | H9-5 | H9-6 | H9-7 | H9-8 | H9-9 | H9-10 | H9-11 | H9-12 | H9-13 | H9-14 | H9-15 | H9-16 | H9-17 |
| 144 | H10-1 | H10-2 | H10-3 | H10-4 | H10-5 | H10-6 | H10-7 | H10-8 | H10-9 | H10-10 | H10-11 | H10-12 | H10-13 | H10-14 | H10-15 | H10-16 | H10-17 |
| 160 | H11-1 | H11-2 | H11-3 | H11-4 | H11-5 | H11-6 | H11-7 | H11-8 | H11-9 | H11-10 | H11-11 | H11-12 | H11-13 | H11-14 | H11-15 | H11-16 | H11-17 |
| 176 | H12-1 | H12-2 | H12-3 | H12-4 | H12-5 | H12-6 | H12-7 | H12-8 | H12-9 | H12-10 | H12-11 | H12-12 | H12-13 | H12-14 | H12-15 | H12-16 | H12-17 |
| 192 | H13-1 | H13-2 | H13-3 | H13-4 | H13-5 | H13-6 | H13-7 | H13-8 | H13-9 | H13-10 | H13-11 | H13-12 | H13-13 | H13-14 | H13-15 | H13-16 | H13-17 |
| 208 | H14-1 | H14-2 | H14-3 | H14-4 | H14-5 | H14-6 | H14-7 | H14-8 | H14-9 | H14-10 | H14-11 | H14-12 | H14-13 | H14-14 | H14-15 | H14-16 | H14-17 |
| 224 | H15-1 | H15-2 | H15-3 | H15-4 | H15-5 | H15-6 | H15-7 | H15-8 | H15-9 | H15-10 | H15-11 | H15-12 | H15-13 | H15-14 | H15-15 | H15-16 | H15-17 |
| 240 | H16-1 | H16-2 | H16-3 | H16-4 | H16-5 | H16-6 | H16-7 | H16-8 | H16-9 | H16-10 | H16-11 | H16-12 | H16-13 | H16-14 | H16-15 | H16-16 | H16-17 |
| 255 | H17-1 | H17-2 | H17-3 | H17-4 | H17-5 | H17-6 | H17-7 | H17-8 | H17-9 | H17-10 | H17-11 | H17-12 | H17-13 | H17-14 | H17-15 | H17-16 | H17-17 |

Fig. 35

DRIVE METHOD FOR DISPLAY PANEL DISPLAYING DISPLAY FRAMES AT DIFFERENT REFRESH RATES

CROSS-REFERENCE TO RELATED APPLICATIONS

This application is a National Stage of International Application No. PCT/CN2022/095034, filed May 25, 2022, the entire content of which is hereby incorporated by reference.

FIELD

The present disclosure relates to the technical field of display, in particular to a drive method for a display panel, and a display device.

BACKGROUND

Typically, a display such as a liquid crystal display (LCD) or an organic light-emitting diode (OLED) display includes an abundance of pixel units. Each pixel unit can be composed of a red sub-pixel, a green sub-pixel and a blue sub-pixel. With the luminance of each sub-pixel controllable, a color image can be displayed through color mixtures to be displayed.

SUMMARY

A drive method for a display panel provided in embodiments of the present disclosure includes:

obtaining display data corresponding to a current display frame, and a current refresh rate;

determining a target rate level corresponding to the current refresh rate according to the current refresh rate and prestored rate levels corresponding one-to-one to different refresh rate intervals; and controlling sub-pixels in the display panel to be charged with a data voltage according to the target rate level and the display data.

In some examples, the controlling sub-pixels in the display panel to be charged with a data voltage according to the target rate level and the display data includes:

determining, according to the target rate level, a target voltage of a target level that generates a gate scanning signal, where target voltages, generating the gate scanning signal, corresponding to different rate levels are different; and controlling the display panel to load the gate scanning signal onto a gate according to the target voltage, and loading the data voltage onto a data line according to the display data, so as to charge the sub-pixels in the display panel with the data voltage.

In some examples, the target level includes an active level. The determining, according to the target rate level, a target voltage that generates a gate scanning signal includes:

adjusting, according to the target rate level, a first reference voltage of the active level that generates the gate scanning signal, to obtain the target voltage of the active level, where the target voltages of the active levels corresponding to different rate levels are different.

The controlling the display panel to load the gate scanning signal onto a gate according to the target voltage includes:

controlling the display panel to load the gate scanning signal onto the gate according to the obtained target voltage of the active level.

In some examples, the first reference voltage is a first reference voltage corresponding to a set rate level. The active level is a high level.

The adjusting, according to the target rate level, a first reference voltage of the active level that generates the gate scanning signal, to obtain the target voltage of the active level includes:

when the set rate level is a minimum rate level and the target rate level is greater than the minimum rate level, reducing the first reference voltage by a first active adjustment voltage, to obtain the target voltage of the active level, where as the rate level increases, the corresponding first active adjustment voltage increases;

when the set rate level is a maximum rate level and the target rate level is less than the maximum rate level, increasing the first reference voltage by a second active adjustment voltage, to obtain the target voltage of the active level, where as the rate level increases, the corresponding second active adjustment voltage decreases;

when the set rate level is greater than the minimum rate level and less than the maximum rate level and the target rate level is less than the set rate level, increasing the first reference voltage by a third active adjustment voltage, to obtain the target voltage of the active level, where as the rate level increases, the corresponding third active adjustment voltage decreases; and when the set rate level is greater than the minimum rate level and less than the maximum rate level and the target rate level is greater than the set rate level, reducing the first reference voltage by a fourth active adjustment voltage, to obtain the target voltage of the active level, where as the rate level increases, the corresponding fourth active adjustment voltage increases.

In some examples, the first reference voltage is a first reference voltage corresponding to a set rate level. The active level is a low level.

The adjusting, according to the target rate level, a first reference voltage of the active level that generates the gate scanning signal, to obtain the target voltage of the active level includes:

when the set rate level is a minimum rate level and the target rate level is greater than the minimum rate level, increasing the first reference voltage by a fifth active adjustment voltage, to obtain the target voltage of the active level, where as the rate level increases, the corresponding fifth active adjustment voltage increases;

when the set rate level is a maximum rate level and the target rate level is less than the maximum rate level, reducing the first reference voltage by a sixth active adjustment voltage, to obtain the target voltage of the active level, where as the rate level increases, the corresponding sixth active adjustment voltage decreases;

when the set rate level is greater than the minimum rate level and less than the maximum rate level and the target rate level is less than the set rate level, reducing the first reference voltage by a seventh active adjustment voltage, to obtain the target voltage of the active level, where as the rate level increases, the corresponding seventh active adjustment voltage decreases; and when the set rate level is greater than the minimum rate level and less than the maximum rate level and the target rate level is greater than the set rate level, increasing the first reference voltage by an eighth active adjustment voltage, to obtain the target voltage of the active level, where as the rate level increases, the corresponding eighth active adjustment voltage increases.

In some examples, the target level includes an inactive level. The determining, according to the target rate level, a target voltage that generates a gate scanning signal includes:

adjusting, according to the target rate level, a second reference voltage of the inactive level that generates the gate scanning signal, to obtain the target voltage of the inactive level, where the target voltages of the inactive levels corresponding to different rate levels are different.

The controlling the display panel to load the gate scanning signal onto a gate according to the target voltage includes:

controlling the display panel to load the gate scanning signal onto the gate according to the obtained target voltage of the inactive level.

In some examples, the second reference voltage is a second reference voltage corresponding to the set rate level. The inactive level is a low level.

The adjusting, according to the target rate level, a second reference voltage of the inactive level that generates the gate scanning signal, to obtain the target voltage of the inactive level includes:

when the set rate level is a minimum rate level and the target rate level is greater than the minimum rate level, increasing the second reference voltage by a first inactive adjustment voltage, to obtain the target voltage of the inactive level, where as the rate level increases, the corresponding first inactive adjustment voltage increases;

when the set rate level is a maximum rate level and the target rate level is less than the maximum rate level, reducing the second reference voltage by a second inactive adjustment voltage, to obtain the target voltage of the inactive level, where as the rate level increases, the corresponding second inactive adjustment voltage decreases;

when the set rate level is greater than the minimum rate level and less than the maximum rate level and the target rate level is less than the set rate level, reducing the second reference voltage by a third inactive adjustment voltage, to obtain the target voltage of the inactive level, where as the rate level increases, the corresponding third inactive adjustment voltage decreases; and when the set rate level is greater than the minimum rate level and less than the maximum rate level and the target rate level is greater than the set rate level, increasing the second reference voltage by a fourth inactive adjustment voltage, to obtain the target voltage of the inactive level, where as the rate level increases, the corresponding fourth inactive adjustment voltage increases.

In some examples, the second reference voltage is a second reference voltage corresponding to the set rate level. The inactive level is a high level.

The adjusting, according to the target rate level, a second reference voltage of the inactive level that generates the gate scanning signal, to obtain the target voltage of the inactive level includes:

when the set rate level is a minimum rate level and the target rate level is greater than the minimum rate level, reducing the second reference voltage by a fifth inactive adjustment voltage, to obtain the target voltage of the inactive level, where as the rate level increases, the corresponding fifth inactive adjustment voltage increases;

when the set rate level is a maximum rate level and the target rate level is less than the maximum rate level, increasing the second reference voltage by a sixth inactive adjustment voltage, to obtain the target voltage of the inactive level, where as the rate level increases, the corresponding sixth inactive adjustment voltage decreases;

when the set rate level is greater than the minimum rate level and less than the maximum rate level and the target rate level is less than the set rate level, increasing the second reference voltage by a seventh inactive adjustment voltage, to obtain the target voltage of the inactive level, where as the rate level increases, the corresponding seventh inactive adjustment voltage decreases; and when the set rate level is greater than the minimum rate level and less than the maximum rate level and the target rate level is greater than the set rate level, reducing the second reference voltage by an eighth inactive adjustment voltage, to obtain the target voltage of the inactive level, where as the rate level increases, the corresponding eighth inactive adjustment voltage increases.

In some examples, the controlling sub-pixels in the display panel to be charged with a data voltage according to the target rate level and the display data includes:

controlling the display panel to load the gate scanning signal onto the gate and loading the data voltage onto the data line in the display panel according to the target rate level and the display data, such that a time interval between an end moment of a slew edge when the data line starts to load the data voltage and a start moment of a data charging phase corresponding to the sub-pixels charged with the data voltage is a time interval corresponding to the target rate level.

As the refresh rate of the refresh rate interval increases, the corresponding rate level increases, and the corresponding time interval increases.

In some examples, the loading the data voltage onto the data line in the display panel includes:

loading the data voltage onto the data line in the display panel according to a slew rate of the slew edge corresponding to the target rate level, to adjust the time interval, where as the rate level increases, the corresponding slew rate decreases.

In some examples, the loading the data voltage onto the data line in the display panel according to a slew rate of the slew edge corresponding to the target rate level includes:

gating an output impedance corresponding to the target rate level according to the target rate level, to load the data voltage onto the data line after the data voltage passes through the output impedance, where as the rate level increases, the output impedance increases, and the corresponding slew rate decreases.

In some examples, a start moment of the slew edge when the data line starts to load the data voltage is after the start moment of the data charging phase corresponding to the sub-pixels charged with the data voltage, and a conversion time period is provided between the start moment of the slew edge when the data line starts to load the data voltage and the start moment of the data charging phase corresponding to the sub-pixels charged with the data voltage.

The controlling the display panel to load the gate scanning signal onto the gate includes:

controlling the display panel to load the gate scanning signal onto the gate according to the conversion time period corresponding to the target rate level, to adjust the time interval, where as the rate level increases, the corresponding conversion time period increases.

In some examples, the controlling the display panel to load the gate scanning signal onto the gate according to the conversion time period corresponding to the target rate level includes:

adjusting a first reference output time of a set level of a reference clock control signal according to the target rate level, to obtain a first target output time, where as the rate level increases, the corresponding first target output time is earlier; and outputting the set level of the reference clock control signal according to the first target output time, and controlling the display panel to load the gate scanning signal onto the gate.

In some examples, the first reference output time is an output time corresponding to a set rate level.

The adjusting an output time of a set level of a reference clock control signal according to the target rate level, to obtain a first target output time includes:

when the set rate level is a minimum rate level and the target rate level is greater than the minimum rate level, advancing the first reference output time by a first clock adjustment time period, to obtain the first target output time, where as the rate level increases, the corresponding first clock adjustment time period increases;

when the set rate level is a maximum rate level and the target rate level is less than the maximum rate level, delaying the first reference output time by a second clock adjustment time period, to obtain the first target output time, where as the rate level increases, the corresponding second clock adjustment time period decreases;

when the set rate level is greater than the minimum rate level and less than the maximum rate level and the target rate level is less than the set rate level, delaying the first reference output time by a third clock adjustment time period, to obtain the first target output time, where as the rate level increases, the corresponding third clock adjustment time period decreases; and when the set rate level is greater than the minimum rate level and less than the maximum rate level and the target rate level is greater than the set rate level, advancing the first reference output time by a fourth clock adjustment time period, to obtain the first target output time, where as the rate level increases, the corresponding fourth clock adjustment time period increases.

In some examples, the loading the data voltage onto the data line includes:

adjusting a second reference output time of the data voltage according to the target rate level, to obtain a second target output time, where the second target output times corresponding to different rate levels are different, and as the rate level increases, the corresponding second target output time is later; and loading the data voltage onto the data line according to the second target output time, to adjust the time interval.

In some examples, the second reference output time is an output time corresponding to the set rate level.

The adjusting a second reference output time of the data voltage according to the target rate level, to obtain a second target output time includes:

when the set rate level is a minimum rate level and the target rate level is greater than the minimum rate level, delaying the second reference output time by a first data adjustment time period, to obtain the second target output time, where as the rate level increases, the corresponding first data adjustment time period increases;

when the set rate level is a maximum rate level and the target rate level is less than the maximum rate level, advancing the second reference output time by a second data adjustment time period, to obtain the second target output time, where as the rate level increases, the corresponding second data adjustment time period decreases;

when the set rate level is greater than the minimum rate level and less than the maximum rate level and the target rate level is less than the set rate level, advancing the second reference output time by a third data adjustment time period, to obtain the second target output time, where as the rate level increases, the corresponding third data adjustment time period decreases; and when the set rate level is greater than the minimum rate level and less than the maximum rate level and the target rate level is greater than the set rate level, delaying the second reference output time by a fourth data adjustment time period, to obtain the second target output time, where as the rate level increases, the corresponding fourth data adjustment time period increases.

In some examples, the controlling sub-pixels in the display panel to be charged with a data voltage according to the target rate level and the display data includes:

according to the target rate level, determining a target gray scale lookup table corresponding to the target rate level from prestored gray scale lookup tables corresponding one-to-one to a plurality of different rate levels, where each gray scale lookup table includes: a plurality of different first gray scale values, a plurality of different second gray scale values, and target gray scale values corresponding to any one of the first gray scale values and any one of the second gray scale values, and as for target gray scale values corresponding to the same first gray scale value and the same second gray scale value in different gray scale lookup tables, the target gray scale values corresponding to different rate levels are different; and loading the data voltage onto the data line according to the target gray scale lookup table and the display data, so as to charge the sub-pixels in the display panel with the data voltage.

In some examples, the loading the data voltage onto the data line according to the target gray scale lookup table and the display data includes:

determining a target gray scale value corresponding to a current row of sub-pixels from the target gray scale lookup table according to an original gray scale value of display data corresponding to a previous row of sub-pixels and an original gray scale value of display data corresponding to the current row of sub-pixels in the same column in the display data, where the target gray scale value corresponding to the current row of sub-pixels is greater than the original gray scale value corresponding to the current row of sub-pixels; and loading the data voltage onto the data line according to the determined target gray scale value.

In some examples, as for the target gray scale values corresponding to the same first gray scale value and the same second gray scale value in different gray scale lookup tables, as the rate level increases, the corresponding target gray scale value decreases.

A drive device for a display panel provided in embodiments of the present disclosure includes:

- an obtaining circuit configured to obtain display data corresponding to a current display frame, and a current refresh rate;
- a rate level determination circuit configured to determine a target rate level corresponding to the current refresh rate according to the current refresh rate and prestored rate levels corresponding one-to-one to different refresh rate intervals; and
- a control circuit configured to control sub-pixels in the display panel to be charged with a data voltage according to the target rate level and the display data.

In some examples, the control circuit includes:

- a voltage determination circuit configured to determine, according to the target rate level, a target voltage of a target level that generates a gate scanning signal, where target voltages, generating the gate scanning signal, corresponding to different rate levels are different;
- a level shift circuit configured to control the display panel to load the gate scanning signal onto a gate according to the target voltage; and
- a source drive circuit configured to load the data voltage onto a data line according to the display data, so as to charge the sub-pixels in the display panel with the data voltage.

In some examples, the control circuit includes:

- a first drive circuit configured to control the display panel to load the gate scanning signal onto the gate according to the target rate level; and
- a second drive circuit configured to load the data voltage onto the data line in the display panel according to the target rate level and the display data, such that a time interval between an end moment of a slew edge when the data line starts to load the data voltage and a start moment of a data charging phase corresponding to the sub-pixels charged with the data voltage is a time interval corresponding to the target rate level.

As the refresh rate of the refresh rate interval increases, the corresponding rate level increases, and the corresponding time interval decreases.

In some examples, the control circuit includes:

- a lookup table determination circuit configured to determine, according to the target rate level, a target gray scale lookup table corresponding to the target rate level from prestored gray scale lookup tables corresponding one-to-one to a plurality of different rate levels, where each gray scale lookup table includes: a plurality of different first gray scale values, a plurality of different second gray scale values, and target gray scale values corresponding to any one of the first gray scale values and any one of the second gray scale values, and as for target gray scale values corresponding to the same first gray scale value and the same second gray scale value in different gray scale lookup tables, the target gray scale values corresponding to different rate levels are different; and
- a source drive circuit configured to load the data voltage onto the data line according to the target gray scale lookup table and the display data, so as to charge the sub-pixels in the display panel with the data voltage.

BRIEF DESCRIPTION OF THE DRAWINGS

FIG. 33 is a schematic diagram of a gray scale lookup table according to some embodiments of the present disclosure.

FIG. 34 is a schematic diagram of a gray scale lookup table according to some other embodiments of the present disclosure.

FIG. 35 is a schematic diagram of a gray scale lookup table according to some other embodiments of the present disclosure.

DETAILED DESCRIPTION OF THE EMBODIMENTS

Figure 1:
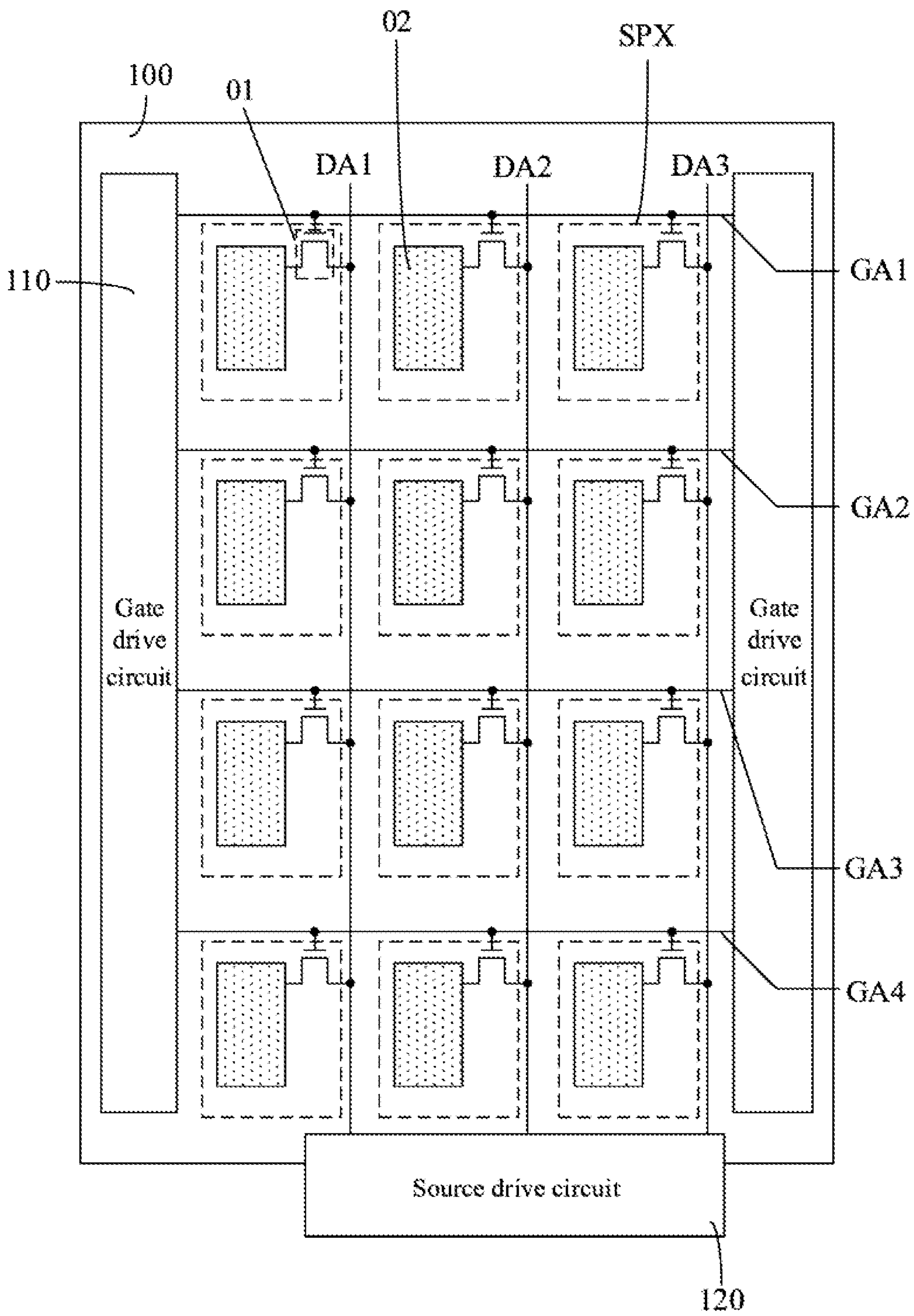
FIG. 1 is a schematic structure diagram of a display panel according to some embodiments of the present disclosure.

In order to make the objectives, technical solutions, and advantages in the embodiments of the present disclosure clearer, the technical solutions in the embodiments of the present disclosure will be clearly and completely described below with reference to the accompanying drawings in the embodiments of the present disclosure. It is obvious that the described embodiments are some embodiments rather than all embodiments of the present disclosure. Moreover, the embodiments of the present disclosure and features in the embodiments can be combined with one another without conflict. Based on the described embodiments of the present disclosure, all other embodiments acquired by those skilled in the art without making creative efforts fall within the scope of protection of the present disclosure.

Unless otherwise defined, technical or scientific terms used in the present disclosure should have ordinary meaning as understood by those of ordinary skill in the art to which the present disclosure belongs. "First", "second" and similar words used in the present disclosure do not indicate any order, quantity or importance, but are only used for distinguishing different components. "Comprise", "include" and similar words are intended to mean that an element or item in front of the word encompasses elements or items that are listed behind the word and their equivalents, but do not exclude other elements or items. "Connection", "connected" and similar words are not limited to a physical or mechanical connection, but can include an electrical connection, which are direct or indirect.

It should be noted that sizes and shapes of all figures in the accompanying drawings do not reflect true scales, and are merely intended to illustrate contents of the present disclosure. Moreover, the same or similar reference numerals denote the same or similar elements or elements having the same or similar functions throughout.

With reference to FIG. 1, a display device may include a display panel 100 and a source drive circuit 120. The display panel 100 may include a plurality of pixel units arranged in an array, a plurality of gate lines GA (for example, GA1, GA2, GA3, and GA4), a plurality of data lines DA (for example, DA1, DA2, and DA3), and a gate drive circuit 110. The gate drive circuit 110 is coupled to the gate lines GA1, GA2, GA3 and GA4 separately, and the source drive circuit 120 is coupled to the data lines DA1, DA2, and DA3 separately. Illustratively, each pixel unit includes a plurality of sub-pixels (SPX). For example, each pixel unit may include a red sub-pixel, a green sub-pixel, and a blue sub-pixel, such that color mixing may be performed by red, green and blue to achieve color display. Alternatively, each pixel unit may include a red sub-pixel, a green sub-pixel, a blue sub-pixel and a white sub-pixel, such that color mixing may be performed by red, green, blue and white to achieve color display. Alternatively, in practical applications, a color of the sub-pixel in the pixel unit may be designed according to a practical application environment, and is not limited herein.

Illustratively, two source drive circuits 120 may be provided, one source drive circuit 120 is connected to half the number of data lines, and the other source drive circuit 120 is connected to the other half of the number of data lines. Alternatively, three, four or more source drive circuits 120 may be provided, which may be designed according to the requirements of practical applications, and are not limited herein.

With reference to FIG. 1, each sub-pixel SPX includes a transistor 01 and a pixel electrode 02. A row of sub-pixels SPX correspond to a gate line, and a column of sub-pixels SPX correspond to a data line. Gates of the transistors 01 are electrically connected to corresponding gate lines, sources of the transistors 01 are electrically connected to corresponding data lines, and drains of the transistors 01 are electrically connected to the pixel electrodes 02. It is to be noted that a pixel array structure of the present disclosure may also be a double-gate structure. That is, two gate lines are arranged between two adjacent rows of sub-pixels, so as to reduce half of the data lines. That is, data lines are included between some two adjacent columns of sub-pixels, and no data lines are included between some other two adjacent columns of sub-pixels. A sub-pixel arrangement structure and arrangement modes of data lines and scanning lines are not limited.

Figure 2A:
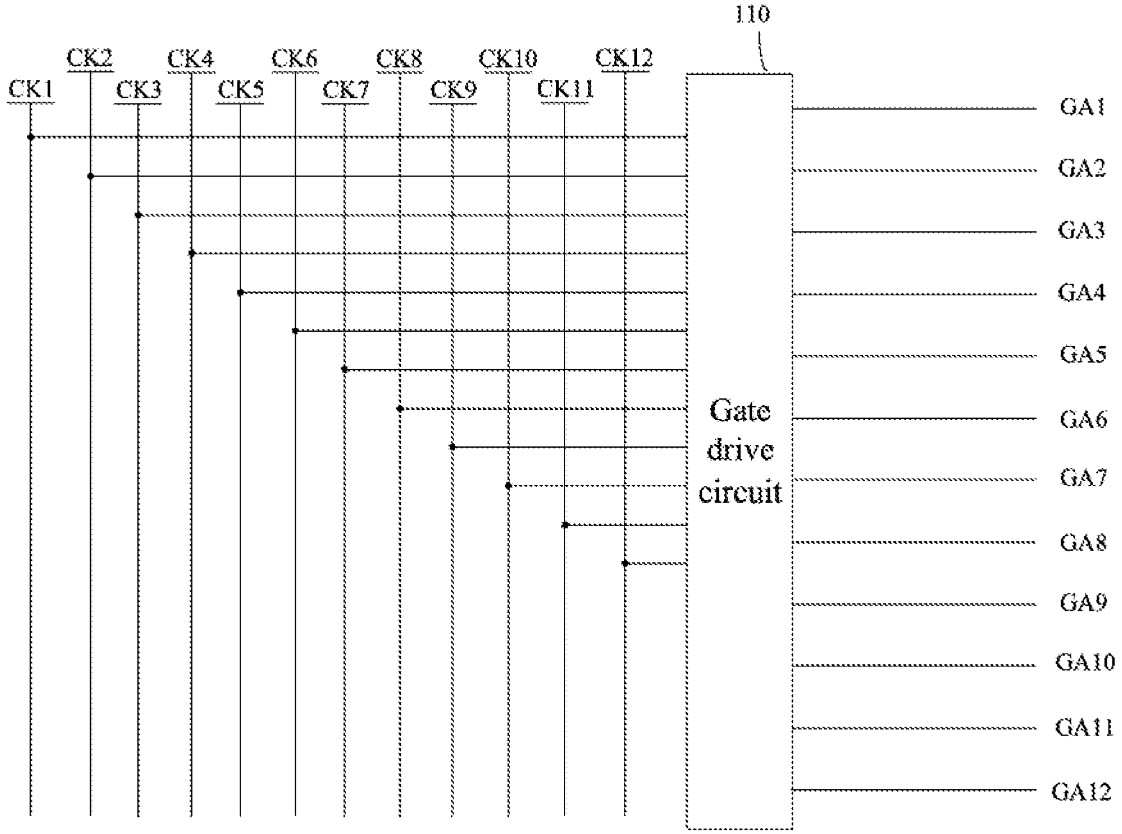
FIG. 2A is a schematic structure diagram of a display panel according to some other embodiments of the present disclosure.

In some embodiments of the present disclosure, the display panel 100 may further include a plurality of clock signal lines, and the plurality of clock signal lines are coupled to the gate drive circuit 110. In this way, a corresponding clock signal may be input to the gate drive circuit 110 by means of the clock signal lines, so as to load a signal onto the gate lines. Illustratively, as shown in FIG. 2A, the display panel 100 may include clock signal lines CK1-CK12, and the clock signal lines CK1-CK12 are coupled to the gate drive circuit 110. Illustratively, under the condition that the display panel 100 uses the design of a single gate drive circuit 110, the gate drive circuit 110 may be coupled to the twelve clock signal lines CK1-CK12. Under the condition that the display panel 100 uses the design of double gate drive circuits 110, each gate drive circuit 110 may be coupled to the twelve clock signal lines CK1-CK12. It is to be noted that FIG. 2A only takes twelve clock signal lines as an example, and in practical applications, the number of clock signal lines may be determined according to the requirements of practical applications, and is not limited herein. For example, clock signal lines of different numbers, such as 2, 4, 6, 8, 10, etc., that are integer multiples of 2, may also be used.

Figure 2B:
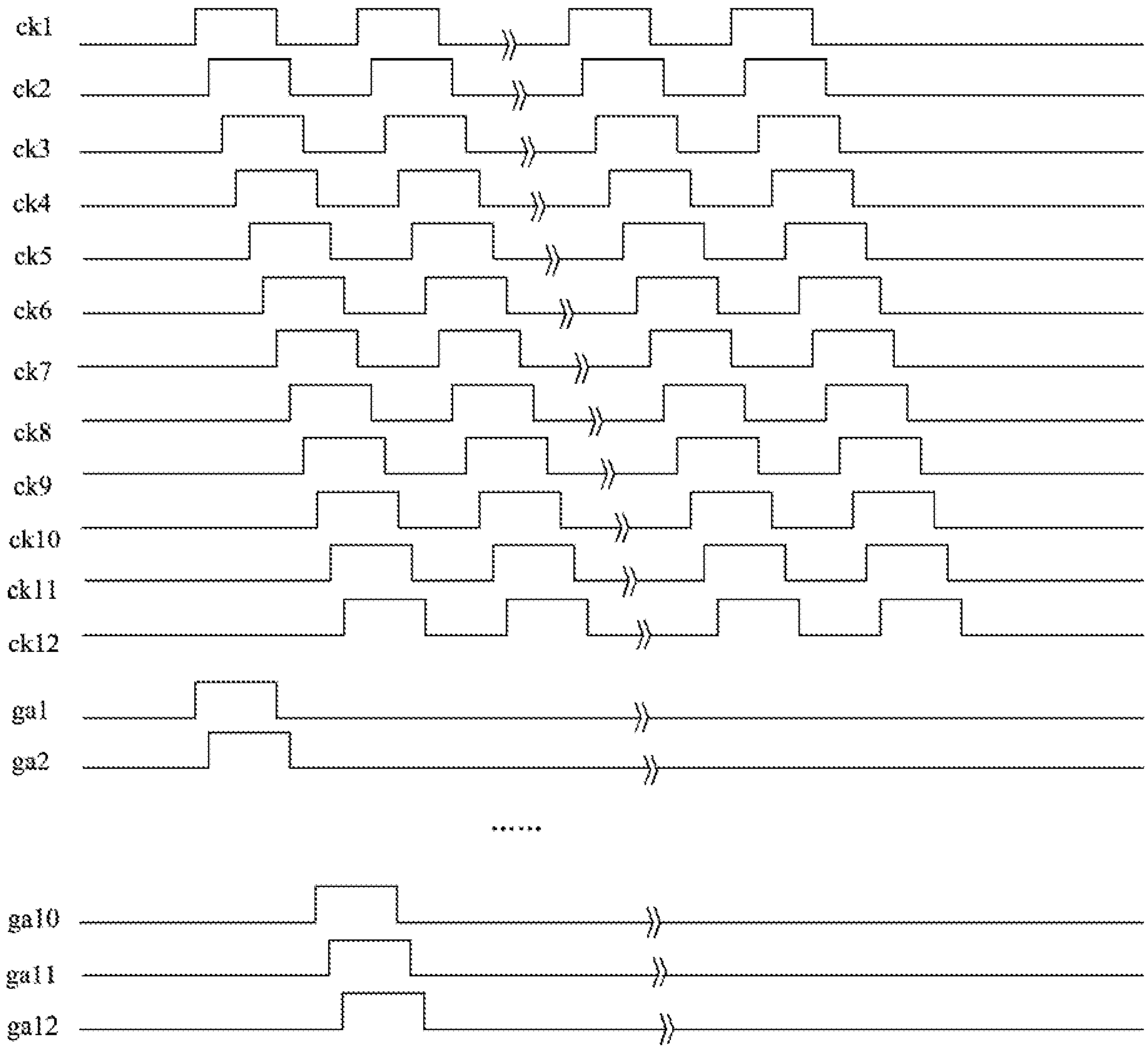
FIG. 2B is a signal timing diagram according to some embodiments of the present disclosure.

A signal timing diagram corresponding to the gate drive circuit 110 as shown in FIG. 2A is shown in FIG. 2B. ck1 represents a clock signal input on the clock signal line CK1, ck2 represents a clock signal on the clock signal line CK2, ck3 represents a clock signal on the clock signal line CK3, ck4 represents a clock signal on the clock signal line CK4, ck5 represents a clock signal on the clock signal line CK5, ck6 represents a clock signal on the clock signal line CK6, ck7 represents a clock signal on the clock signal line CK7, ck8 represents a clock signal on the clock signal line CK8, ck9 represents a clock signal on the clock signal line CK9, ck10 represents a clock signal on the clock signal line CK10, ck11 represents a clock signal on the clock signal line CK11, and ck12 represents a clock signal on the clock signal line CK12.

Moreover, a signal ga1 represents a gate scanning signal output by the gate drive circuit 110 on the gate line GA1, a signal ga2 represents a gate scanning signal output by the gate drive circuit 110 on the gate line GA2, . . . , a signal ga10 represents a gate scanning signal output by the gate drive circuit 110 on the gate line GA10, a signal ga11 represents a gate scanning signal output by the gate drive circuit 110 on the gate line GA11, and a signal ga12 represents a gate scanning signal output by the gate drive circuit 110 on the gate line GA12.

Furthermore, the gate drive circuit 110 outputs a first high level of the clock signal ck1 to the gate line GA1, to generate a high level in the signal ga1. The gate drive circuit 110 outputs a first high level of the clock signal ck2 to the gate line GA2, to generate a high level in the signal ga2 . . . . The gate drive circuit 110 outputs a first high level of the clock signal ck10 to the gate line GA10, to generate a high level in the signal ga10. The gate drive circuit 110 outputs a first high level of the clock signal ck11 to the gate line GA11, to generate a high level in the signal ga11. The gate drive circuit 110 outputs a first high level of the clock signal ck12 to the gate line GA12, to generate a high level in the signal ga12. That is, the high level of the clock signal may be an active level and the low level may be an inactive level of the clock signal. Alternatively, when a shift register outputs a low level of a clock signal to generate a low level signal in signals that controls the transistor to be turned on, the low level of the clock signal may be taken as an active level and the high level as an inactive level of the clock signal.

It is to be noted that the display panel 100 in the embodiments of the present disclosure may be a liquid crystal display panel 100, an organic light-emitting diode (OLED) display panel 100, etc., and is not limited herein. It is to be noted that when the display panel in the embodiments of the present disclosure is a liquid crystal display panel, the liquid crystal display panel generally includes an upper substrate and a lower substrate that are opposite each other, and liquid crystal molecules encapsulated between the upper substrate and the lower substrate. When a picture is displayed, since there is a voltage difference between a data voltage loaded onto the pixel electrode of each sub-pixel SPX and a common electrode voltage loaded onto a common electrode, and the voltage difference may form an electric field, such that the liquid crystal molecules are deflected by the electric field. The degree of deflection of the liquid crystal molecules is different due to different intensities of the electric fields, resulting in different transmissivity of the sub-pixels SPX, such that the sub-pixels SPX achieve luminance of different gray scales, to display a picture.

Different display application scenes require different display effects. For example, in a still picture, there is a need to reduce power consumption without pursuing a higher refresh rate. In a game mode, the display needs to be smoother, which requires a higher refresh rate. The display panel 100 provided in the embodiments of the present disclosure may be used at various different refresh rates. Illustratively, in conjunction with FIG. 1, a clock signal is input to the gate drive circuit 110 in the display panel 100, to make the gate drive circuit 110 input a gate scanning signal to the gate lines GA (for example, GA1, GA2, GA3, and GA4), so as to drive the gate lines GA (for example, GA1, GA2, GA3, and GA4) in the display panel 100 to control the transistors in the sub-pixels to be turned on. Moreover, display data is input to a source drive circuit 120, and the source drive circuit 120 loads a data voltage onto the data lines DA (for example, DA1, DA2 and DA3) in the display panel 100 according to the received display data, and charges the sub-pixels when the transistors in the sub-pixels are turned on, such that each sub-pixel is charged with the data voltage, to implement a picture display function.

Gray scale generally divides a luminance change between darkest and brightest into several parts, so as to facilitate the control over luminance of a screen. For example, a displayed image is composed of three colors of red, green and blue, where each color may exhibit a different luminance grade, and red, green and blue of different luminance grades may be combined to form different colors. For example, the number of gray scales of the liquid crystal display panel is 6 bits, then the three colors of red, green and blue separately have 64 (that is $2^6$) gray scales, and the 64 gray scale values are 0-63. The number of gray scales of the liquid crystal display panel is 8 bits, then the three colors of red, green and blue separately have 256 (that is $2^8$) gray scales, and the 256 gray scale values are 0-255. The number of gray scales of the liquid crystal display panel is 10 bits, then the three colors of red, green and blue separately have 1024 (that is $2^{10}$) gray scales, and the 1024 gray scale values are 0-1023. The number of gray scales of the liquid crystal display panel is 12 bits, then the three colors of red, green and blue separately have 4096 (that is $2^{12}$) gray scales, and the 4096 gray scale values are 0-4095.

Figure 3:
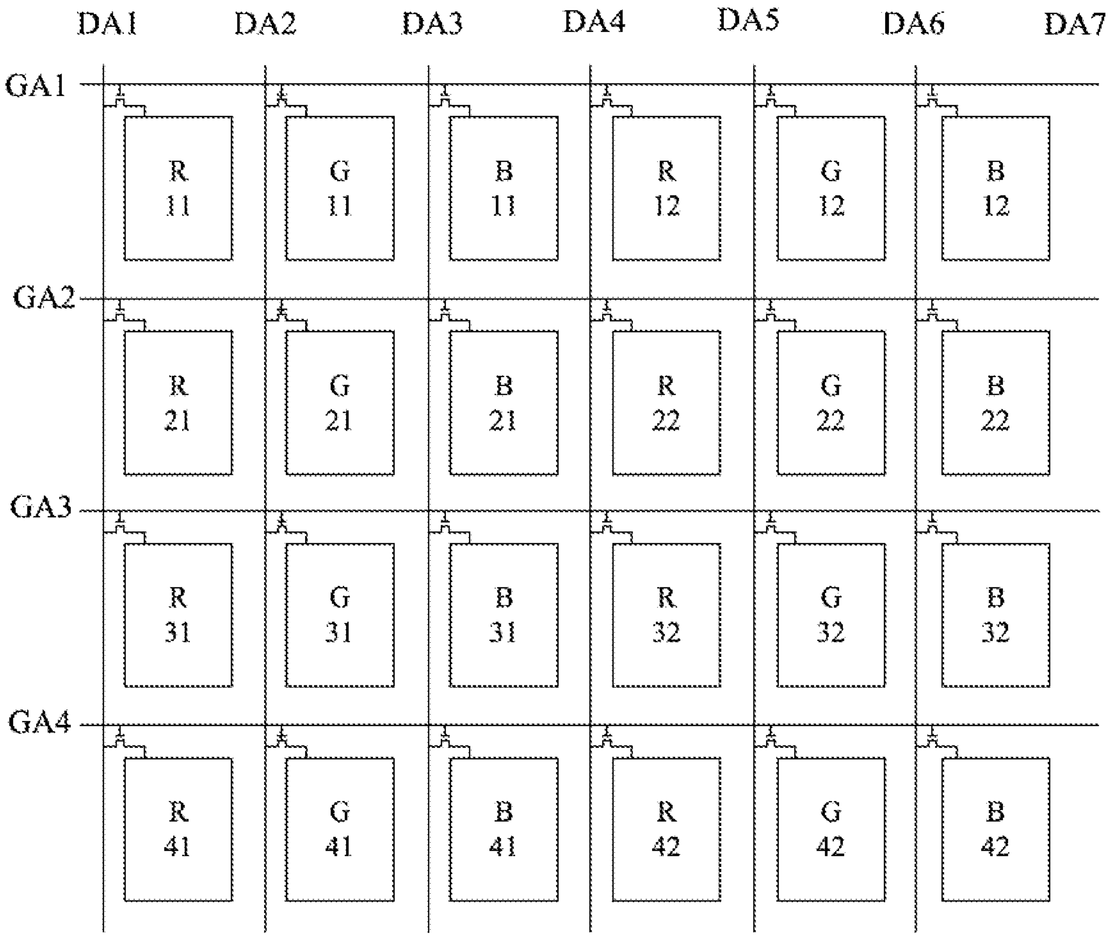
FIG. 3 is a schematic structure diagram of a display panel according to some other embodiments of the present disclosure.

In the following, a pixel unit including a red sub-pixel, a green sub-pixel and a blue sub-pixel is described as an example. For example, as shown in FIG. 3, a red sub-pixel R11, a green sub-pixel G11, and a blue sub-pixel B11 form one pixel unit, and a red sub-pixel R12, a green sub-pixel G12, and a blue sub-pixel B12 form one pixel unit. A red sub-pixel R21, a green sub-pixel G21, and a blue sub-pixel B21 form one pixel unit, and a red sub-pixel R22, a green sub-pixel G22, and a blue sub-pixel B22 form one pixel unit. A red sub-pixel R31, a green sub-pixel G31, and a blue sub-pixel B31 form one pixel unit, and a red sub-pixel R32, a green sub-pixel G32, and a blue sub-pixel B32 form one pixel unit. A red sub-pixel R41, a green sub-pixel G41, and a blue sub-pixel B41 form one pixel unit, and a red sub-pixel R42, a green sub-pixel G42, and a blue sub-pixel B42 form one pixel unit.

Figure 4:
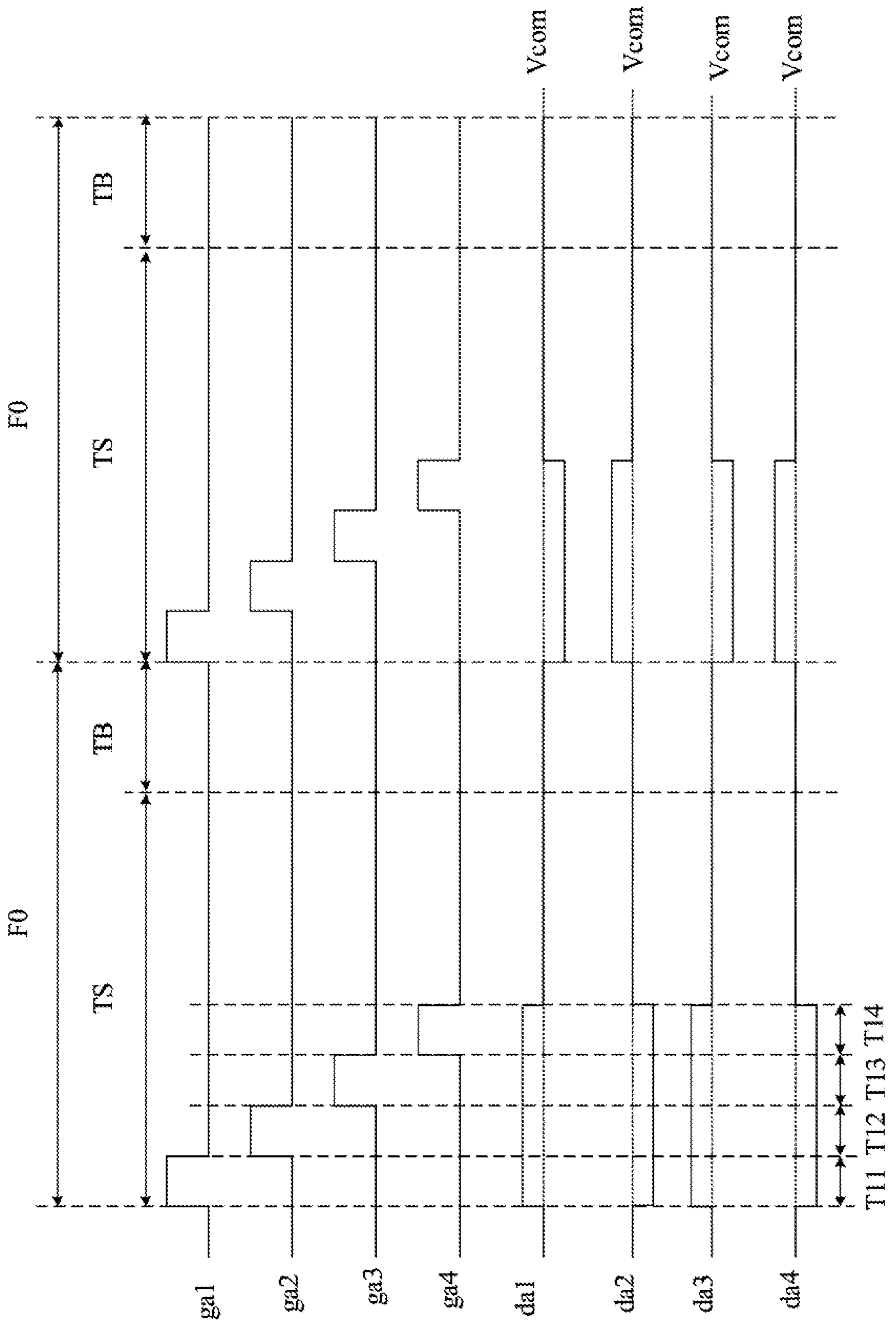
FIG. 4 is a signal timing diagram according to some other embodiments of the present disclosure.

In conjunction with FIG. 4, with one sub-pixel SPX as an example, Vcom represents the common electrode voltage. When the data voltage input to the pixel electrode of the sub-pixel SPX is greater than the common electrode voltage Vcom, the liquid crystal molecules at the sub-pixel SPX may be positive, and then a polarity of the data voltage in the sub-pixel SPX is positive correspondingly. When the data voltage input to the pixel electrode of the sub-pixel SPX is less than the common electrode voltage Vcom, the liquid crystal molecules at the sub-pixel SPX may be negative, and then the polarity of the data voltage in the sub-pixel SPX is negative correspondingly. For example, the common electrode voltage may be 8.3 V, and under the condition that a data voltage of 8.3 V-16 V is input to the pixel electrode of the sub-pixel SPX, the liquid crystal molecules at the sub-pixel SPX may be positive, and the data voltage of 8.3 V-16 V is a positive data voltage correspondingly. Under the condition that a data voltage of 0.6 V-8.3 V is input to the pixel electrode of the sub-pixel SPX, the liquid crystal molecules at the sub-pixel SPX may be negative, and the data voltage of 0.6 V-8.3 V is a negative data voltage correspondingly. Illustratively, with 0-255 gray scales of 8 bit as an example, under the condition that a data voltage of 16 V is input to the pixel electrode of the sub-pixel SPX, the sub-pixel SPX may correspond to the luminance of the maximum gray scale value of the positive polarity. Under the condition that a data voltage of 0.6 V is input to the pixel electrode of the sub-pixel SPX, the sub-pixel SPX may correspond to the luminance of the maximum gray scale value of the positive polarity.

In conjunction with FIGS. 3 and 4, with frame flipping (also referred to as dot flipping, column flipping, row flipping, etc.) as an example, a display frame F0 of the display panel may include a data refresh phase TS and a blanking time phase TB. In the data refresh phase TS, the sub-pixels in the display panel may be controlled to be charged with the data voltage, such that the display panel displays a picture of the display frame F0. For example, as shown in FIG. 4, the gate scanning signal ga1 is loaded onto the gate line GA1, the gate scanning signal ga2 is loaded onto the gate line GA2, the gate scanning signal ga3 is loaded onto the gate line GA3, and the gate scanning signal ga4 is loaded onto the gate line GA4. When an active level (for example, a high level) occurs in the gate scanning signals ga1-ga4, a corresponding transistor 01 may be controlled to be turned on. When an inactive level (for example, a low level) occurs in the gate scanning signals ga1-ga4, a corresponding transistor 01 may be controlled to be turned off.

Moreover, when an active level occurs in the gate scanning signal ga1, the transistors 01 of the first row of sub-pixels may all be controlled to be turned on, the data line DA1 may be loaded with a corresponding data voltage da1, the data line DA2 may be loaded with a corresponding data voltage da2, and the data line DA3 may be loaded with a corresponding data voltage da3, such that a target data voltage of a corresponding gray scale value is input to the pixel electrodes 02 of the first row of sub-pixels, so as to input the target data voltage to each sub-pixel in the first row. Furthermore, when an active level occurs in the gate scanning signal ga2, the transistors 01 of the second row of sub-pixels may all be controlled to be turned on, the data line DA1 may be loaded with a corresponding data voltage da1, the data line DA2 may be loaded with a corresponding data voltage da2, and the data line DA3 may be loaded with a corresponding data voltage da3, such that a target data voltage of a corresponding gray scale value is input to the pixel electrodes 02 of the second row of sub-pixels, so as to input the target data voltage to each sub-pixel in the second row. Furthermore, when an active level occurs in the gate scanning signal ga3, the transistors 01 of the third row of sub-pixels may all be controlled to be turned on, the data line DA1 may be loaded with a corresponding data voltage da1, the data line DA2 may be loaded with a corresponding data voltage da2, and the data line DA3 may be loaded with a corresponding data voltage da3, such that a target data voltage of a corresponding gray scale value is input to the pixel electrodes 02 of the third row of sub-pixels, so as to input the target data voltage to each sub-pixel in the third row. Furthermore, when an active level occurs in the gate scanning signal ga4, the transistors 01 of the fourth row of sub-pixels may all be controlled to be turned on, the data line DA1 may be loaded with a corresponding data voltage da1, the data line DA2 may be loaded with a corresponding data voltage da2, and the data line DA3 may be loaded with a corresponding data voltage da3, such that a target data voltage of a corresponding gray scale value is input to the pixel electrodes 02 of the fourth row of sub-pixels, so as to input the target data voltage to each sub-pixel in the fourth row. The remaining rows are similar and will not be repeated herein.

As shown in FIG. 4, in the blanking time phase TB, the gate scanning signals ga1-ga4 are all low levels, the transistor 01 in each sub-pixel is in an off state, and the pixel electrode 02 in each sub-pixel is controlled to maintain the data voltage, so as to control the sub-pixels in the display panel to maintain the data voltage, and then the display panel continues to display the picture of the display frame F0.

Figure 5:
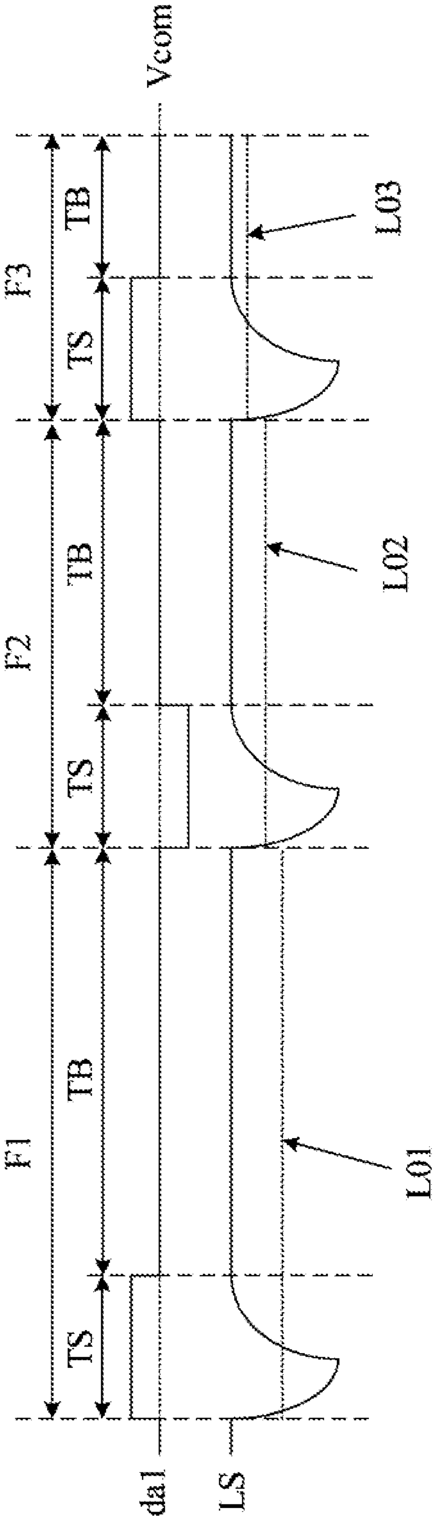
FIG. 5 is a signal timing diagram according to some other embodiments of the present disclosure.

In order to achieve different application scenes, the display panel may set a plurality of different refresh rates. For example, in some application scenes, in order to save power consumption, the display panel needs rate-downwards display, for example, the rate is reduced from 60 Hz to 30 Hz or 1 Hz. In other scenes, for example, when a high-rate game is executed, it is necessary to increase the rate of the display panel, for example, the rate increases from 60 Hz to 120 Hz or 240 Hz, to make the picture smoother. Thus, in order to be adapted to different scenes, the display panel may change the refresh rate, that is, perform display in a variable refresh rate (VRR) mode. Generally, when the refresh rate of the display panel is changed from a high refresh rate to a low refresh rate, a maintaining time of the data refresh phase TS in each display frame does not change, but only the blanking time phase TB is simply prolonged. For example, in conjunction with FIG. 5, a refresh rate corresponding to a display frame F1 is lower than a refresh rate corresponding to a display frame F2, and the refresh rate corresponding to the display frame F2 is lower than a refresh rate corresponding to a display frame F3. The maintaining time of the data refresh phase TS in the display frame F1, the display frame F2 and the display frame F3 are the same. The maintaining time of the blanking time phase TB in the display frame F1 is longer than the maintaining time of the blanking time phase TB in the display frame F2, and the maintaining time of the blanking time phase TB in the display frame F2 is longer than the maintaining time of the blanking time phase TB in the display frame F3. It is to be noted that in FIG. 5, LS represents the luminance of the display panel, and da1 represents the data voltage on the data line DA1.

Therefore, the display panel displays the picture of one display frame, and performs refreshing until the display data of the next display frame is received. The time for which the display panel displays a picture of one display frame may include a data refresh phase TS and a blanking time phase TB. The maintaining time of the data refresh time in the display frame is the same at different refresh rates, while the maintaining time of the blanking time phase TB in the display frame is different at different refresh rates. A data refresh phase TS and a blanking time phase TB constitute a total time of a display frame. In the data refresh phase TS, the luminance of the display picture of the display panel decreases first and then increases. During the blanking time phase TB, the transistor is turned off, and the display panel keeps the display picture. However, as the refresh rate increases, the maintaining time of the blanking time phase TB decreases, and current leakage decreases, such that the average luminance of the display panel when displaying a picture increases. Conversely, when the refresh rates decreases, the maintaining time of the blanking time phase TB increases and current leakage increases, such that the average luminance of the display panel when displaying a picture decreases. In this way, when the refresh rate changes, the luminance of the display panel abruptly changes, and a flicker phenomenon occurs. For example, in conjunction with FIG. 5, an average luminance L01 corresponding to the display frame F1 is less than an average luminance L02 corresponding to the display frame F2, and the average luminance L02 corresponding to the display frame F2 is less than an average luminance L03 corresponding to the display frame F3. In this way, in practical applications, since the refresh rate is constantly changed, the luminance of the display panel is also constantly changed, and then a flicker phenomenon is easily observed by human eyes, influencing the sense of view. The embodiments of the present disclosure provide a drive method for a display panel, which may solve the problem of different luminance of a display picture at different refresh rates, alleviate a flicker phenomenon, and improve display quality and viewing experience.

Figure 6:
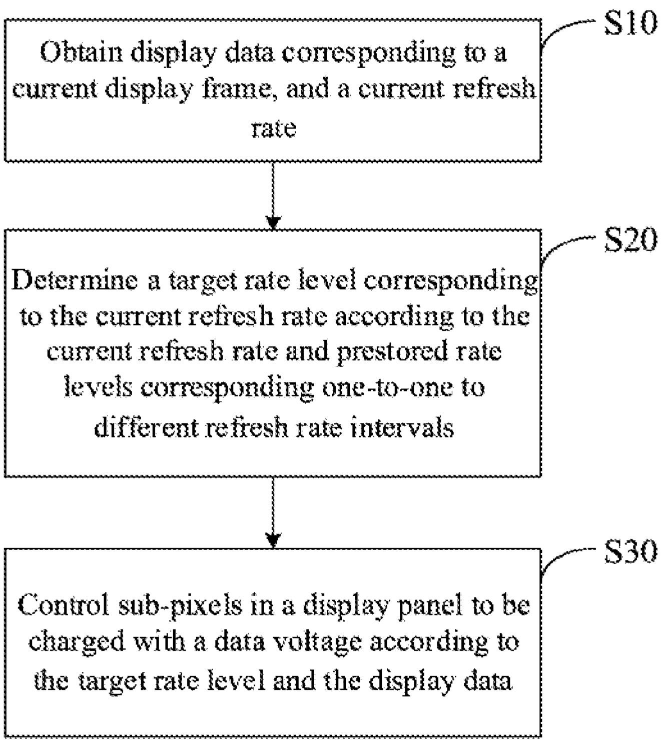
FIG. 6 is a flowchart of a drive method according to some embodiments of the present disclosure.

As shown in FIG. 6, a drive method for a display panel provided in embodiments of the present disclosure may include following steps.

Figure 8:
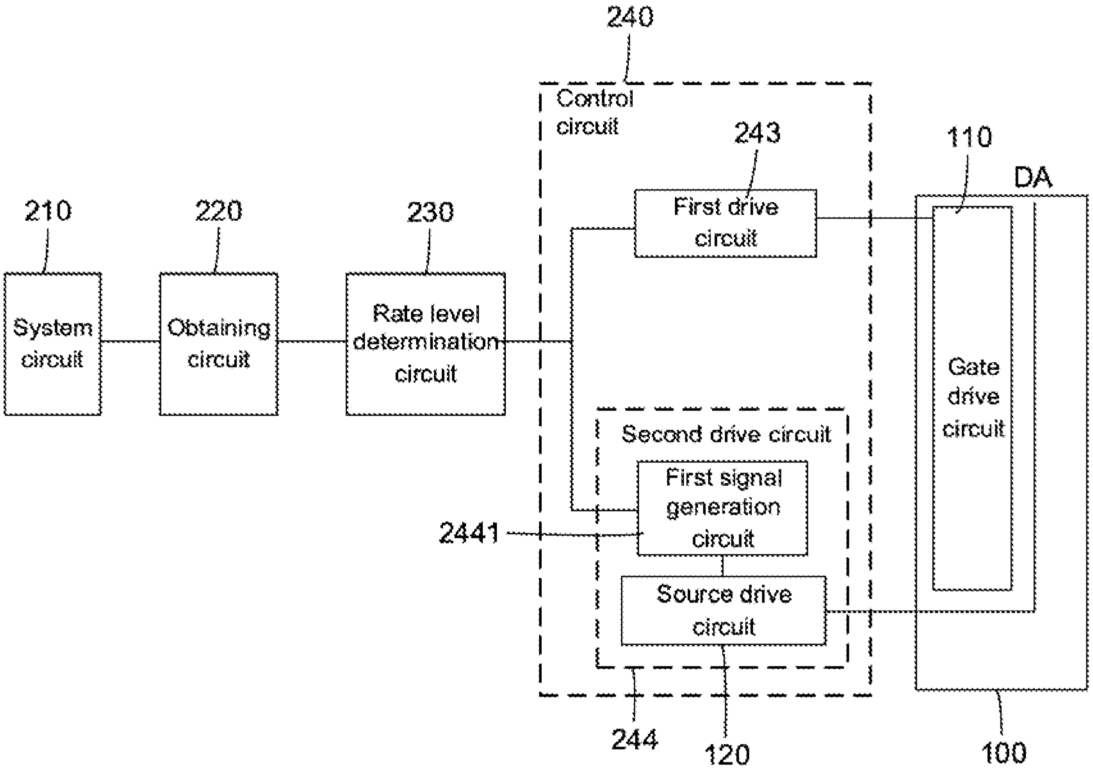
FIG. 8 is a schematic structure diagram of a drive device according to some embodiments of the present disclosure.

Step S10, display data corresponding to a current display frame and a current refresh rate are obtained. Illustratively, as shown in FIG. 8, the display device further includes a system circuit 210 and an obtaining circuit 220. The obtaining circuit 220 is configured to obtain display data corresponding to a current display frame, and a current refresh rate. In some examples, the system circuit 210 (for example, a system on a chip, SOC) obtains display data corresponding to a current display frame, and a current refresh rate from a network or locally. The system circuit 210 may send the display data corresponding to the current display frame and the current refresh rate to the obtaining circuit 220, such that the obtaining circuit 220 may obtain the display data corresponding to the current display frame and the current refresh rate.

In some embodiments of the present disclosure, the obtained display data may include at least: a digital signal form of the data voltage, carrying an original gray scale value, corresponding one-to-one to the sub-pixel SPX. In this way, the original gray scale value corresponding to each sub-pixel may be determined according to the display data corresponding to the sub-pixel.

Step S20, a target rate level corresponding to the current refresh rate is determined according to the current refresh rate and prestored rate levels corresponding one-to-one to different refresh rate intervals. Illustratively, the display device further includes a rate level determination circuit 230. The rate level determination circuit 230 is configured to determine a target rate level corresponding to the current refresh rate according to the current refresh rate and prestored rate levels corresponding one-to-one to different refresh rate intervals.

In some embodiments of the present disclosure, the prestored rate levels corresponding one-to-one to different refresh rate intervals may be that a refresh rate interval [H1, H2) corresponds to a rate level Lev1, a refresh rate interval [H2, H3) corresponds to a rate level Lev2, a refresh rate interval [H3, H4) corresponds to the rate level Lev3, a refresh rate interval [H4, H5) corresponds to a rate level Lev4, a refresh rate interval [H5, H6) corresponds to a rate level Lev5, a refresh rate interval [H6, H7) corresponds to a rate level Lev6, a refresh rate interval [H7, H8) corresponds to a rate level Lev7, etc. A refresh rate in the refresh rate interval [H1, H2) is less than a refresh rate in the refresh rate interval [H2, H3), the refresh rate in the refresh rate interval [H2, H3) is less than a refresh rate in the refresh rate interval [H3, H4), the refresh rate in the refresh rate interval [H3, H4) is less than a refresh rate in the refresh rate interval [H4, H5), the refresh rate in the refresh rate interval [H4, H5) is less than a refresh rate in the refresh rate interval [H5, H6), the refresh rate in the refresh rate interval [H5, H6) is less than a refresh rate in the refresh rate interval [H6, H7), the refresh rate in the refresh rate interval [H6, H7) is less than a refresh rate in the refresh rate interval [H7, H8), then the rate level Lev1 is less than the rate level Lev2, the rate level Lev2 is less than the rate level Lev3, the rate level Lev3 is less than the rate level Lev4, the rate level Lev4 is less than the rate level Lev5, the rate level Lev5 is less than the rate level Lev6, and the rate level Lev6 is less than the rate level Lev7.

Illustratively, H1-H8 respectively represent refresh rates. For example, H1 may be set to be 1 Hz, H2 may be set to be 30 Hz, H3 may be set to be 60 Hz, H4 may be set to be 90 Hz, H5 may be set to be 120 Hz, H6 may be set to be 150 Hz, H7 may be set to be 240 Hz, and H8 may be set to be 300 Hz. Alternatively, in practical applications, the refresh rate interval may be determined according to requirements of the practical applications, which is not limited herein.

Illustratively, refresh rates that may be supported by the display panel 100 include: 1 Hz, 30 Hz, 60 Hz, 90 Hz, 120 Hz, 150 Hz, 240 Hz, etc. Under the condition that the current refresh rate is 1 Hz, then the corresponding refresh rate interval is [H1, H2), and the corresponding target rate level is the rate level Lev1. Under the condition that the current refresh rate is 60 Hz, then the corresponding refresh rate interval is [H3, H4), and the corresponding target rate level is the rate level Lev3. Under the condition that the current refresh rate is 240 Hz, then the corresponding refresh rate interval is [H7, H8), and the corresponding target rate level is the rate level Lev7.

Step S30, sub-pixels in the display panel are controlled to be charged with a data voltage according to the target rate level and the display data.

In some examples, S30 includes: the display panel is controlled to load the gate scanning signal onto the gate, and load the data voltage onto the data line in the display panel according to the target rate level and the display data, such that a time interval between an end moment of a slew edge (voltage conversion edge) when the data line starts to load the data voltage and a start moment of a data charging phase corresponding to the sub-pixels charged with the data voltage is a time interval corresponding to the target rate level. As the refresh rate of the refresh rate interval increases, the corresponding rate level increases, and the corresponding time interval increases. Illustratively, a time interval corresponding to the rate level Lev1 is less than a time interval corresponding to the rate level Lev2, the time interval corresponding to the rate level Lev2 is less than a time interval corresponding to the rate level Lev3, the time interval corresponding to the rate level Lev3 is less than a time interval corresponding to the rate level Lev4, . . . , and the time interval corresponding to the rate level Lev6 is less than a time interval corresponding to the rate level Lev7. In this way, a time when the sub-pixel in a display frame corresponding to a higher rate level is charged with a maximum value of the target data voltage of a corresponding gray scale value is later than a time when the sub-pixel in a display frame corresponding to a lower rate level is charged with a maximum value of the target data voltage of a corresponding gray level value, which is equivalent to reducing a charge rate of the sub-pixel in the display frame corresponding to the higher rate level and increasing a charge rate of the sub-pixel in the display frame corresponding to the lower rate level. Furthermore, since the current leakage in the blanking time phase in the display frame corresponding to the lower rate level is greater than the current leakage in the blanking time phase in the display frame corresponding to the higher rate level, and reducing a charge rate of the sub-pixel in the display frame corresponding to the higher rate level and increasing a charge rate of the sub-pixel in the display frame corresponding to the lower rate level are achieved, a charge rate difference of the sub-pixels in the display frames with different refresh rates is reduced as much as possible, and the problem of poor display of the display panel is alleviated.

Figure 7:
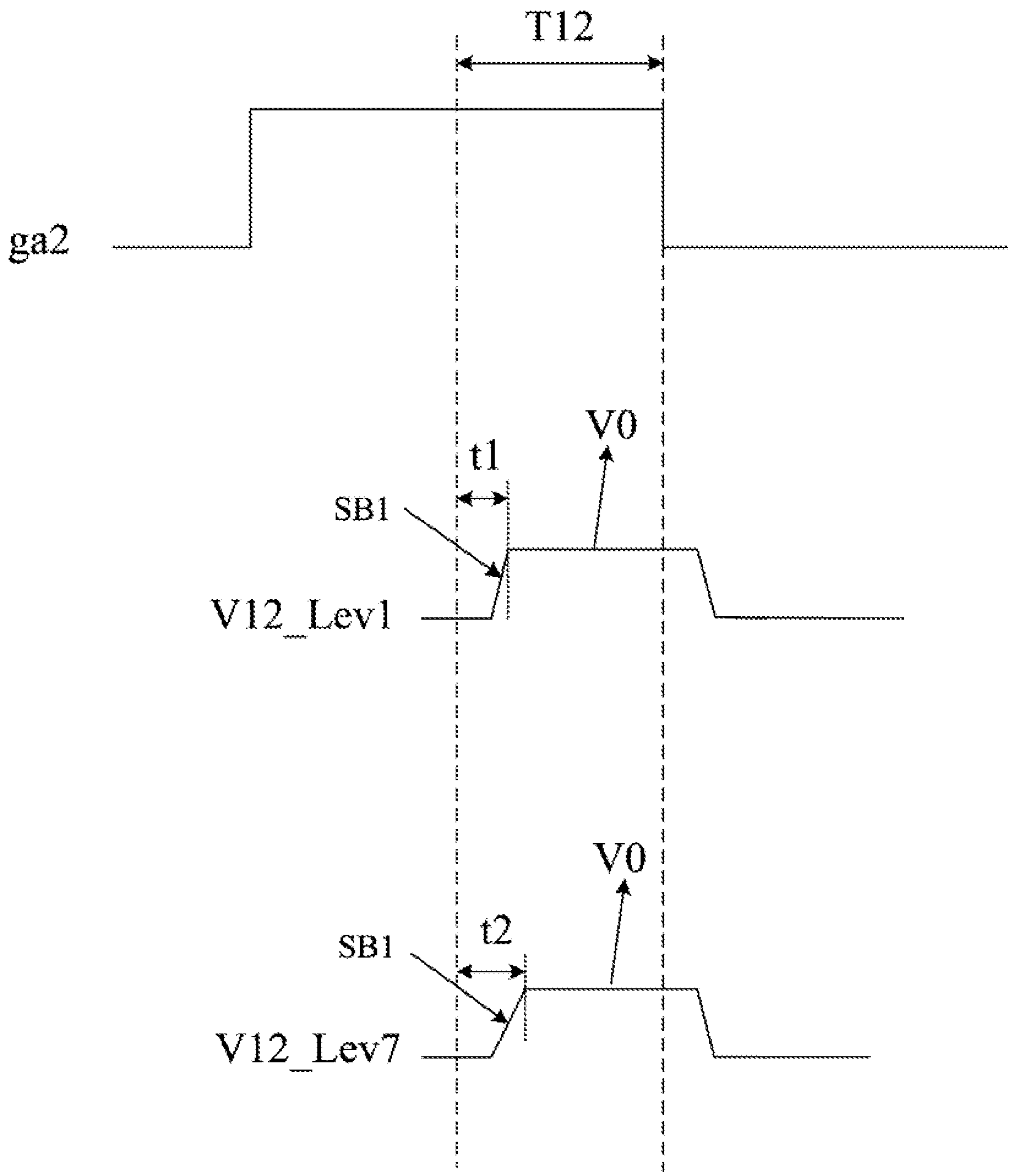
FIG. 7 is a signal timing diagram according to some other embodiments of the present disclosure.

Illustratively, in conjunction with FIGS. 3 and 7, with the red sub-pixel R12, the data line DA1 and the gate line GA2 as an example, V12_Lev1 represents a data voltage charged into the data line DA1 in a display frame corresponding to the rate level Lev1, and V12_Lev7 represents a data voltage charged into the data line DA1 in a display frame corresponding to the rate level Lev7. SB1 represents a slew edge when the data voltages V12_Lev1 and V12_Lev7 are loaded onto the data line DA1. When the data voltage starts to be loaded onto the data line DA2, there is a charge-discharge process that forms a slew edge SB1 (for example, a slew edge when a low voltage slews to a high voltage). A time interval t1 is provided between an end moment of the slew edge SB1 when the data voltage V12_Lev1 starts to be loaded onto the control data line DA1 and a start moment of the data charging phase T12 corresponding to that the red sub-pixel R12 is charged with the data voltage V12_Lev1 as a target data voltage. A time interval t2 is provided between an end moment of the slew edge SB1 when the data voltage V12_Lev7 starts to be loaded onto the control data line DA1 and a start moment of the data charging phase T12 corresponding to that the red sub-pixel R12 is charged with the data voltage V12_Lev7 as a target data voltage. With t2>t1, a time when the red sub-pixel R12 in the display frame corresponding to the rate level Lev7 is charged with the maximum value V0 of the data voltage V12_Lev7 may be later than a time when the red sub-pixel R12 in the display frame corresponding to the rate level Lev1 is charged with the maximum value V0 of the data voltage V12_Lev1, which is equivalent to reducing a charge rate of the red sub-pixel R12 in the display frame corresponding to the rate level Lev7 and increasing a charge rate of the red sub-pixel R12 in the display frame corresponding to the rate level Lev1. Moreover, in combination with the current leakage in the blanking time phase in the display frame corresponding to the rate level Lev1 being greater than the current leakage in the blanking time phase in the display frame corresponding to the rate level Lev7, a charge rate difference of the sub-pixels in the display frames with the refresh rate levels Lev1 and Lev7 is reduced as much as possible, and the problem of poor display of the display panel is alleviated.

In some embodiments of the present disclosure, different refresh rate levels have one-to-one slew rates (voltage conversion rates) of slew edges, and as the rate level increases, the corresponding slew rate decreases. The step of loading the data voltage onto the data line in the display panel includes: load the data voltage onto the data line in the display panel according to a slew rate of the slew edge corresponding to the target rate level, to adjust the time interval. In this way, the data voltage may be loaded onto the data line according to the slew rate corresponding to the target rate level, to change the time interval. Illustratively, a slew rate corresponding to the rate level Lev7 is less than a slew rate corresponding to the rate level Lev6, the slew rate corresponding to the rate level Lev6 is less than a slew rate corresponding to the rate level Lev5, the slew rate corresponding to the rate level Lev5 is less than a slew rate corresponding to the rate level Lev4, . . . , and the slew rate corresponding to the rate level Lev2 is less than a slew rate corresponding to the rate level Lev1. For example, in conjunction with FIG. 7, when the slew rate corresponding to the rate level Lev7 is less than the slew rate corresponding to the rate level Lev1, a time when the data line DA1 is charged with the maximum value V0 of the data voltage V12_Lev7 at the rate level Lev7 is later than a time when the data line DA1 is charged with the maximum value V0 of the data voltage V12_Lev1 at the rate level Lev1, such that a time when the red sub-pixel R12 is charged with the maximum value V0 of the data voltage V12_Lev7 at the rate level Lev7 is later than a time when the red sub-pixel R12 is charged with the maximum value V0 of the data voltage V12_Lev1 at the rate level Lev1.

Illustratively, the step of loading the data voltage onto the data line in the display panel according to a slew rate of the slew edge corresponding to the target rate level includes: gate an output impedance corresponding to the target rate level according to the target rate level, to load the data voltage onto the data line after the data voltage passes through the output impedance. As the rate level increases, the output impedance increases, and the corresponding slew rate decreases. Illustratively, each of the rate levels Lev1-Lev7 corresponds to an output impedance, and an output impedance corresponding to the rate level Lev7 is greater than an output impedance corresponding to the rate level Lev6, the output impedance corresponding to the rate level Lev6 is greater than an output impedance corresponding to the rate level Lev5, the output impedance corresponding to the rate level Lev5 is greater than an output impedance corresponding to the rate level Lev4, . . . , and the output impedance corresponding to the rate level Lev2 is greater than an output impedance corresponding to the rate level Lev1.

Illustratively, the display device may further include a control circuit. The control circuit is configured to control sub-pixels in the display panel to be charged with a data voltage according to the target rate level and the display data. Illustratively, the control circuit may include a first drive circuit 243 and a second drive circuit 244. The first drive circuit 243 is configured to control the display panel to load the gate scanning signal onto the gate according to the target rate level and the display data. The second drive circuit 244 is configured to load the data voltage onto the data line in the display panel according to the target rate level and the display data, such that a time interval between an end moment of a slew edge when the data line starts to load the data voltage and a start moment of a data charging phase corresponding to the sub-pixels charged with the data voltage is a time interval corresponding to the target rate level. As the refresh rate of the refresh rate interval increases, the corresponding rate level increases, and the corresponding time interval decreases.

Illustratively, the first drive circuit 243 is configured to input a clock signal to the gate drive circuit in the display panel and to control the gate drive circuit to load the gate scanning signal onto the gate according to the target rate level.

Illustratively, as shown in FIG. 8, the second drive circuit 244 may include a first signal generation circuit 2441 and a source drive circuit 120. The first signal generation circuit 2441 may generate a first data output control signal in the form of a corresponding digital signal according to the target rate level, and send the display data and the generated first data output control signal to the source drive circuit 120. According to the first data output control signal, the source drive circuit 120 gates the output impedance corresponding to the target rate level, such that the data voltage corresponding to the gray scale value of each display data passes through the output impedance and then is loaded onto the data line, so as to load the data voltage onto the data line by using the corresponding slew rate.

Figure 9:
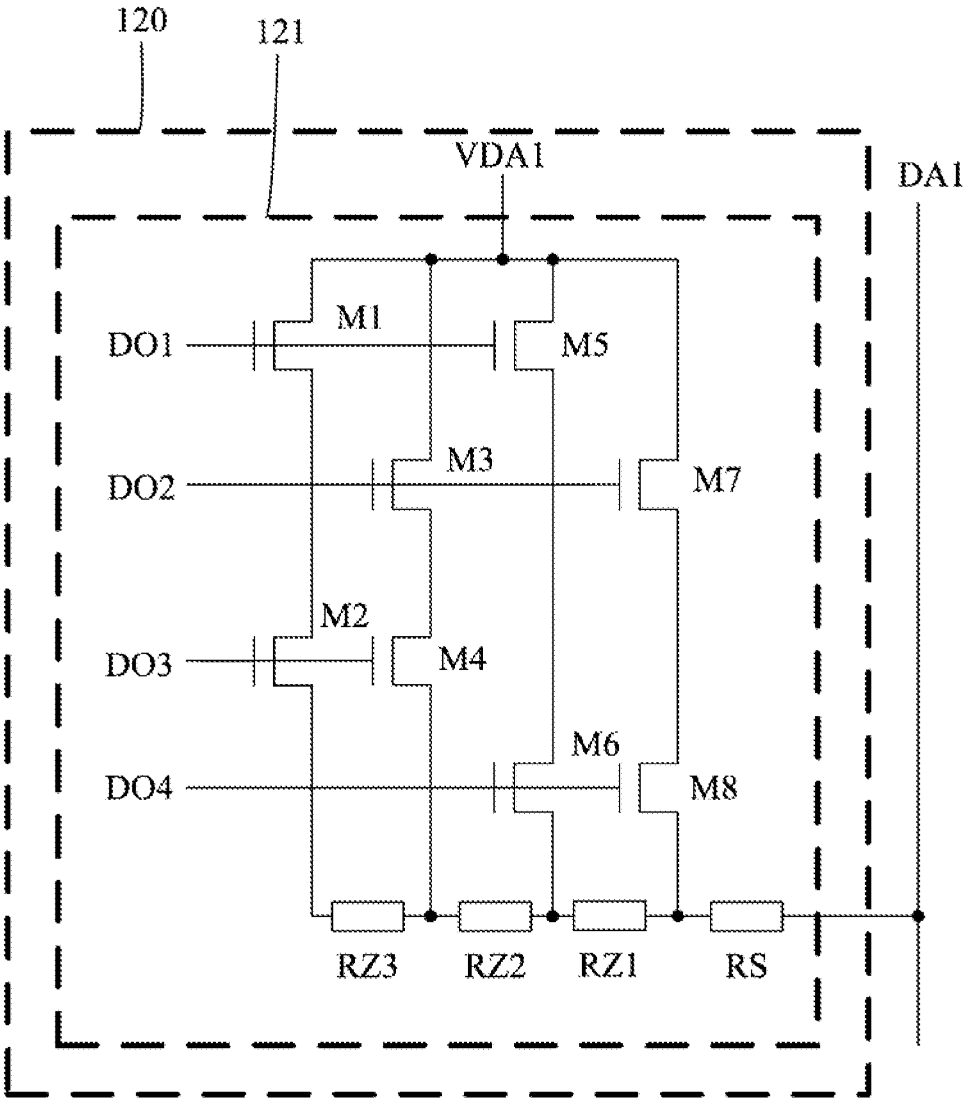
FIG. 9 is a schematic structure diagram of a data output circuit according to some embodiments of the present disclosure.

Illustratively, the source drive circuit 120 includes a slew circuit (voltage conversion circuit) and a plurality of data output circuits. Each of the data lines is coupled to a data output circuit in a one-to-one correspondence manner. The slew circuit outputs a target data voltage according to the display data, and each of the data output circuits receives the target data voltage and the first data output control signal, gates an output impedance corresponding to the target rate level according to the first data output control signal, and loads the target data voltage onto the data line by means of the gated output impedance. Illustratively, as shown in FIG. 9, the data output circuit 121 includes a plurality of transistors M1-M8, divider resistors RZ1 to RZ3, and an original resistor RS. The original resistor RS is an output impedance of each of the data output circuits. Moreover, gates of the transistors M1 and M5 receive a signal DO1, gates of the transistors M3 and M7 receive a signal DO2, gates of the transistors M2 and M4 receive a signal DO3, and gates of the transistors M6 and M8 receive a signal DO4. Sources of the transistors M1, M3, M5 and M7 all receive target voltages of corresponding gray scale values. A drain of the transistor M1 is coupled to a source of the transistor M2, and a drain of the transistor M2 is coupled to a first end of the divider resistor RZ3. A drain of the transistor M3 is coupled to a source of the transistor M4, and a drain of the transistor M4 is coupled to a second end of the divider resistor RZ3 and a first end of the divider voltage RZ2. A drain of the transistor M5 is coupled to a source of the transistor M6, and a drain of the transistor M6 is coupled to a second end of the divider resistor RZ2 and a first end of the divider voltage RZ1. A drain of the transistor M7 is coupled to a source of the transistor M8, and a drain of the transistor M8 is coupled to a second end of the divider resistor RZ1 and a first end of the original resistor RS. A second end of the original resistor RS is coupled to a corresponding data line. For example, with the data line DA1 as an example, the second end of the original resistor RS is coupled to the data line DA1. Levels of the signal DO1 and the signal DO2 are opposite, and levels of the signal DO3 and signal DO4 are opposite. By using the transistors M1-M8 as resistors, different output impedances may be gated according to the first data output control signals corresponding to different rate levels. Illustratively, each of the first data output control signals includes DO1, DO2, DO3, and DO4. At least one of DO1, DO2, DO3, and DO4 may be set to be different, to achieve different rate levels corresponding to different first data output control signals, so as to gate different output impedances, and the target data voltage VDA1 may be loaded onto the data line DA1 by means of the gated output impedance.

For example, with reference to Table 1, when DO1 is 0, DO2 is 1, DO3 is 0 and DO4 is 1, the output impedance which may be gated is the original resistor RS, and the output impedance serves as an output impedance corresponding to the rate level Lev1. When DO1 is 1, DO2 is 0, DO3 is 0 and DO4 is 1, the output impedance which may be gated is a sum of the original resistor RS and the divider resistor RZ1, and the output impedance serves as the output impedance corresponding to the rate level Lev2. When DO1 is 0, DO2 is 1, DO3 is 1 and DO4 is 0, the output impedance which may be gated is a sum of the original resistor RS, the divider resistor RZ1 and the divider resistor RZ2, and the output impedance serves as the output impedance corresponding to the rate level Lev3. When DO1 is 1, DO2 is 0, DO3 is 1 and DO4 is 0, the output impedance which may be gated is a sum of the original resistor RS, the divider resistor RZ1, the divider resistor RZ2 and the divider resistor RZ3, and the output impedance serves as the output impedance corresponding to the rate level Lev4. It is to be noted that a structure of the data output circuit and an implementation mode of the output impedance are merely examples. In practical applications, it may be determined according to requirements of the practical applications, which is not limited herein.

TABLE 1

| Output impedance | RS | RS + RZ1 | RS + RZ2 + RZ1 | RS + RZ3 + RZ2 + RZ1 |
|---|---|---|---|---|
| DO1 | 0 | 1 | 0 | 1 |
| DO2 | 1 | 0 | 1 | 0 |
| DO3 | 0 | 0 | 1 | 1 |
| DO4 | 1 | 1 | 0 | 0 |

Figure 10:
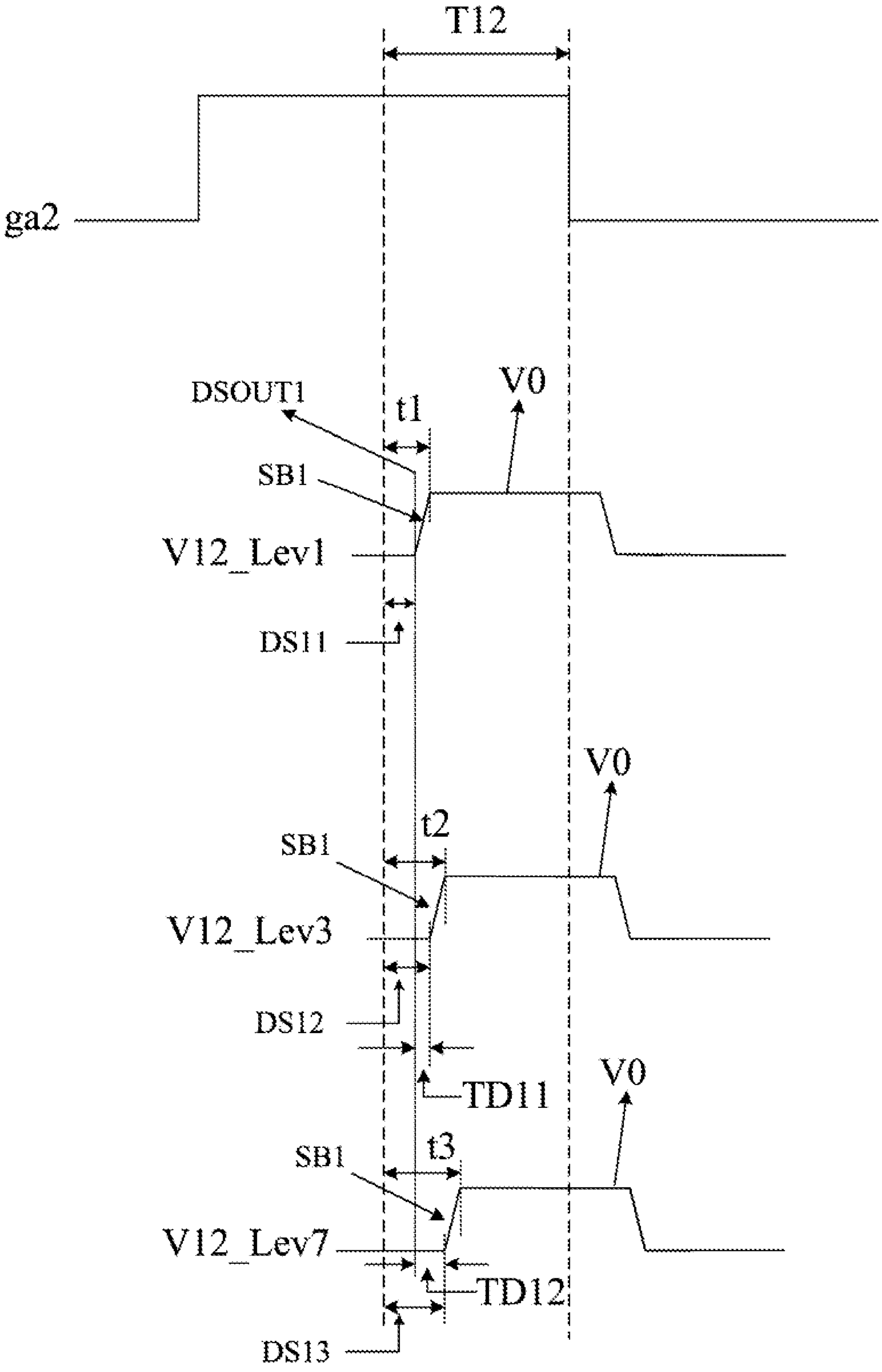
FIG. 10 is a signal timing diagram according to some other embodiments of the present disclosure.

In some other embodiments of the present disclosure, the step of loading the data voltage onto the data line includes: adjust a second reference output time of the data voltage according to the target rate level, to obtain a second target output time. The data voltage is loaded onto the data line according to the second target output time, to adjust the time interval. The second target output time is a time when the data voltage starts to be loaded onto the data line. The second target output times corresponding to different rate levels are different, and as the rate level increases, the corresponding second target output time is later. In this way, the data voltage may be loaded onto the data line according to the second target output time corresponding to the target rate level, to change the time interval. Illustratively, a second target output time corresponding to the rate level Lev7 is later than a second target output time corresponding to the rate level Lev6, the second target output time corresponding to the rate level Lev6 is later than a second target output time corresponding to the rate level Lev5, the second target output time corresponding to the rate level Lev5 is later than a second target output time corresponding to the rate level Lev4, . . . , and the second target output time corresponding to the rate level Lev2 is later than a second target output time corresponding to the rate level Lev1. For example, in conjunction with FIG. 10, V12_Lev1 represents a data voltage charged into the data line DA1 in the display frame corresponding to the rate level Lev1, V12_Lev3 represents a data voltage charged into the data line DA1 in the display frame corresponding to the rate level Lev3, and V12_Lev7 represents a data voltage charged into the data line DA1 in the display frame corresponding to the rate level Lev7. When the second target output time corresponding to the rate level Lev7 is later than the second target output time corresponding to the rate level Lev3, a time when the data line DA1 is charged with the maximum value V0 of the data voltage V12_Lev7 at the rate level Lev7 is later than a time when the data line DA1 is charged with the maximum value V0 of the data voltage V12_Lev3 at the rate level Lev3, such that a time when the red sub-pixel R12 is charged with the maximum value V0 of the data voltage V12_Lev7 at the rate level Lev7 is later than a time when the red sub-pixel R12 is charged with the maximum value V0 of the data voltage V12_Lev3 at the rate level Lev3. When the second target output time corresponding to the rate level Lev3 is later than the second target output time corresponding to the rate level Lev1, a time when the data line DA1 is charged with the maximum value V0 of the data voltage V12_Lev3 at the rate level Lev3 is later than a time when the data line DA1 is charged with the maximum value V0 of the data voltage V12_Lev1 at the rate level Lev1, such that a time when the red sub-pixel R12 is charged with the maximum value V0 of the data voltage V12_Lev3 at the rate level Lev3 is later than a time when the red sub-pixel R12 is charged with the maximum value V0 of the data voltage V12_Lev1 at the rate level Lev1.

In some examples, the second reference output time is an output time corresponding to the set rate level. The step of adjusting a second reference output time of the data voltage according to the target rate level, to obtain a second target output time includes: when the set rate level is a minimum rate level and the target rate level is greater than the minimum rate level, delay the second reference output time by a first data adjustment time period, to obtain the second target output time. As the rate level increases, the corresponding first data adjustment time period increases. Illustratively, in conjunction with FIG. 10, the second reference output time is an output time DSOUT1 of the data voltage V12_Lev1 corresponding to the rate level Lev1, and an output waiting time period DS11 is provided between the output time DSOUT1 and the start moment of the data charging phase T12. When the target rate level is the rate level Lev1, the output time DSOUT1 needs no adjustment, and the data voltage V12_Lev1 may be output directly according to the output time DSOUT1, such that the output time of the data voltage V12_Lev1 is DSOUT1 and the output waiting time period is DS11. When the target rate level is the rate level Lev3, the output time DSOUT1 is delayed by the first data adjustment time period TD11, and then the second target output time corresponding to the rate level Lev3 is obtained, such that the output time of the data voltage V12_Lev3 is delayed by TD11 based on the DSOUT1, and the output waiting time period is DS12. When the target rate level is the rate level Lev7, the output time DSOUT1 is delayed by the first data adjustment time period TD12, and then the second target output time corresponding to the rate level Lev7 is obtained, such that the output time of the data voltage V12_Lev7 is delayed by TD12 based on the DSOUT1, and the output waiting time period is DS13. Moreover, TD12>TD11.

Figure 11:
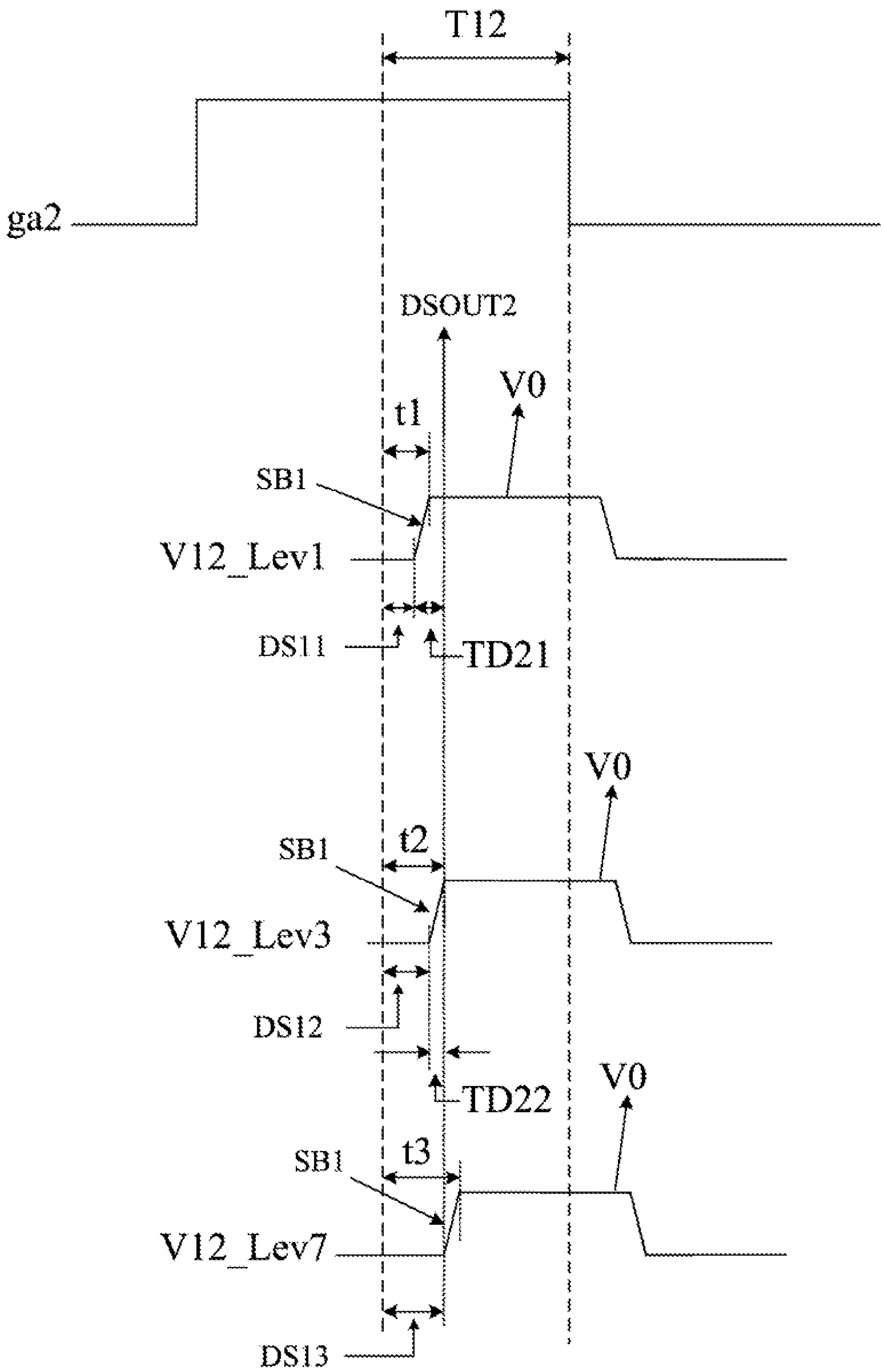
FIG. 11 is a signal timing diagram according to some other embodiments of the present disclosure.

In some other examples, the second reference output time is an output time corresponding to the set rate level. The step of adjusting a second reference output time of the data voltage according to the target rate level, to obtain a second target output time includes: when the set rate level is a maximum rate level and the target rate level is less than the maximum rate level, advance the second reference output time by a second data adjustment time period, to obtain the second target output time. As the rate level increases, the corresponding second data adjustment time period decreases. Illustratively, in conjunction with FIG. 11, the second reference output time is an output time DSOUT2 of the data voltage V12_Lev7 corresponding to the rate level Lev7, and an output waiting time period DS13 is provided between the output time DSOUT2 and the start moment of the data charging phase T12. When the target rate level is the rate level Lev7, the output time DSOUT2 needs no adjustment, and the data voltage V12_Lev7 may be output directly according to the output time DSOUT2, such that the output time of the data voltage V12_Lev7 is DSOUT2 and the output waiting time period is DS13. When the target rate level is the rate level Lev3, the output time DSOUT2 is advanced by the second data adjustment time period TD22, and then the second target output time corresponding to the rate level Lev3 is obtained, such that the output time of the data voltage V12_Lev3 is advanced by TD22 based on the DSOUT2, and the output waiting time period is DS12. When the target rate level is the rate level Lev1, the output time DSOUT2 is advanced by the second data adjustment time period TD21, and then the second target output time corresponding to the rate level Lev1 is obtained, such that the output time of the data voltage V12_Lev1 is advanced by TD21 based on the DSOUT2, and the output waiting time period is DS11. Moreover, TD21>TD22.

Figure 12:
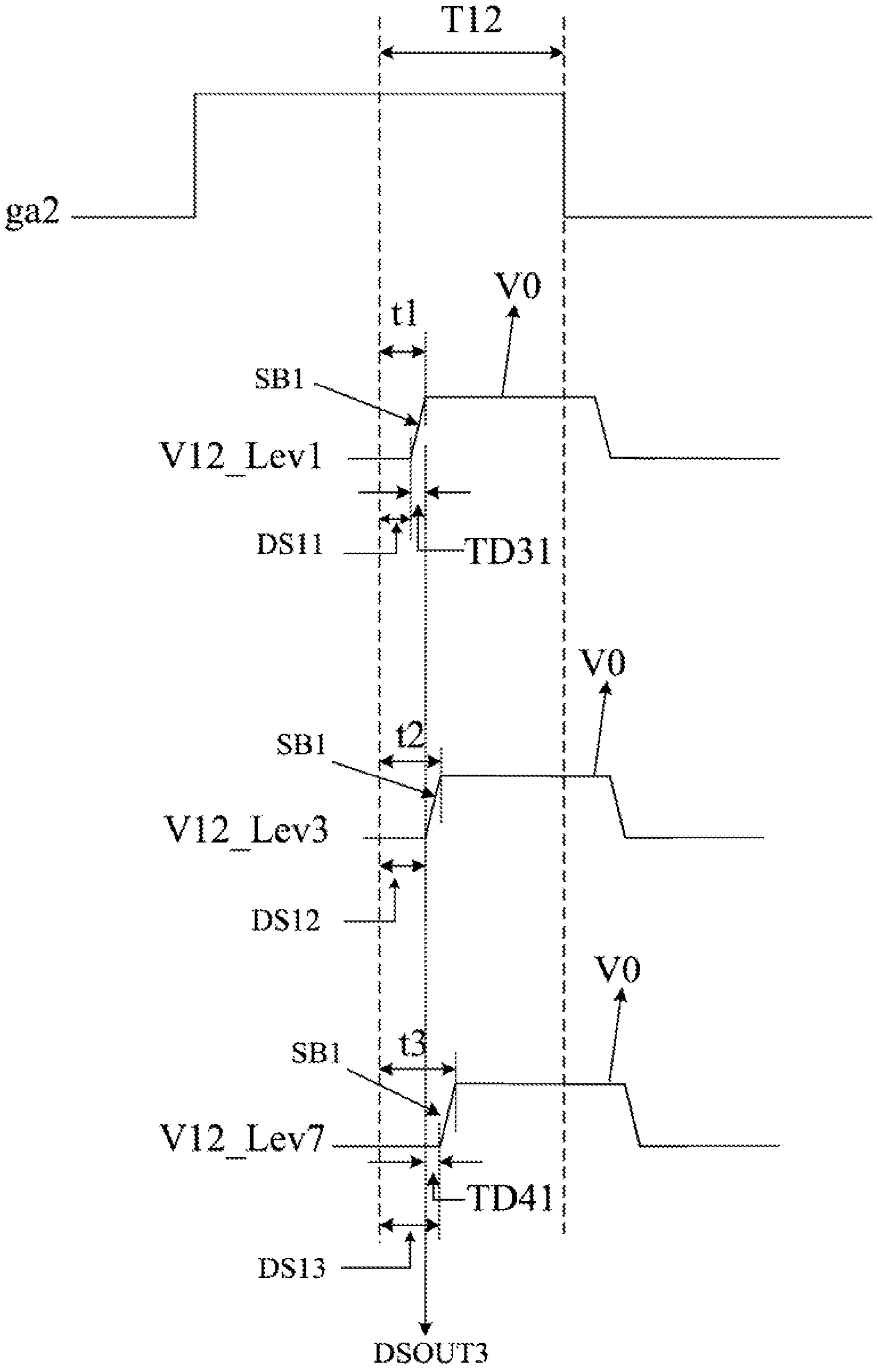
FIG. 12 is a signal timing diagram according to some other embodiments of the present disclosure.

In yet some other examples, the second reference output time is an output time corresponding to the set rate level. The step of adjusting a second reference output time of the data voltage according to the target rate level, to obtain a second target output time includes: when the set rate level is greater than the minimum rate level and less than the maximum rate level and the target rate level is less than the set rate level, advance the second reference output time by a third data adjustment time period, to obtain the second target output time; and when the set rate level is greater than the minimum rate level and less than the maximum rate level and the target rate level is greater than the set rate level, delay the second reference output time by a fourth data adjustment time period, to obtain the second target output time. As the rate level increases, the corresponding third data adjustment time period decreases, and the corresponding fourth data adjustment time period increases. Illustratively, in conjunction with FIG. 12, the set rate level may be the rate level Lev3 (other rate levels may be used, which is not limited herein), the second reference output time is an output time DSOUT3 of the data voltage V12_Lev3 corresponding to the rate level Lev3, and an output waiting time period DS12 is provided between the output time DSOUT3 and the start moment of the data charging phase T12. When the target rate level is the rate level Lev3, the output time DSOUT3 needs no adjustment, and the data voltage V12_Lev3 may be output directly according to the output time DSOUT3, such that the output time of the data voltage V12_Lev3 is DSOUT3 and the output waiting time period is DS12. When the target rate level is the rate level Lev7, the output time DSOUT3 is delayed by the fourth data adjustment time period TD41, and then the second target output time corresponding to the rate level Lev7 is obtained, such that the output time of the data voltage V12_Lev7 is delayed by TD41 based on the DSOUT3, and the output waiting time period is DS13. When the target rate level is the rate level Lev1, the output time DSOUT3 is advanced by the third data adjustment time period TD31, and then the second target output time corresponding to the rate level Lev1 is obtained, such that the output time of the data voltage V12_Lev1 is advanced by TD31 based on the DSOUT3, and the output waiting time period is DS11.

Figure 13:
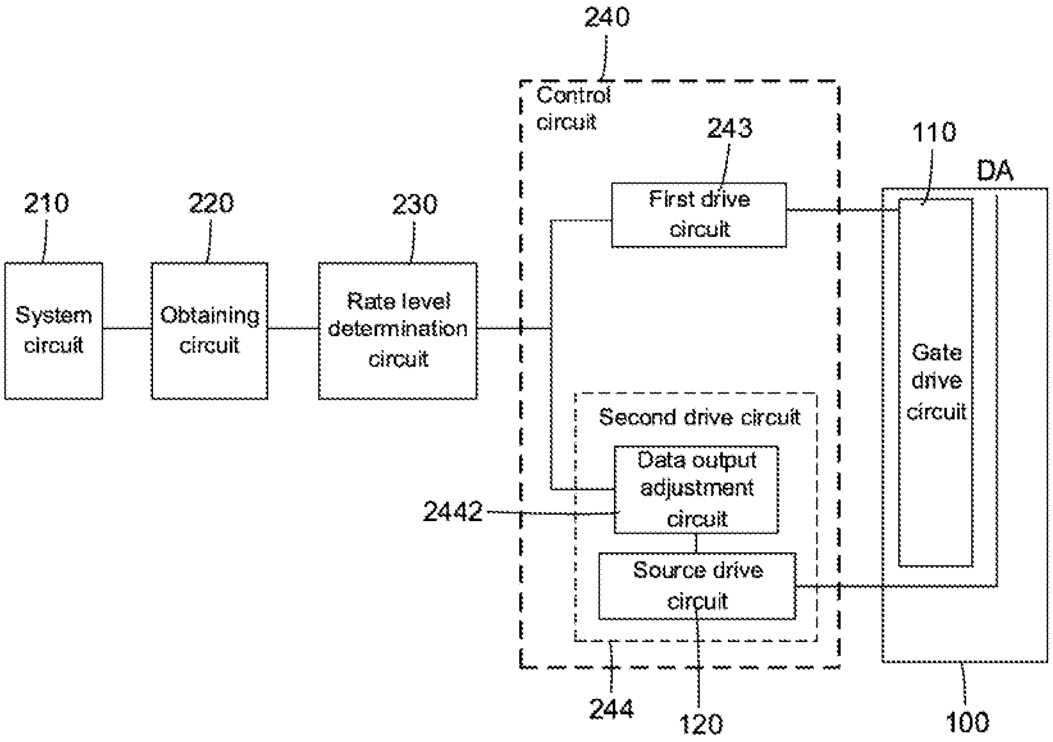
FIG. 13 is a schematic structure diagram of a drive device according to some other embodiments of the present disclosure.

Illustratively, as shown in FIG. 13, the second drive circuit 244 may include a data output adjustment circuit 2442 and a source drive circuit 120. The data output adjustment circuit 2442 may adjust the second reference output time of the data voltage according to the target rate level to obtain a second target output time, and send the display data and the obtained second target output time to the source drive circuit 120. According to the second target output time, the source drive circuit 120 loads a data voltage corresponding to the gray scale value of each display data on the data line, so as to load the data voltage onto the data line by using the second target output time.

Figure 14:
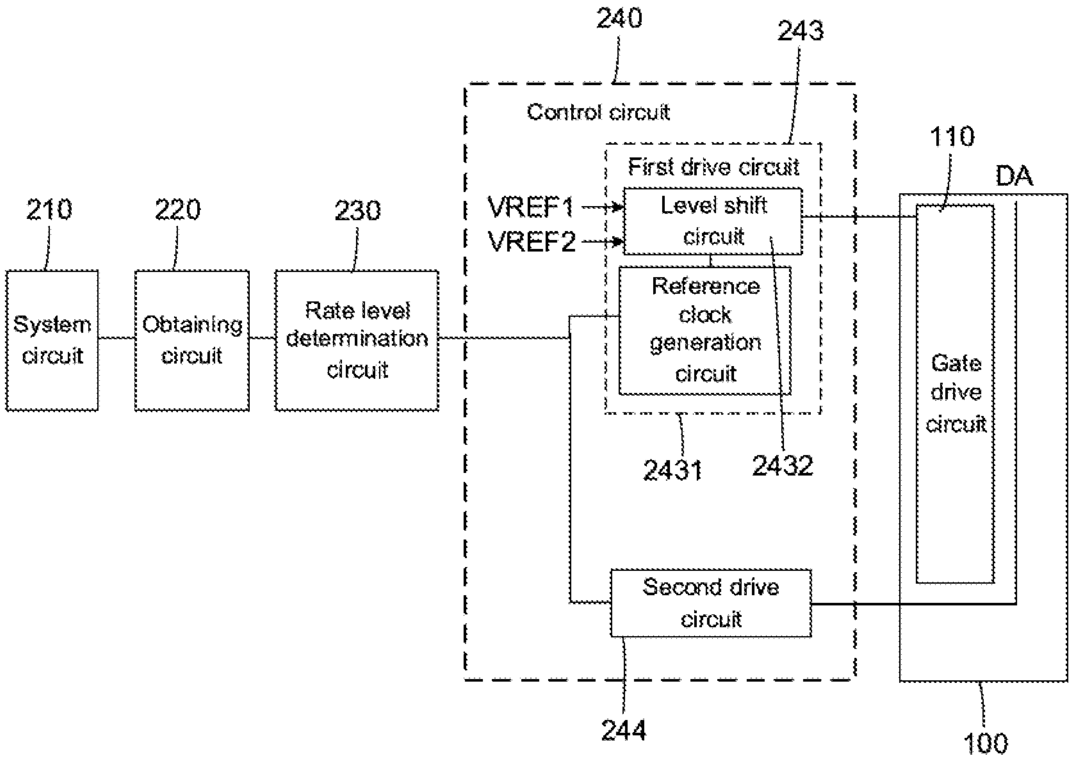
FIG. 14 is a schematic structure diagram of a drive device according to some other embodiments of the present disclosure.
Figure 15:
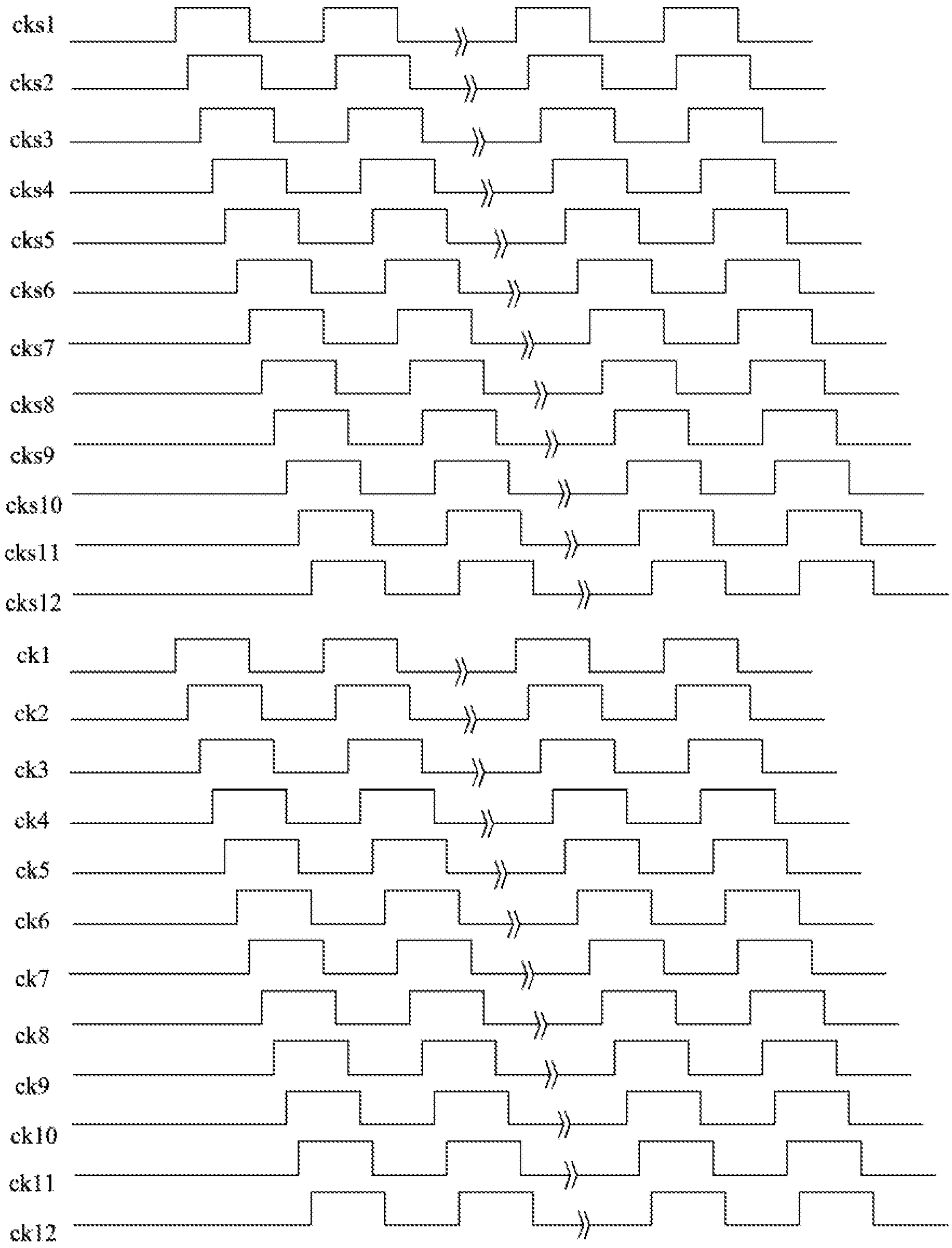
FIG. 15 is a signal timing diagram according to some other embodiments of the present disclosure.

In some embodiments of the present disclosure, as shown in FIG. 14, the first drive circuit 243 may include a reference clock generation circuit 2431 and a level shift circuit 2432. The reference clock generation circuit 2431 is configured to generate a reference clock control signal according to the target rate level, and send the generated reference clock control signal to the level shift circuit 2432. The level shift circuit 2432 is configured to receive a first voltage reference VREF1 and a second voltage reference VREF2 (the second voltage reference VREF2 is less than the first voltage reference VREF1), generate a clock signal according to the received reference clock control signal, the first voltage reference VREF1 and the second voltage reference VREF2, and send the generated clock signal to the gate drive circuit 110. The gate drive circuit 110 outputs a gate scanning signal according to the received clock signal. The clock signals input to the gate drive circuit 110 corresponds one-to-one to the reference clock control signals, and the clock signal input to the gate drive circuit 110 has the same timing sequence as the corresponding reference clock control signals. The first voltage reference VREF1 is used for generating a high-level voltage of the clock signal, that is, the high-level voltage of the clock signal is the first voltage reference VREF1. The second voltage reference VREF2 is used for generating a low-level voltage of the clock signal, that is, the low-level voltage of the clock signal is the second voltage reference VREF2. In this way, the high-level voltage of the gate scanning signal is also the first voltage reference VREF1, and the low-level voltage is also the second voltage reference VREF2. Illustratively, in conjunction with FIG. 15, the level shift circuit 2432 generates the clock signal ck1 according to the timing of the reference clock control signal cks1, the first voltage reference VREF1 and the second voltage reference VREF2. The level shift circuit 2432 generates the clock signal ck2 according to the timing of the reference clock control signal cks2, the first voltage reference VREF1 and the second voltage reference VREF2. The level shift circuit 2432 generates the clock signal ck3 according to the timing of the reference clock control signal cks3, the first voltage reference VREF1 and the second voltage reference VREF2 . . . . The level shift circuit 2432 generates the clock signal ck12 according to the timing of the reference clock control signal cks12, the first voltage reference VREF1 and the second voltage reference VREF2.

In some embodiments of the present disclosure, a start moment of the slew edge when the data line starts to load the data voltage is after the start moment of the data charging phase corresponding to the sub-pixels charged with the data voltage, and a conversion time period is provided between the start moment of the slew edge when the data line starts to load the data voltage and the start moment of the data charging phase corresponding to the sub-pixels charged with the data voltage. The step of controlling the display panel to load the gate scanning signal onto the gate includes: control the display panel to load the gate scanning signal onto the gate according to the conversion time period corresponding to the target rate level, to adjust the time interval. As the rate level increases, the corresponding conversion time period increases. Illustratively, a conversion time period corresponding to the rate level Lev7 is longer than a conversion time period corresponding to the rate level Lev6, the conversion time period corresponding to the rate level Lev6 is longer than a conversion time period corresponding to the rate level Lev5, the conversion time period corresponding to the rate level Lev5 is longer than a conversion time period corresponding to the rate level Lev4, . . . , and the conversion time period corresponding to the rate level Lev2 is longer than a conversion time period corresponding to the rate level Lev1. In this way, a time when the sub-pixel in a display frame corresponding to a higher rate level is charged with a maximum value of the target data voltage of a corresponding gray scale value is later than a time when the sub-pixel in a display frame corresponding to a lower rate level is charged with a maximum value of the data voltage, which is equivalent to reducing a charge rate of the sub-pixel in the display frame corresponding to the higher rate level and increasing a charge rate of the sub-pixel in the display frame corresponding to the lower rate level. Furthermore, since the current leakage in the blanking time phase in the display frame corresponding to the lower rate level is greater than the current leakage in the blanking time phase in the display frame corresponding to the higher rate level, and reducing a charge rate of the sub-pixel in the display frame corresponding to the higher rate level and increasing a charge rate of the sub-pixel in the display frame corresponding to the lower rate level are achieved, a charge rate difference of the sub-pixels in the display frames with different refresh rates is reduced as much as possible, and the problem of poor display of the display panel is alleviated.

Figure 16:
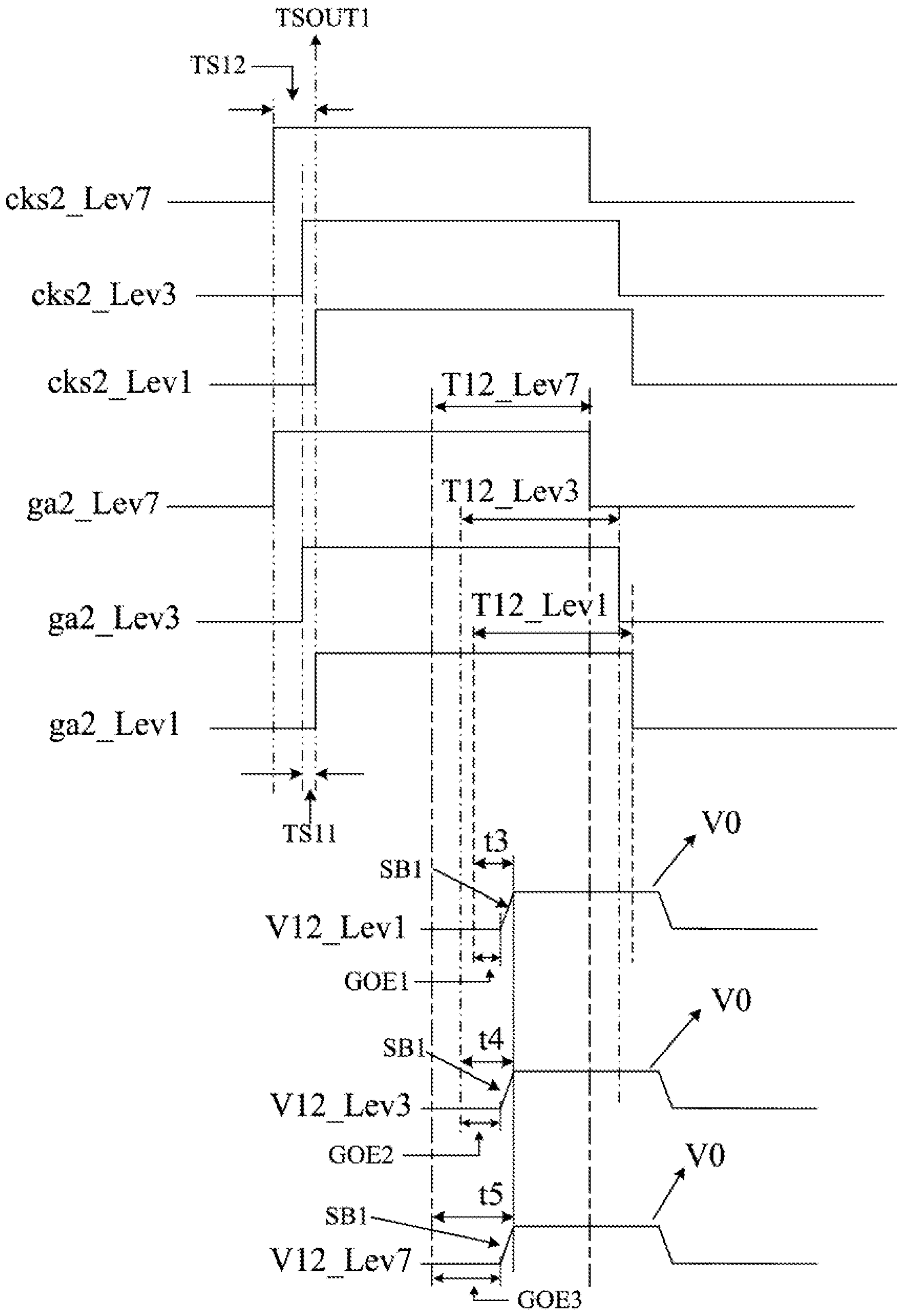
FIG. 16 is a signal timing diagram according to some other embodiments of the present disclosure.

Illustratively, in conjunction with FIGS. 3 and 16, with the red sub-pixel R12, the data line DA1 and the gate line GA2 as an example, V12_Lev1 represents a data voltage charged into the data line DA1 in the display frame corresponding to the rate level Lev1, V12_Lev3 represents a data voltage charged into the data line DA1 in the display frame corresponding to the rate level Lev3, and V12_Lev7 represents a data voltage charged into the data line DA1 in a display frame corresponding to the rate level Lev7. ga2_Lev1 represents a gate scanning signal loaded onto the gate line GA2 in the display frame corresponding to the rate level Lev1, ga2_Lev3 represents a gate scanning signal loaded onto the gate line GA2 in the display frame corresponding to the rate level Lev3, and ga2_Lev7 represents a gate scanning signal loaded onto the gate line GA2 in the display frame corresponding to the rate level Lev7. T12_Lev1 represents a data charging phase in the display frame corresponding to the rate level Lev1, T12_Lev3 represents a data charging phase in the display frame corresponding to the rate level Lev3, and T12_Lev7 represents a data charging phase in the display frame corresponding to the rate level Lev7. With the reference clock control signal cks2 as an example, cks2_Lev1 represents a reference clock control signal when the reference clock control signal cks2 corresponds to the rate level Lev1, cks2_Lev3 represents a reference clock control signal when the reference clock control signal cks2 corresponds to the rate level Lev3, and cks2_Lev7 represents a reference clock control signal when the reference clock control signal cks2 corresponds to the rate level Lev7. When the target rate level is the rate level Lev1, the conversion time period is GOE1. When the target rate level is the rate level Lev3, the conversion time period is GOE2. When the target rate level is the rate level Lev7, the conversion time period is GOE3. Moreover, GOE3>GOE2>GOE1.

In some embodiments of the present disclosure, the step of controlling the display panel to load the gate scanning signal onto the gate according to the conversion time period corresponding to the target rate level includes: adjust a first reference output time of a set level of a reference clock control signal according to the target rate level, to obtain a first target output time. The set level of the reference clock control signal is output according to the first target output time, and the display panel is controlled to load the gate scanning signal onto the gate. The first target output times corresponding to different rate levels are different, and as the rate level increases, the corresponding first target output time is earlier. Illustratively, a first target output time corresponding to the rate level Lev7 is earlier than a first target output time corresponding to the rate level Lev6, the first target output time corresponding to the rate level Lev6 is earlier than a first target output time corresponding to the rate level Lev5, the first target output time corresponding to the rate level Lev5 is earlier than a first target output time corresponding to the rate level Lev4, . . . , and the first target output time corresponding to the rate level Lev2 is earlier than a first target output time corresponding to the rate level Lev1. In this way, by adjusting the output time of the reference clock control signal, the output time of the clock signal input to the gate drive circuit may be adjusted, so as to adjust the output time of the active level of the gate scanning signal, such that a time when the sub-pixel in the display frame corresponding to the higher rate level are charged with the maximum value of the target data voltage of a corresponding gray scale value is later than a time when the sub-pixel in the display frame corresponding to the lower rate level are charged with the maximum value of the target data voltage of a corresponding gray level value.

In some examples, the first reference output time is an output time corresponding to the set rate level. The step of adjusting an output time of a set level of a reference clock control signal according to the target rate level, to obtain a first target output time includes: when the set rate level is a minimum rate level and the target rate level is greater than the minimum rate level, advance the first reference output time by a first clock adjustment time period, to obtain the first target output time. As the rate level increases, the corresponding first clock adjustment time period increases. Illustratively, the set level may be an active level and may also be an inactive level. In the following, the set level is set to be an active level, and the active level is set to be a high level. In conjunction with FIG. 16, with the reference clock control signal cks2 as an example, cks2_Lev1 represents a reference clock control signal when the reference clock control signal cks2 corresponds to the rate level Lev1, cks2_Lev3 represents a reference clock control signal when the reference clock control signal cks2 corresponds to the rate level Lev3, and cks2_Lev7 represents a reference clock control signal when the reference clock control signal cks2 corresponds to the rate level Lev7. The first reference output time is an output time TSOUT1 of a high level of the reference clock control signal cks2_Lev1 corresponding to the rate level Lev1. When the target rate level is the rate level Lev1, the output time TSOUT1 needs no adjustment, and the reference clock control signal cks2_Lev1 may be output directly according to the output time TSOUT1, such that the output time of the signal ga2_Lev1 may be TSOUT1. When the target rate level is the rate level Lev3, the output time TSOUT1 is advanced by the first clock adjustment time period TS11, and then a first target output time corresponding to the rate level Lev3 is obtained, such that the output time of the signal ga2_Lev3 may be advanced by TS11 based on the TSOUT1. When the target rate level is the rate level Lev7, the output time TSOUT1 is advanced by the first clock adjustment time period TS12, and then a first target output time corresponding to the rate level Lev7 is obtained, such that the output time of the signal ga2_Lev7 may be advanced by TS12 based on the TSOUT1. Moreover, TS12>TS11.

Figure 17:
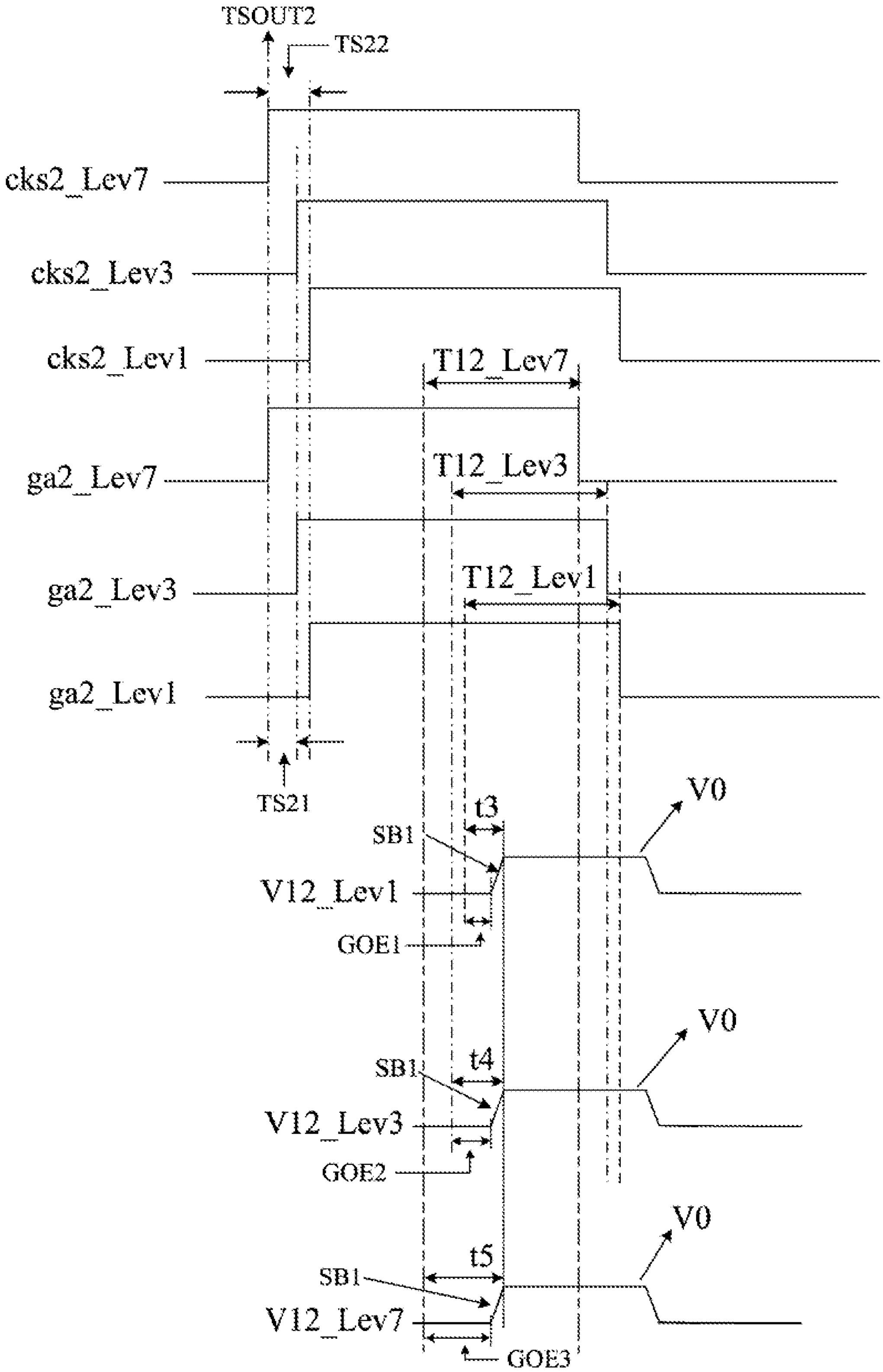
FIG. 17 is a signal timing diagram according to some other embodiments of the present disclosure.

In some other examples, the first reference output time is an output time corresponding to the set rate level. The step of adjusting an output time of a set level of a reference clock control signal according to the target rate level, to obtain a first target output time includes: when the set rate level is a maximum rate level and the target rate level is less than the maximum rate level, delay the first reference output time by a second clock adjustment time period, to obtain the first target output time. As the rate level increases, the corresponding second clock adjustment time period decreases. Illustratively, the set level may be an active level and may also be an inactive level. In the following, the set level is set to be an active level, and the active level is set to be a high level. In conjunction with FIG. 17, with the reference clock control signal cks2 as an example, cks2_Lev1 represents a reference clock control signal when the reference clock control signal cks2 corresponds to the rate level Lev1, cks2_Lev3 represents a reference clock control signal when the reference clock control signal cks2 corresponds to the rate level Lev3, and cks2_Lev7 represents a reference clock control signal when the reference clock control signal cks2 corresponds to the rate level Lev7. ga2_Lev1 represents a gate scanning signal transmitted when the gate line GA2 corresponds to the rate level Lev1, ga2_Lev3 represents a gate scanning signal transmitted when the gate line GA2 corresponds to the rate level Lev3, and ga2_Lev7 represents a gate scanning signal transmitted when the gate line GA2 corresponds to the rate level Lev7. V12_Lev1 represents a data voltage charged into the data line DA1 in the display frame corresponding to the rate level Lev1, V12_Lev3 represents a data voltage charged into the data line DA1 in the display frame corresponding to the rate level Lev3, and V12_Lev7 represents a data voltage charged into the data line DA1 in the display frame corresponding to the rate level Lev7. The first reference output time is an output time TSOUT2 of a high level of the reference clock control signal cks2_Lev7 corresponding to the rate level Lev7. When the target rate level is the rate level Lev7, the output time TSOUT2 needs no adjustment, and the reference clock control signal cks2_Lev7 may be output directly according to the output time TSOUT2, such that the output time of the signal ga2_Lev7 may be TSOUT2. When the target rate level is the rate level Lev3, the output time TSOUT2 is delayed by the second clock adjustment time period TS21, and then a first target output time corresponding to the rate level Lev3 is obtained, such that the output time of the signal ga2_Lev3 may be delayed by TS21 based on the TSOUT2. When the target rate level is the rate level Lev1, the output time TSOUT2 is delayed by the second clock adjustment time period TS22, and then a first target output time corresponding to the rate level Lev1 is obtained, such that the output time of the signal ga2_Lev1 may be delayed by TS22 based on the TSOUT2. Moreover, TS22>TS21.

Figure 18:
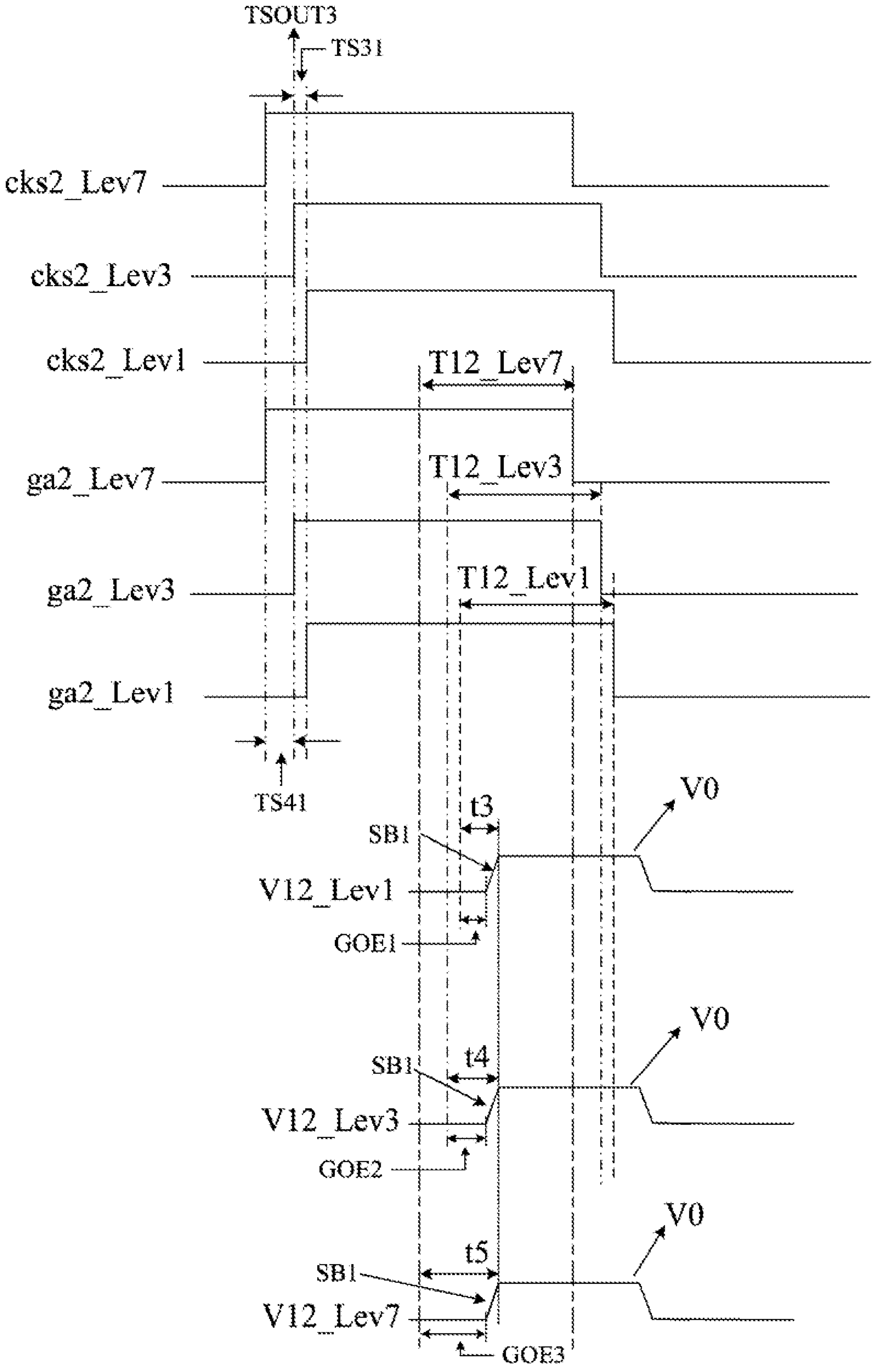
FIG. 18 is a signal timing diagram according to some other embodiments of the present disclosure.

In still some other examples, the step of adjusting an output time of a set level of a reference clock control signal according to the target rate level, to obtain a first target output time includes: when the set rate level is greater than the minimum rate level and less than the maximum rate level and the target rate level is less than the set rate level, delay the first reference output time by a third clock adjustment time period, to obtain the first target output time; and when the set rate level is greater than the minimum rate level and less than the maximum rate level and the target rate level is greater than the set rate level, advance the first reference output time by a fourth clock adjustment time period, to obtain the first target output time. As the rate level increases, the corresponding third data adjustment time period decreases, and the corresponding fourth data adjustment time period increases. Illustratively, the set level may be an active level and may also be an inactive level. In the following, the set level is set to be an active level, and the active level is set to be a high level. In conjunction with FIG. 18, with the reference clock control signal cks2 as an example, cks2_Lev1 represents a reference clock control signal when the reference clock control signal cks2 corresponds to the rate level Lev1, cks2_Lev3 represents a reference clock control signal when the reference clock control signal cks2 corresponds to the rate level Lev3, and cks2_Lev7 represents a reference clock control signal when the reference clock control signal cks2 corresponds to the rate level Lev7. The set rate level may be the rate level Lev3 (alternatively, other rate levels may be used as the set rate level, which is not limited herein), the first reference output time is an output time TSOUT3 of a high level of the reference clock control signal cks2_Lev3 corresponding to the rate level Lev3. When the target rate level is the rate level Lev3, the output time TSOUT3 needs no adjustment, and the reference clock control signal cks2_Lev3 may be output directly according to the output time TSOUT3, such that the output time of the signal ga2_Lev3 may be TSOUT3. When the target rate level is the rate level Lev7, the output time TSOUT3 is advanced by the fourth clock adjustment time period TS41, and then a first target output time corresponding to the rate level Lev7 is obtained, such that the output time of the signal ga2_Lev7 may be advanced by TS41 based on the TSOUT3. When the target rate level is the rate level Lev1, the output time TSOUT3 is delayed by the third clock adjustment time period TS31, and then a first target output time corresponding to the rate level Lev1 is obtained, such that the output time of the signal ga2_Lev1 may be advanced by TS31 based on the TSOUT3.

Embodiments of the present disclosure provide some other drive methods for a display panel, which are variations of the implementation modes of the embodiments above. Herein, only the differences between any other embodiment and the above embodiments will be described, and the same portion will not be repeated herein.

Figure 19A:
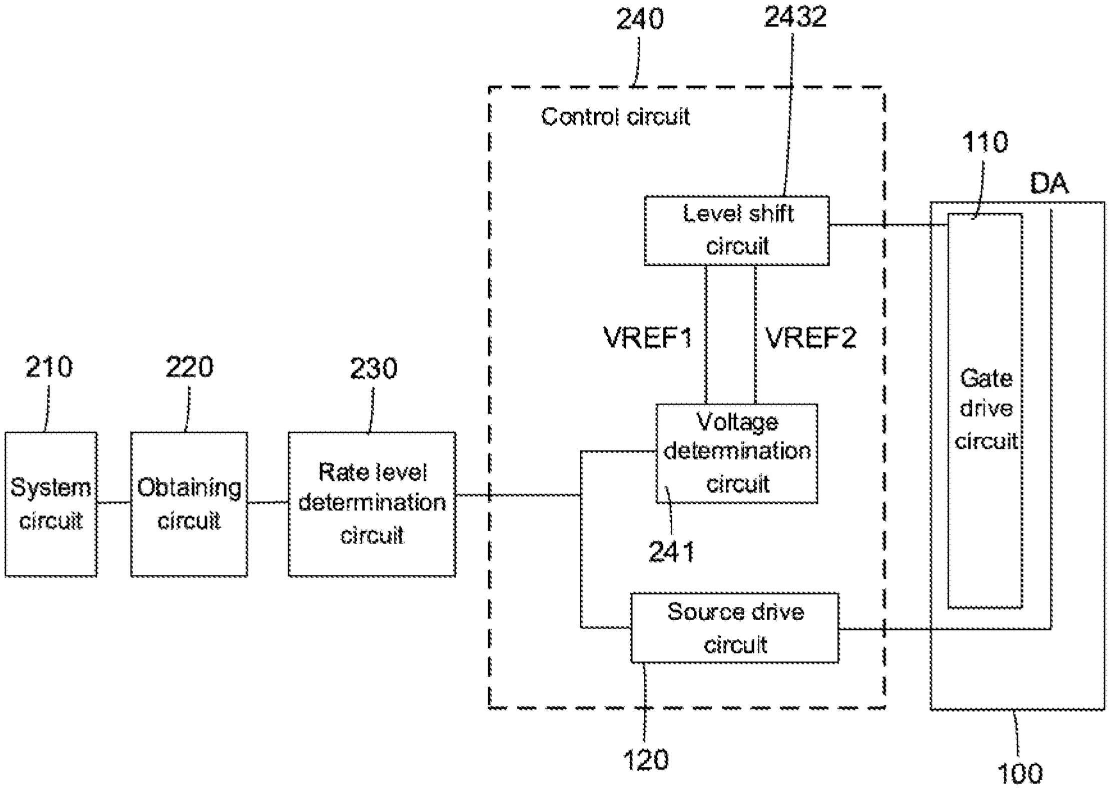
FIG. 19A is a schematic structure diagram of a drive device according to some other embodiments of the present disclosure.

In some embodiments of the present disclosure, as shown in FIG. 19A, the control circuit may include a voltage determination circuit 241, a level shift circuit 2432, and a source drive circuit 120. The voltage determination circuit 241 is configured to determine, according to the target rate level, a target voltage of a target level that generates a gate scanning signal. The level shift circuit 2432 is configured to control the display panel 100 to load the gate scanning signal onto a gate according to the target voltage. The source drive circuit 120 is configured to load the data voltage onto a data line according to the display data so as to charge the sub-pixels in the display panel 100 with the data voltage. Illustratively, the level shift circuit 2432 is configured to receive the target voltage of the active level and the target voltage of the inactive level, generate a clock signal according to the received reference clock control signal, the target voltage of the active level and the target voltage of the inactive level, and send the generated clock signal to the gate drive circuit 110. The gate drive circuit 110 outputs a gate scanning signal according to the received clock signal. The clock signals input to the gate drive circuit 110 corresponds one-to-one to the reference clock control signals, and the clock signal input to the gate drive circuit 110 has the same timing sequence as the corresponding reference clock control signal. The set level may include an active level and an inactive level. The target voltage of the active level is used for generating a voltage of the active level of the clock signal. The target voltage of the inactive level is used for generating a voltage of the inactive level of the clock signal. In this way, a voltage of an active level of the gate scanning signal is also the target voltage of the active level, and a voltage of an inactive level is also the target voltage of the inactive level. Illustratively, in conjunction with FIG. 15, the clock signal ck1 corresponds to the reference clock control signal cks1, the clock signal ck2 corresponds to the reference clock control signal cks2, the clock signal ck3 corresponds to the reference clock control signal cks3, . . . , and the clock signal ck12 corresponds to the reference clock control signal cks12. Moreover, the level shift circuit 2432 may output the clock signal ck1 according to the reference clock control signal cks1, output the clock signal ck2 according to the reference clock control signal cks2, output the clock signal ck3 according to the reference clock control signal cks3, . . . , and output the clock signal ck12 according to the reference clock control signal cks12.

In some embodiments of the present disclosure, step S30 of controlling sub-pixels in the display panel to be charged with a data voltage according to the target rate level and the display data may include: determine, according to the target rate level, a target voltage of a target level that generates a gate scanning signal; and control the display panel to load the gate scanning signal onto a gate according to the target voltage, and load the data voltage onto a data line according to the display data, so as to charge the sub-pixels in the display panel with the data voltage. Target voltages, generating the gate scanning signals, corresponding to different rate levels are different. In this way, by controlling the target voltages of the target levels of the gate scanning signals corresponding to different rate levels to be different, the degrees of turning on and turning off of the transistors in the display frames of different rate levels may be different, such that a charge rate difference of the sub-pixels in the display frames with different refresh rates is reduced as much as possible, and the problem of poor display of the display panel is alleviated.

In some examples, the target level may include an active level. The step of determining, according to the target rate level, a target voltage of a target level that generates a gate scanning signal includes: adjust, according to the target rate level, a first reference voltage of the active level that generates the gate scanning signal, to obtain the target voltage of the active level. The step of controlling the display panel to load the gate scanning signal onto a gate according to the target voltage includes: control the display panel to load the gate scanning signal onto the gate according to the obtained target voltage of the active level. Target voltages of active levels corresponding to different rate levels are different. Illustratively, under the condition that the active level is a high level, as the rate level increases, the corresponding target voltage of the high level decreases. Under the condition that the active level is a low level, as the rate level increases, the corresponding target voltage of the low level increases. In this way, as the rate level increases, the degree of turning on of the transistor in the sub-pixel decreases, so as to reduce a charge rate of the sub-pixel in the display frame corresponding to the higher rate level and increase a charge rate of the sub-pixel in the display frame corresponding to the lower rate level, then a charge rate difference of the sub-pixels in the display frames with different refresh rates is reduced as much as possible, and the problem of poor display of the display panel is alleviated.

Figure 19B:
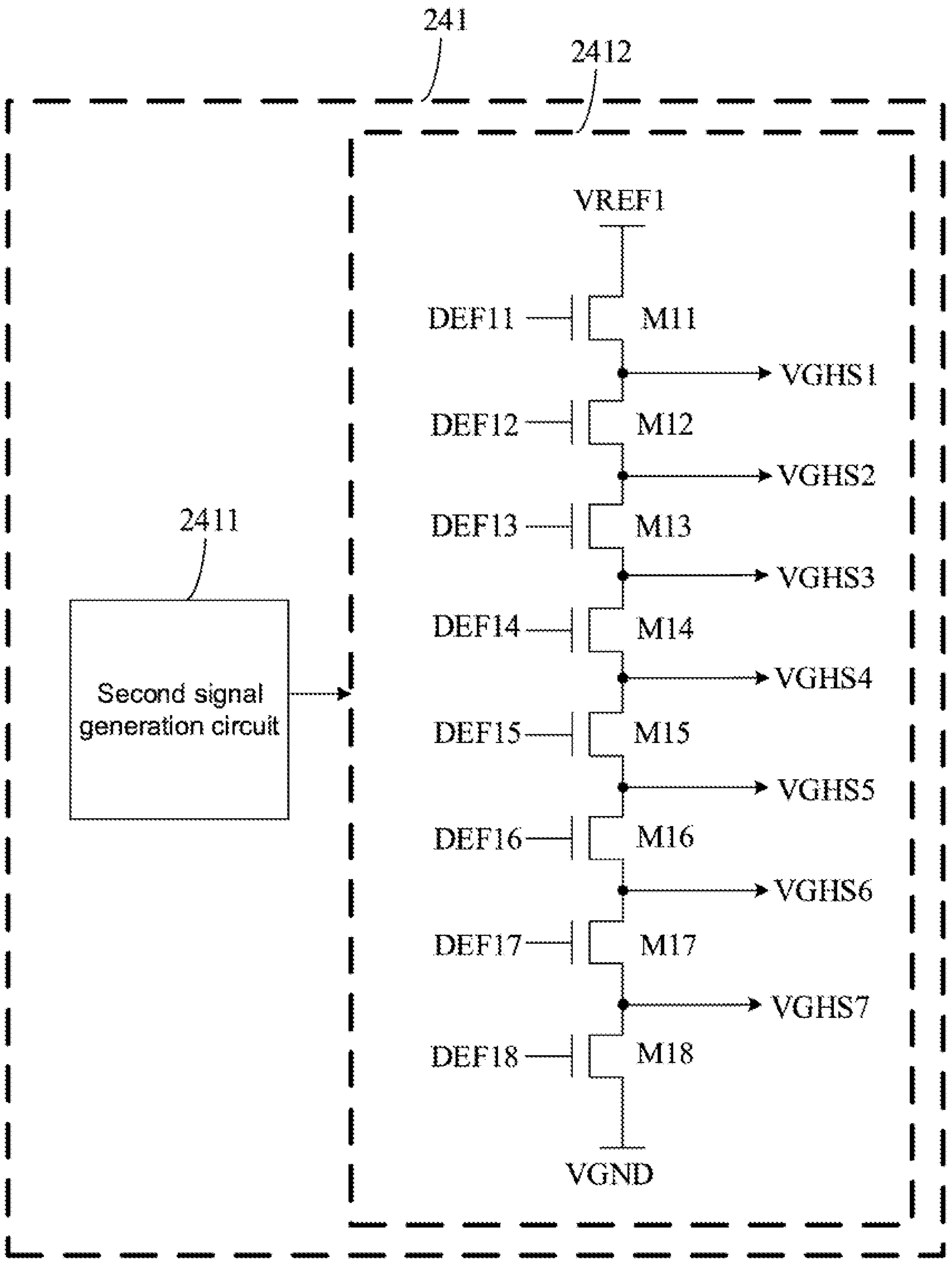
FIG. 19B is a schematic structure diagram of a first reference circuit according to some embodiments of the present disclosure.

Illustratively, as shown in FIG. 19B, the voltage determination circuit 241 may include a second signal generation circuit 2411 and a first reference circuit 2412. The second signal generation circuit 2411 may generate a first reference control signal in the form of a corresponding digital signal according to the target rate level, and send the generated first reference control signal to the first reference circuit 2412. The first reference circuit 2412 is configured to output a target voltage of a high level that generates a gate scanning signal according to the first reference control signal when the active level is the high level. For example, as shown in FIG. 19B, the first reference circuit 2412 includes a plurality of transistors M11-M18 (with seven refresh rate levels as an example). A gate of M11 receives a signal DEF11, a gate of M12 receives a signal DEF12, . . . , a gate of M18 receives a signal DEF18. A source of M11 receives a first voltage reference VREF1, a drain of M18 receives a grounding voltage VGND (the first voltage reference VREF1 is greater than the grounding voltage VGND), and the remaining transistors are successively connected in series. Each of the first reference control signals includes DEF11-DEF18, and at least one of the DEF11-DEF18 may be set to be different, to achieve different rate levels corresponding to different first reference control signals, so as to turn on different transistors to output different target voltages. For example, the first reference control signal corresponding to the refresh rate level Lev1 may control the transistor M11 to be turned on and the remaining transistors to be turned off, and then the first reference circuit 2412 outputs the target voltage VGHS1 of the high level corresponding to the refresh rate level Lev1. The first reference control signal corresponding to the refresh rate level Lev2 may control the transistors M11 and M12 to be turned on and the remaining transistors to be turned off, and then the first reference circuit 2412 outputs the target voltage VGHS2 of the high level corresponding to the refresh rate level Lev2. The first reference control signal corresponding to the refresh rate level Lev3 may control the transistors M11-M13 to be turned on and the remaining transistors to be turned off, and then the first reference circuit 2412 outputs the target voltage VGHS3 of the high level corresponding to the refresh rate level Lev3 . . . . The first reference control signal corresponding to the refresh rate level Lev7 may control the transistors M11-M17 to be turned on and the remaining transistors to be turned off, and then the first reference circuit 2412 outputs the target voltage VGHS7 of the high level corresponding to the refresh rate level Lev7. Moreover, VGHS1>VGHS2>VGHS3>VGHS4>VGHS5>VGHS6>VGHS7. It is to be noted that the transistors M11-M18 equivalently serve as resistors to divide a voltage between the first voltage reference VREF1 and the grounding voltage VGND, so as to obtain different target voltages.

Figure 20:
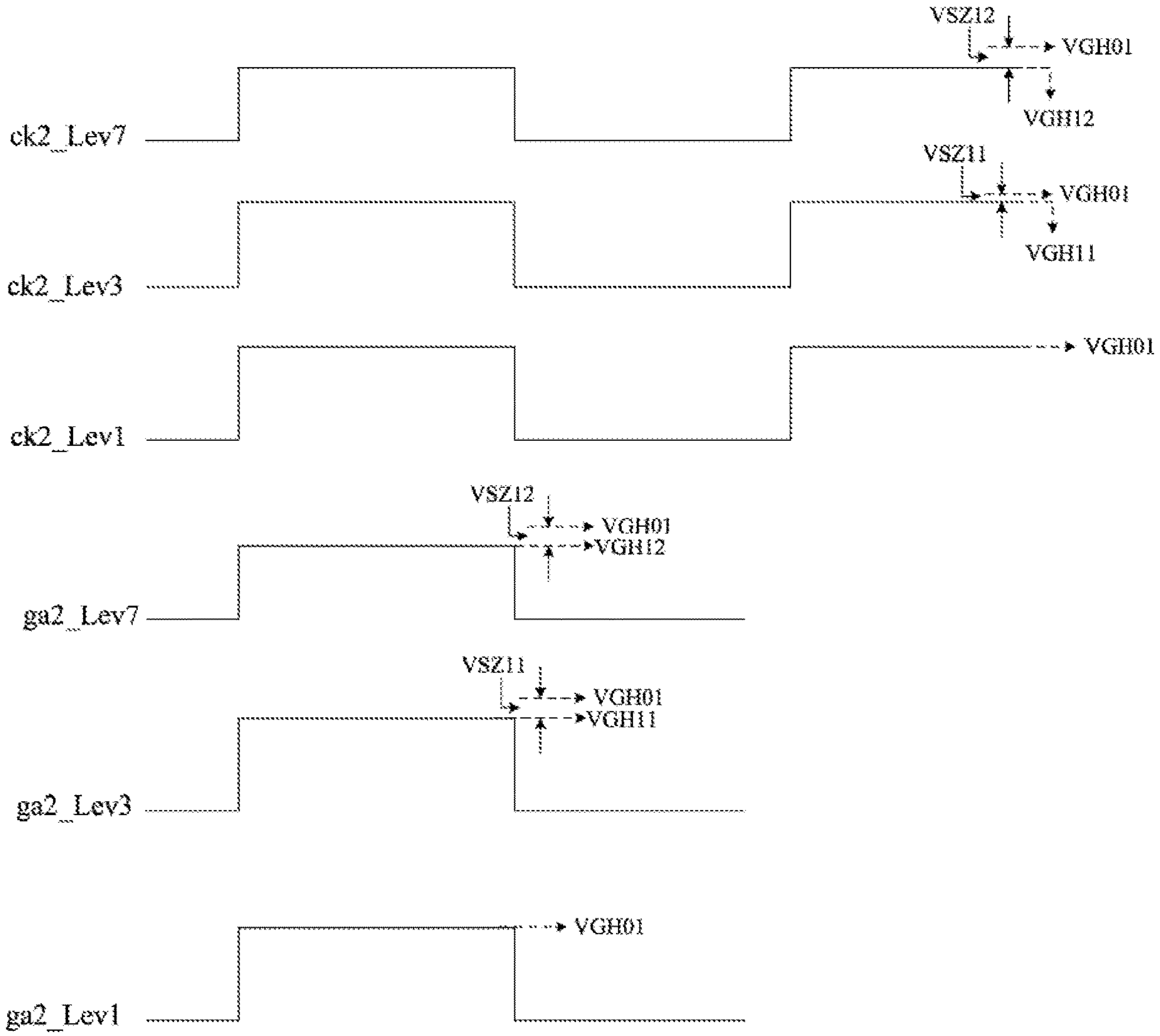
FIG. 20 is a signal timing diagram according to some other embodiments of the present disclosure.

Illustratively, the first reference voltage is a first reference voltage corresponding to a set rate level. When the active level is a high level, that is, the first voltage reference VREF1 is adjusted to be the target voltage, the high level of the clock signal output by the level shift circuit 2432 is the target voltage, and thus the voltage of the high level of the gate drive signal is the target voltage. The step of adjusting a first reference voltage of the active level that generates the gate scanning signal according to the target rate level, to obtain the target voltage of the active level includes: when the set rate level is a minimum rate level and the target rate level is greater than the minimum rate level, reduce the first reference voltage by a first active adjustment voltage, to obtain the target voltage of the active level. As the rate level increases, the corresponding first active adjustment voltage increases. Illustratively, in conjunction with FIG. 20, with the clock signal ck2 as an example, ck2_Lev1 represents a signal when the clock signal ck2 corresponds to the rate level Lev1, ck2_Lev3 represents a signal when the clock signal ck2 corresponds to the rate level Lev3, and ck2_Lev7 represents a clock signal when the clock signal ck2 corresponds to the rate level Lev7. ga2_Lev1 represents a gate scanning signal transmitted when the gate line GA2 corresponds to the rate level Lev1, ga2_Lev3 represents a gate scanning signal transmitted when the gate line GA2 corresponds to the rate level Lev3, and ga2_Lev7 represents a gate scanning signal transmitted when the gate line GA2 corresponds to the rate level Lev7. The first reference voltage is a first voltage reference VREF1 of a high level that corresponds to the rate level Lev1 and generates the clock signal cks2_Lev1, that is, a voltage VGH01 (the voltage VGH01 is the above target voltage VGHS1). When the target rate level is the rate level Lev1, the first reference voltage (that is, the voltage VGH01) needs no adjustment, and the first reference voltage (that is, the voltage VGH01) may directly serve as a target voltage corresponding to the rate level Lev1, to output the clock signal ck2_Lev1, such that the voltage of the high level of the signal ga2_Lev1 may be VGH01. When the target rate level is the rate level Lev3, the first reference voltage (that is, the voltage VGH01) is reduced by the first active adjustment voltage VSZ11, then a target voltage VGH11 corresponding to the rate level Lev3 is obtained (the target voltage VGH11 is the above target voltage VGHS3), and the clock signal ck2_Lev3 is output, such that the voltage of the high level of the signal ga2_Lev3 may be VGH11, that is, the voltage is reduced by VSZ11 based on VGH01. When the target rate level is the rate level Lev7, the first reference voltage (that is, the voltage VGH01) is reduced by the first active adjustment voltage VSZ12, then a target voltage VGH12 corresponding to the rate level Lev7 is obtained (the target voltage VGH12 is the above target voltage VGHS7), and the clock signal ck2_Lev7 is output, such that the voltage of the high level of the signal ga2_Lev7 may be VGH12, that is, the voltage is reduced by VSZ12 based on VGH01. Moreover, VSZ12>VSZ11.

Figure 21:
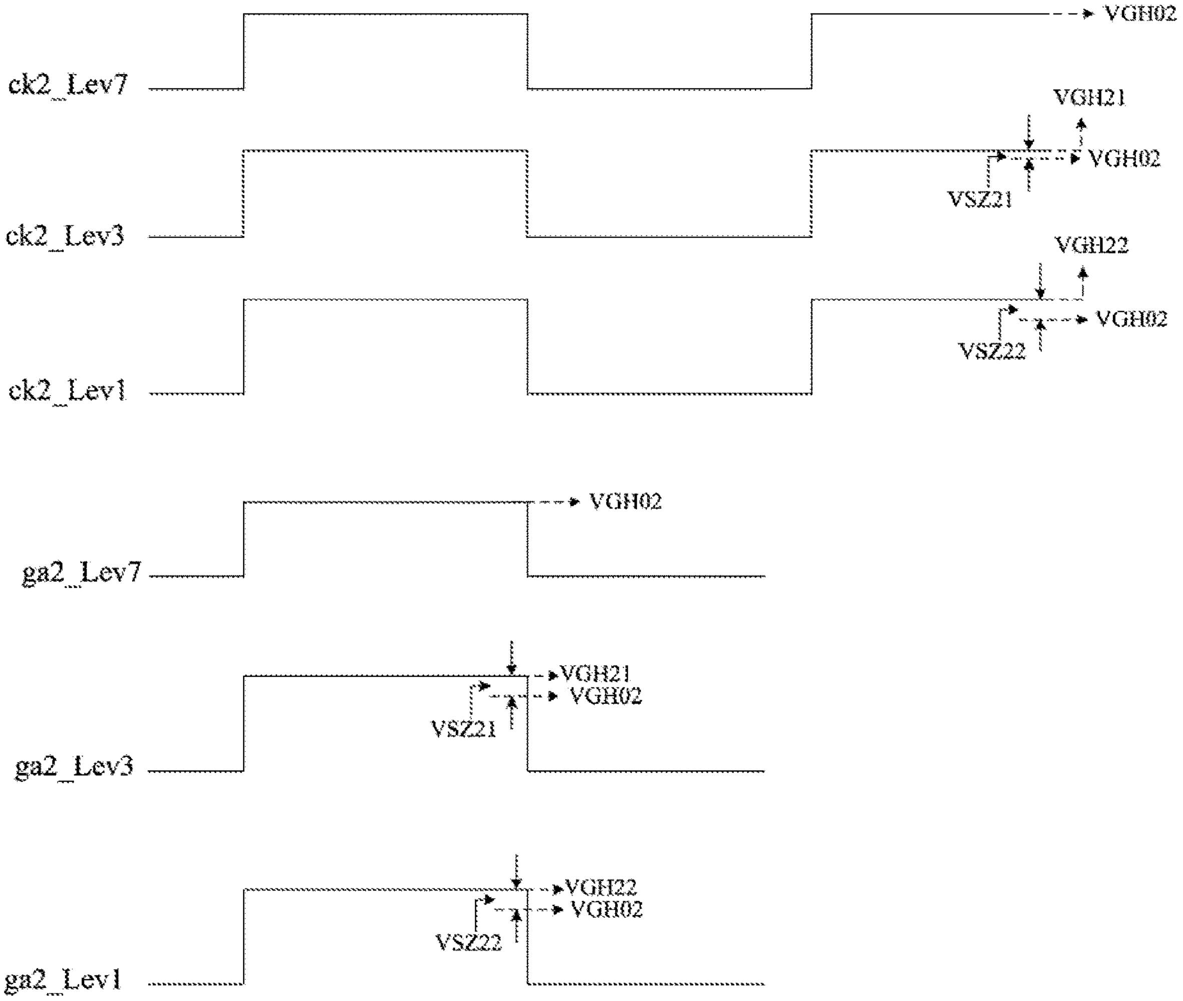
FIG. 21 is a signal timing diagram according to some other embodiments of the present disclosure.

Illustratively, the first reference voltage is a first reference voltage corresponding to a set rate level, when the active level is a high level, that is, the first voltage reference VREF1 is adjusted to be the target voltage, the high level of the clock signal output by the level shift circuit 2432 is the target voltage, and thus the voltage of the high level of the gate drive signal is the target voltage. The step of adjusting a first reference voltage of the active level that generates the gate scanning signal according to the target rate level, to obtain the target voltage of the active level includes: when the set rate level is a maximum rate level and the target rate level is less than the maximum rate level, increase the first reference voltage by a second active adjustment voltage, to obtain the target voltage of the active level. As the rate level increases, the corresponding second active adjustment voltage decreases. Illustratively, in conjunction with FIG. 21, with the clock signal ck2 as an example, ck2_Lev1 represents a signal when the clock signal ck2 corresponds to the rate level Lev1, ck2_Lev3 represents a signal when the clock signal ck2 corresponds to the rate level Lev3, and ck2_Lev7 represents a clock signal when the clock signal ck2 corresponds to the rate level Lev7. ga2_Lev1 represents a gate scanning signal transmitted when the gate line GA2 corresponds to the rate level Lev1, ga2_Lev3 represents a gate scanning signal transmitted when the gate line GA2 corresponds to the rate level Lev3, and ga2_Lev7 represents a gate scanning signal transmitted when the gate line GA2 corresponds to the rate level Lev7. The first reference voltage is a first voltage reference VREF1 of a high level that corresponds to the rate level Lev7 and generates the clock signal cks2_Lev7, that is, a voltage VGH02 (the voltage VGH02 is the above target voltage VGHS7). When the target rate level is the rate level Lev7, the first reference voltage (that is, the voltage VGH02) needs no adjustment, and the first reference voltage (that is, the voltage VGH02) may directly serve as a target voltage corresponding to the rate level Lev7, to output the clock signal ck2_Lev7, such that the voltage of the high level of the signal ga2_Lev7 may be VGH02. When the target rate level is the rate level Lev3, the first reference voltage (that is, the voltage VGH02) is increased by the second active adjustment voltage VSZ21, then a target voltage VGH21 corresponding to the rate level Lev3 is obtained (the target voltage VGH21 is the above target voltage VGHS3), and the clock signal ck2_Lev3 is output, such that the voltage of the high level of the signal ga2_Lev3 may be VGH21, that is, the voltage is increased by VSZ21 based on VGH02. When the target rate level is the rate level Lev1, the first reference voltage (that is, the voltage VGH02) is increased by the second active adjustment voltage VSZ22, then a target voltage VGH22 corresponding to the rate level Lev1 is obtained (the target voltage VGH22 is the above target voltage VGHS1), and the clock signal ck2_Lev1 is output, such that the voltage of the high level of the signal ga2_Lev1 may be VGH22, that is, the voltage is increased by VSZ22 based on VGH02. Moreover, VSZ22>VSZ21.

Figure 22:
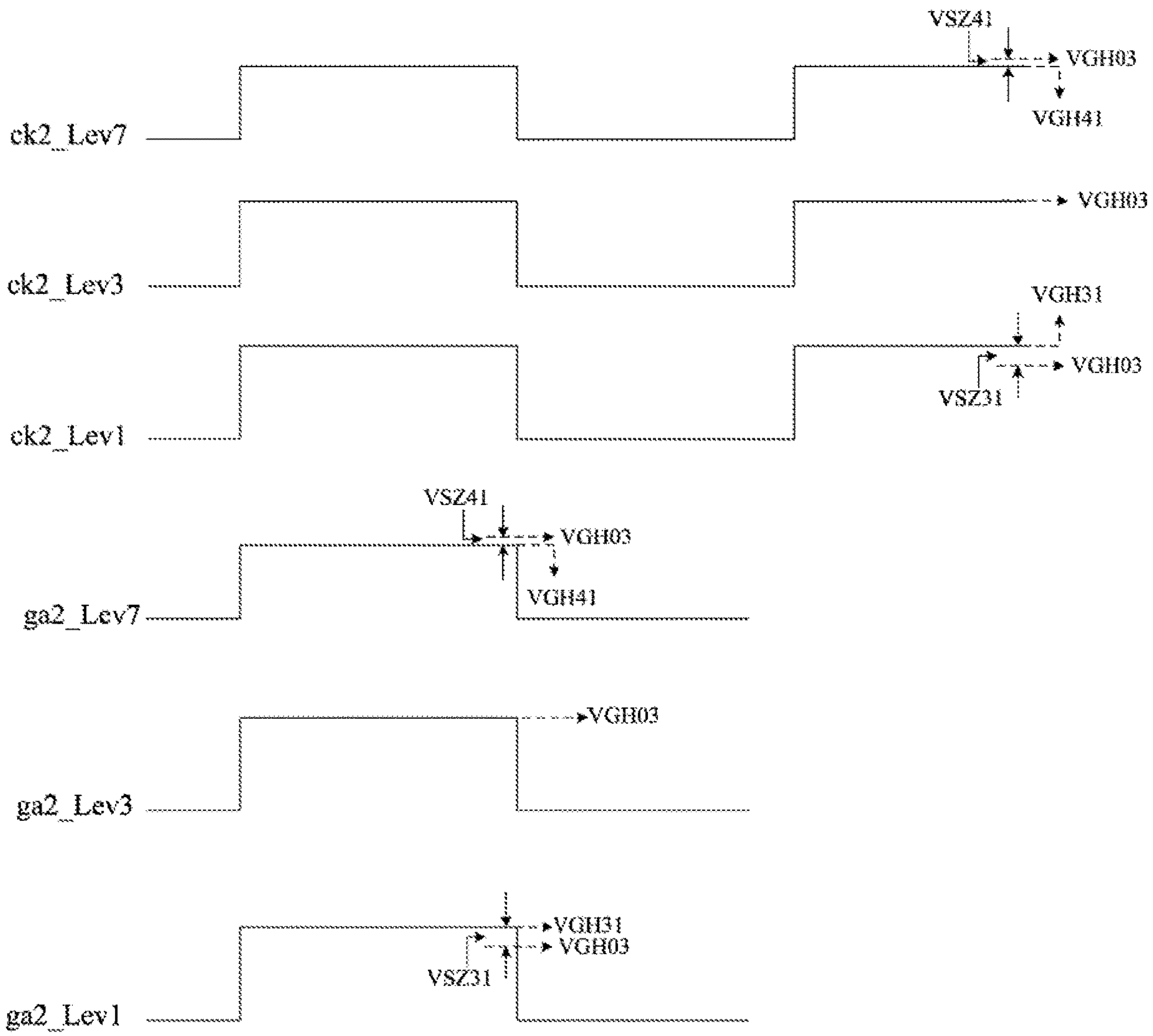
FIG. 22 is a signal timing diagram according to some other embodiments of the present disclosure.

Illustratively, the first reference voltage is a first reference voltage corresponding to a set rate level, when the active level is a high level, that is, the first voltage reference VREF1 is adjusted to be the target voltage, the high level of the clock signal output by the level shift circuit 2432 is the target voltage, and thus the voltage of the high level of the gate drive signal is the target voltage. The step of adjusting a first reference voltage of the active level that generates the gate scanning signal according to the target rate level, to obtain the target voltage of the active level includes: when the set rate level is greater than the minimum rate level and less than the maximum rate level and the target rate level is less than the set rate level, increase the first reference voltage by a third active adjustment voltage, to obtain the target voltage of the active level; and When the set rate level is greater than the minimum rate level and less than the maximum rate level and the target rate level is greater than the set rate level, reduce the first reference voltage by a fourth active adjustment voltage, to obtain the target voltage of the active level. As the rate level increases, the corresponding third active adjustment voltage decreases, and the corresponding fourth active adjustment voltage increases. Illustratively, in conjunction with FIG. 22, with the clock signal ck2 as an example, ck2_Lev1 represents a signal when the clock signal ck2 corresponds to the rate level Lev1, ck2_Lev3 represents a signal when the clock signal ck2 corresponds to the rate level Lev3, and ck2_Lev7 represents a clock signal when the clock signal ck2 corresponds to the rate level Lev7. ga2_Lev1 represents a gate scanning signal transmitted when the gate line GA2 corresponds to the rate level Lev1, ga2_Lev3 represents a gate scanning signal transmitted when the gate line GA2 corresponds to the rate level Lev3, and ga2_Lev7 represents a gate scanning signal transmitted when the gate line GA2 corresponds to the rate level Lev7. The set rate level may be the rate level Lev3 (alternatively, other rate levels may be used as the set rate level, which is not limited herein), the first reference voltage is a first voltage reference VREF1 of a high level that corresponds to the rate level Lev3 and generates the clock signal cks2_Lev3, that is, a voltage VGH03 (the voltage VGH03 is the above target voltage VGHS3). When the target rate level is the rate level Lev3, the first reference voltage (that is, the voltage VGH03) needs no adjustment, and the first reference voltage (that is, the voltage VGH03) may directly serve as a target voltage corresponding to the rate level Lev3, to output the clock signal ck2_Lev3, such that the voltage of the high level of the signal ga2_Lev3 may be VGH03. When the target rate level is the rate level Lev1, the first reference voltage (that is, the voltage VGH03) is increased by the third active adjustment voltage VSZ31, then a target voltage VGH31 corresponding to the rate level Lev1 is obtained (the target voltage VGH31 is the above target voltage VGHS1), and the clock signal ck2_Lev1 is output, such that the voltage of the high level of the signal ga2_Lev1 may be VGH31, that is, the voltage is increased by VSZ31 based on VGH03. When the target rate level is the rate level Lev7, the first reference voltage (that is, the voltage VGH03) is reduced by the fourth active adjustment voltage VSZ41, then a target voltage VGH41 corresponding to the rate level Lev7 is obtained (the target voltage VGH41 is the above target voltage VGHS7), and the clock signal ck2_Lev7 is output, such that the voltage of the high level of the signal ga2_Lev7 may be VGH41, that is, the voltage is reduced by VSZ41 based on VGH03.

Figure 19C:
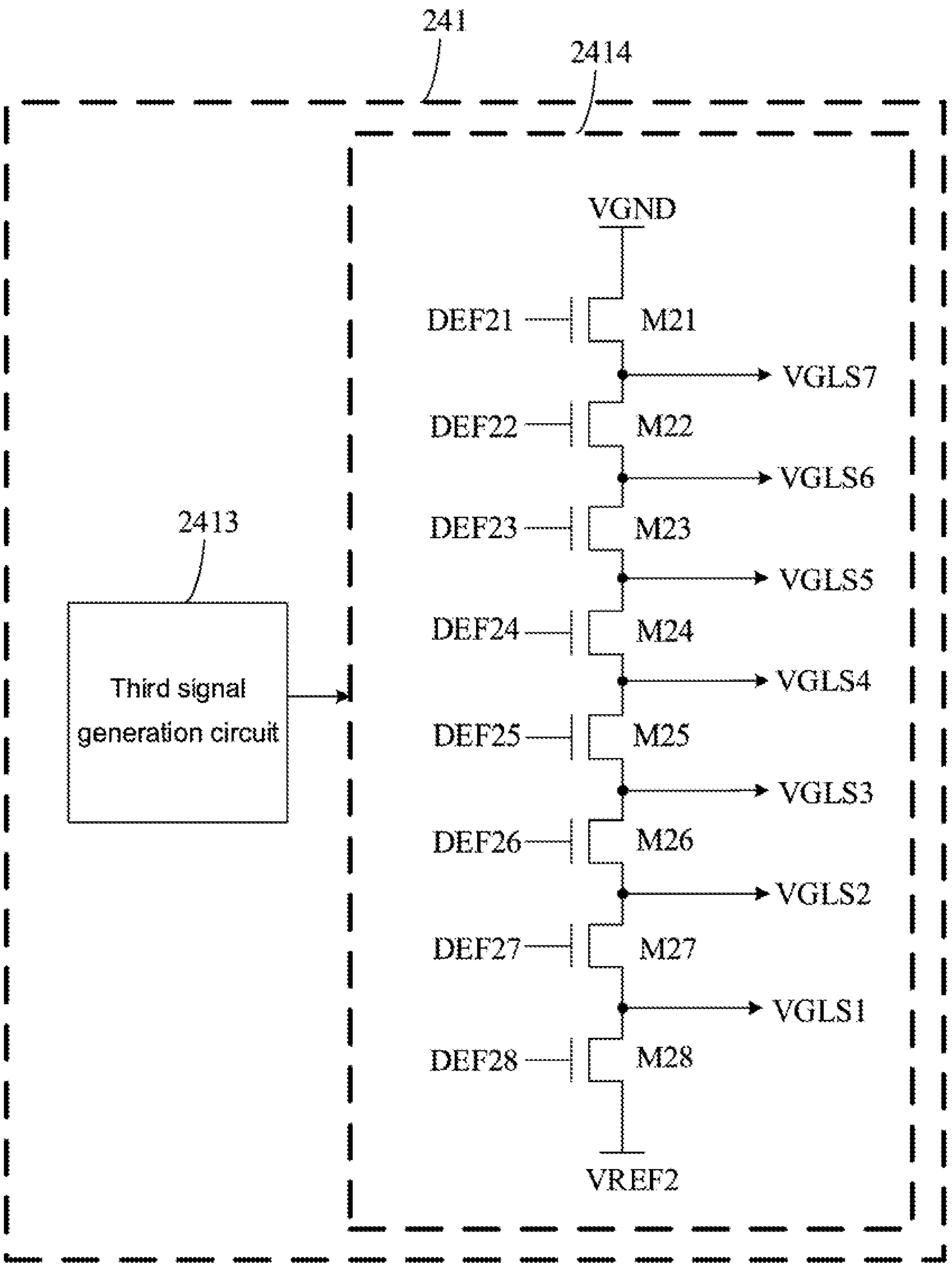
FIG. 19C is a schematic structure diagram of a second reference circuit according to some embodiments of the present disclosure.

Illustratively, as shown in FIG. 19C, the voltage determination circuit 241 may include a third signal generation circuit 2413 and a second reference circuit 2414. The third signal generation circuit 2413 may generate a second reference control signal in the form of a corresponding digital signal according to the target rate level, and send the generated second reference control signal to the second reference circuit 2414. The second reference circuit 2414 is configured to output a target voltage of a low level that generates a gate scanning signal according to the second reference control signal when the active level is the low level. For example, as shown in FIG. 19C, the second reference circuit 2414 includes a plurality of transistors M21-M28 (with seven refresh rate levels as an example). A gate of M21 receives a signal DEF21, a gate of M22 receives a signal DEF22, . . . , a gate of M28 receives a signal DEF28. A source of M21 receives a grounding voltage, a drain of M28 receives a second voltage reference VREF2 (the second voltage reference VREF2 is less than the grounding voltage VGND), and the remaining transistors are successively connected in series. Each of the second reference control signals includes DEF21-DEF28, and at least one of the DEF21-DEF28 may be set to be different from the others, to achieve different rate levels corresponding to different second reference control signals, so as to turn on different transistors to output different target voltages. For example, the second reference control signal corresponding to the refresh rate level Lev1 may control the transistors M21-M27 to be turned on and the remaining transistors to be turned off, and then the second reference circuit 2414 outputs the target voltage VGLS1 corresponding to the refresh rate level Lev1. The second reference control signal corresponding to the refresh rate level Lev2 may control the transistors M21-M26 to be turned on and the remaining transistors to be turned off, and then the second reference circuit 2414 outputs the target voltage VGLS2 corresponding to the refresh rate level Lev2. The second reference control signal corresponding to the refresh rate level Lev3 may control the transistors M21-M25 to be turned on and the remaining transistors to be turned off, and then the second reference circuit 2414 outputs the target voltage VGLS3 corresponding to the refresh rate level Lev3 . . . . The second reference control signal corresponding to the refresh rate level Lev7 may control the transistors M21 to be turned on and the remaining transistors to be turned off, and then the second reference circuit 2414 outputs the target voltage VGLS7 corresponding to the refresh rate level Lev7. Moreover, VGLS1<VGLS2<VGLS3<VGLS4<VGLS5<VGLS6<VGLS7. It is to be noted that the transistors M21-M28 equivalently serve as resistors to divide a voltage between the second voltage reference VREF2 and the grounding voltage VGND, so as to obtain different target voltages.

Figure 23:
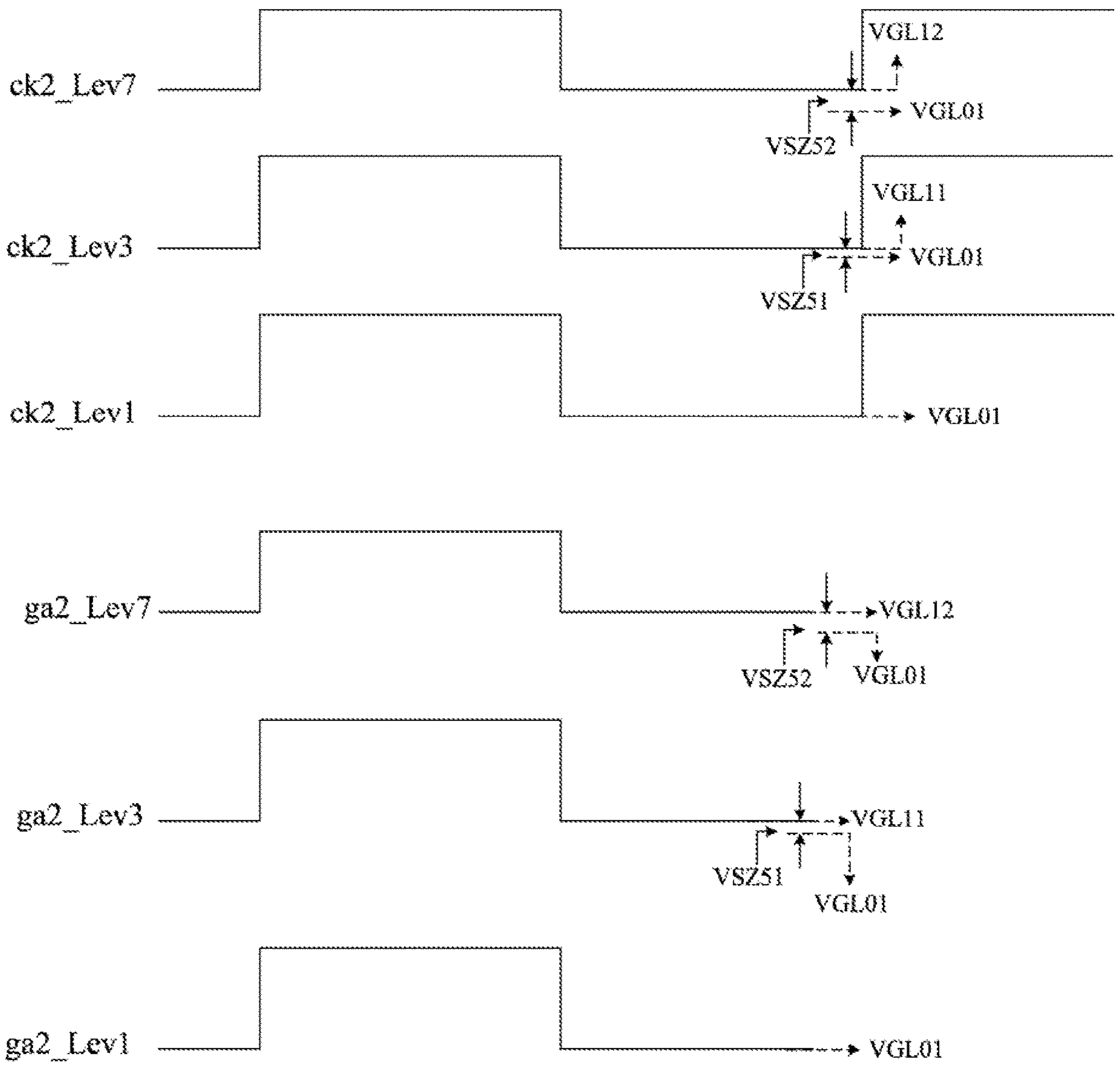
FIG. 23 is a signal timing diagram according to some other embodiments of the present disclosure.

Illustratively, the first reference voltage is a first reference voltage corresponding to a set rate level, the active level may also be a low level, that is, the second voltage reference VREF2 is adjusted to be the target voltage, then the low level of the clock signal output by the level shift circuit 2432 is the target voltage, and thus the voltage of the low level of the gate drive signal is the target voltage. The step of adjusting a first reference voltage of the active level that generates the gate scanning signal according to the target rate level, to obtain the target voltage of the active level includes: when the set rate level is a minimum rate level and the target rate level is greater than the minimum rate level, increase the first reference voltage by a fifth active adjustment voltage, to obtain the target voltage of the active level. As the rate level increases, the corresponding fifth active adjustment voltage increases. Illustratively, in conjunction with FIG. 23, with the clock signal ck2 as an example, ck2_Lev1 represents a signal when the clock signal ck2 corresponds to the rate level Lev1, ck2_Lev3 represents a signal when the clock signal ck2 corresponds to the rate level Lev3, and ck2_Lev7 represents a clock signal when the clock signal ck2 corresponds to the rate level Lev7. ga2_Lev1 represents a gate scanning signal transmitted when the gate line GA2 corresponds to the rate level Lev1, ga2_Lev3 represents a gate scanning signal transmitted when the gate line GA2 corresponds to the rate level Lev3, and ga2_Lev7 represents a gate scanning signal transmitted when the gate line GA2 corresponds to the rate level Lev7. The first reference voltage is a second voltage reference VREF2 of a low level that corresponds to the rate level Lev1 and generates the clock signal cks2_Lev1, that is, a voltage VGL01 (the voltage VGL01 is the above target voltage VGLS1). When the target rate level is the rate level Lev1, the first reference voltage (that is, the voltage VGL01) needs no adjustment, and the first reference voltage (that is, the voltage VGL01) may directly serve as a target voltage corresponding to the rate level Lev1, to output the clock signal ck2_Lev1, such that the voltage of the low level of the signal ga2_Lev1 may be VGL01. When the target rate level is the rate level Lev3, the first reference voltage (that is, the voltage VGL01) is increased by the fifth active adjustment voltage VSZ51, then a target voltage VGL11 corresponding to the rate level Lev3 is obtained (the target voltage VGL11 is the above target voltage VGLS3), and the clock signal ck2_Lev3 is output, such that the voltage of the low level of the signal ga2_Lev3 may be VGL11, that is, the voltage is increased by VSZ51 based on VGL01. When the target rate level is the rate level Lev7, the first reference voltage (that is, the voltage VGL01) is increased by the fifth active adjustment voltage VSZ52, then a target voltage VGL12 corresponding to the rate level Lev7 is obtained (the target voltage VGL12 is the above target voltage VGLS7), and the clock signal ck2_Lev7 is output, such that the voltage of the low level of the signal ga2_Lev7 may be VGL12, that is, the voltage is increased by VSZ52 based on VGL01. Moreover, VSZ52>VSZ51.

Figure 24:
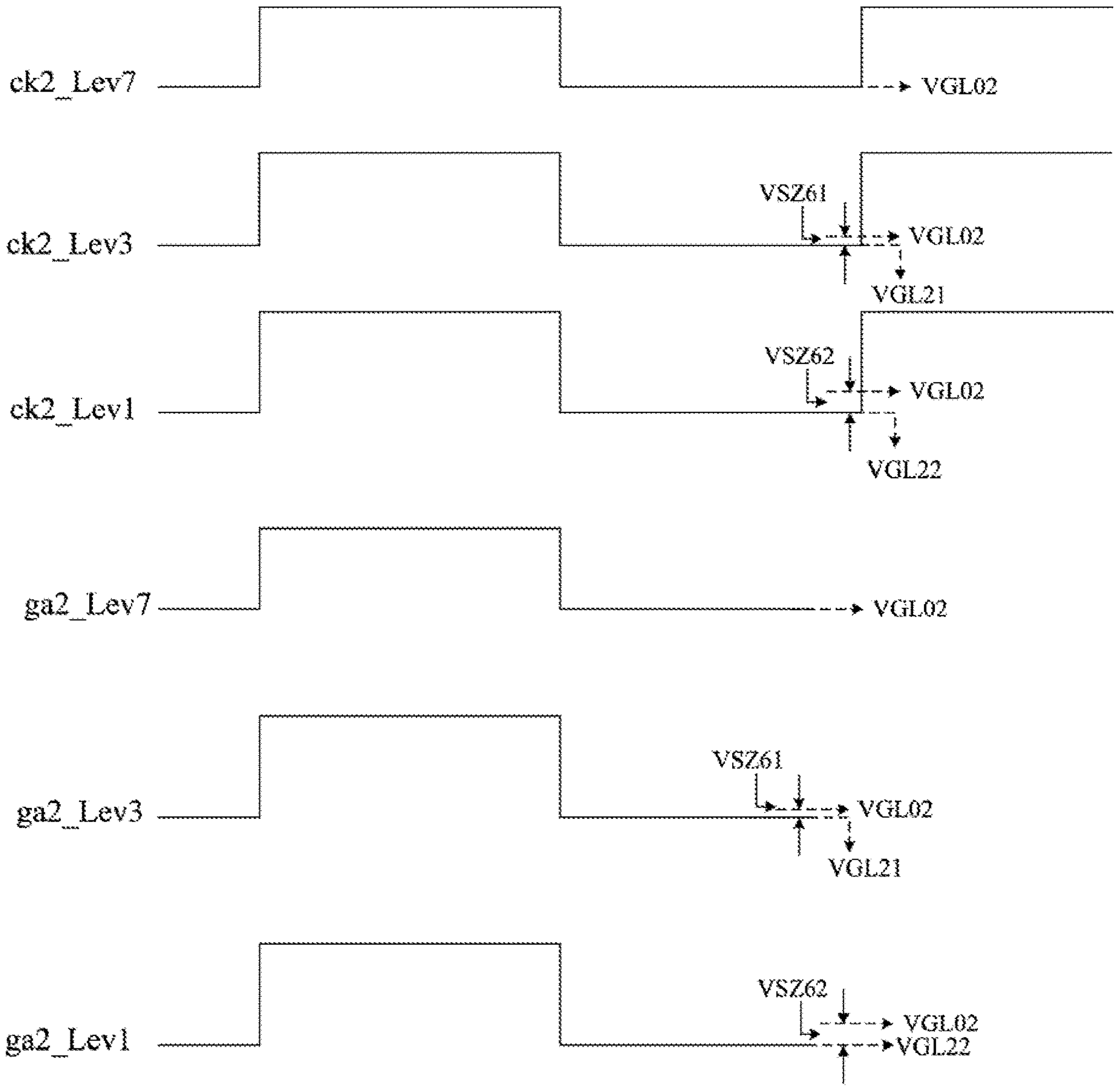
FIG. 24 is a signal timing diagram according to some other embodiments of the present disclosure.

Illustratively, the first reference voltage is a first reference voltage corresponding to a set rate level, the active level may also be a low level, that is, the second voltage reference VREF2 is adjusted to be the target voltage, then the low level of the clock signal output by the level shift circuit 2432 is the target voltage, and thus the voltage of the low level of the gate drive signal is the target voltage. The step of adjusting a first reference voltage of the active level that generates the gate scanning signal according to the target rate level, to obtain the target voltage of the active level includes: when the set rate level is a maximum rate level and the target rate level is less than the maximum rate level, reduce the first reference voltage by a sixth active adjustment voltage, to obtain the target voltage of the active level. As the rate level increases, the corresponding six active adjustment voltage decreases. Illustratively, in conjunction with FIG. 24, with the clock signal ck2 as an example, ck2_Lev1 represents a signal when the clock signal ck2 corresponds to the rate level Lev1, ck2_Lev3 represents a signal when the clock signal ck2 corresponds to the rate level Lev3, and ck2_Lev7 represents a clock signal when the clock signal ck2 corresponds to the rate level Lev7. ga2_Lev1 represents a gate scanning signal transmitted when the gate line GA2 corresponds to the rate level Lev1, ga2_Lev3 represents a gate scanning signal transmitted when the gate line GA2 corresponds to the rate level Lev3, and ga2_Lev7 represents a gate scanning signal transmitted when the gate line GA2 corresponds to the rate level Lev7. The first reference voltage is a second voltage reference VREF2 of a low level that corresponds to the rate level Lev7 and generates the clock signal cks2_Lev7, that is, a voltage VGL02 (the voltage VGL02 is the above target voltage VGLS7). When the target rate level is the rate level Lev7, the first reference voltage (that is, the voltage VGL02) needs no adjustment, and the first reference voltage (that is, the voltage VGL02) may directly serve as a target voltage corresponding to the rate level Lev7, to output the clock signal ck2_Lev7, such that the voltage of the low level of the signal ga2_Lev7 may be VGL02. When the target rate level is the rate level Lev3, the first reference voltage (that is, the voltage VGL02) is reduced by the sixth active adjustment voltage VSZ61, then a target voltage VGL21 corresponding to the rate level Lev3 is obtained (the target voltage VGL21 is the above target voltage VGLS3), and the clock signal ck2_Lev3 is output, such that the voltage of the low level of the signal ga2_Lev3 may be VGL21, that is, the voltage is reduced by VSZ61 based on VGL02. When the target rate level is the rate level Lev1, the first reference voltage (that is, the voltage VGL02) is reduced by the sixth active adjustment voltage VSZ62, then a target voltage VGL22 corresponding to the rate level Lev1 is obtained (the target voltage VGL22 is the above target voltage VGLS1), and the clock signal ck2_Lev1 is output, such that the voltage of the low level of the signal ga2_Lev1 may be VGL22, that is, the voltage is reduced by VSZ62 based on VGL02. Moreover, VSZ62>VSZ61.

Figure 25:
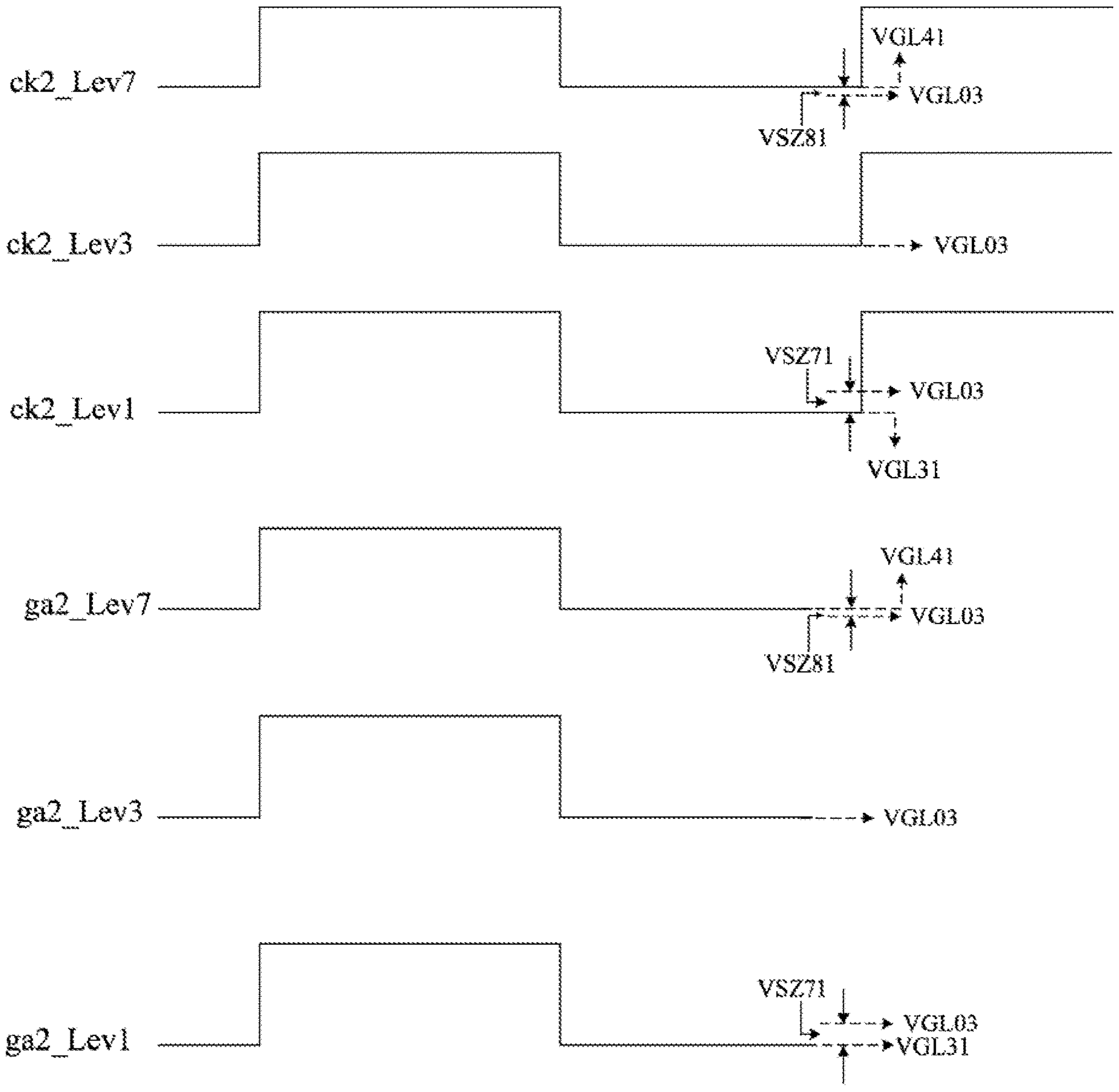
FIG. 25 is a signal timing diagram according to some other embodiments of the present disclosure.

Illustratively, the first reference voltage is a first reference voltage corresponding to a set rate level, the active level may also be a low level, that is, the second voltage reference VREF2 is adjusted to be the target voltage, then the low level of the clock signal output by the level shift circuit 2432 is the target voltage, and thus the voltage of the low level of the gate drive signal is the target voltage. The step of adjusting a first reference voltage of the active level that generates the gate scanning signal according to the target rate level, to obtain the target voltage of the active level includes: when the set rate level is greater than the minimum rate level and less than the maximum rate level and the target rate level is less than the set rate level, reduce the first reference voltage by a seventh active adjustment voltage, to obtain the target voltage of the active level; and when the set rate level is greater than the minimum rate level and less than the maximum rate level and the target rate level is greater than the set rate level, increase the first reference voltage by an eighth active adjustment voltage, to obtain the target voltage of the active level. As the rate level increases, the corresponding eighth active adjustment voltage increases, and the corresponding seventh active adjustment voltage decreases. Illustratively, in conjunction with FIG. 25, with the clock signal ck2 as an example, ck2_Lev1 represents a signal when the clock signal ck2 corresponds to the rate level Lev1, ck2_Lev3 represents a signal when the clock signal ck2 corresponds to the rate level Lev3, and ck2_Lev7 represents a clock signal when the clock signal ck2 corresponds to the rate level Lev7. ga2_Lev1 represents a gate scanning signal transmitted when the gate line GA2 corresponds to the rate level Lev1, ga2_Lev3 represents a gate scanning signal transmitted when the gate line GA2 corresponds to the rate level Lev3, and ga2_Lev7 represents a gate scanning signal transmitted when the gate line GA2 corresponds to the rate level Lev7. The set rate level may be the rate level Lev3 (alternatively, other rate levels may be used as the set rate level, which is not limited herein), the first reference voltage is a second voltage reference VREF2 of a low level that corresponds to the rate level Lev3 and generates the clock signal cks2_Lev3, that is, a voltage VGL03 (the voltage VGL03 is the above target voltage VGLS3). When the target rate level is the rate level Lev3, the first reference voltage (that is, the voltage VGL03) needs no adjustment, and the first reference voltage (that is, the voltage VGL03) may directly serve as a target voltage corresponding to the rate level Lev3, to output the clock signal ck2_Lev3, such that the voltage of the low level of the signal ga2_Lev3 may be VGL03. When the target rate level is the rate level Lev7, the first reference voltage (that is, the voltage VGL03) is increased by the eighth active adjustment voltage VSZ81, then a target voltage VGL41 corresponding to the rate level Lev7 is obtained (the target voltage VGL41 is the above target voltage VGLS7), and the clock signal ck2_Lev7 is output, such that the voltage of the low level of the signal ga2_Lev7 may be VGL41, that is, the voltage is increased by VSZ81 based on VGL03. When the target rate level is the rate level Lev1, the first reference voltage (that is, the voltage VGL03) is reduced by the seventh active adjustment voltage VSZ71, then a target voltage VGL31 corresponding to the rate level Lev1 is obtained (the target voltage VGL31 is the above target voltage VGLS1), and the clock signal ck2_Lev1 is output, such that the voltage of the low level of the signal ga2_Lev1 may be VGL31, that is, the voltage is reduced by VSZ81 based on VGL03.

It is to be noted that the first active adjustment voltage to the eighth active adjustment voltage are all voltage values, and do not carry a sign. That is, the first active adjustment voltage to the eighth active adjustment voltage may be equivalent to absolute values of voltages.

Embodiments of the present disclosure provide yet some other drive methods for a display panel, which are variations of the implementation modes of the embodiments above. Herein, only the differences between any other embodiment and the above embodiments will be described, and the same portion will not be repeated herein.

In some examples, the target level may include an inactive level. The step of determining a target voltage of a target level that generates a gate scanning signal according to the target rate level includes: adjust a second reference voltage of the inactive level that generates the gate scanning signal according to the target rate level, to obtain the target voltage of the inactive level. The step of controlling the display panel to load the gate scanning signal onto a gate according to the target voltage includes: control the display panel to load the gate scanning signal onto the gate according to the obtained target voltage of the inactive level. Target voltages of inactive levels corresponding to different rate levels are different. Illustratively, under the condition that the inactive level is a high level, as the rate level increases, the corresponding target voltage of the high level decreases. Under the condition that the inactive level is a low level, as the rate level increases, the corresponding target voltage of the low level increases. In this way, as the rate level increases, the degree of turning off of the transistor in the sub-pixel decreases, so as to reduce current leakage of the sub-pixel in the display frame corresponding to the lower rate level and increase current leakage of the sub-pixel in the display frame corresponding to the higher rate level, then a luminance difference of the sub-pixels in the display frames with different refresh rates is reduced as much as possible, and the problem of poor display of the display panel is alleviated.

Figure 19D:
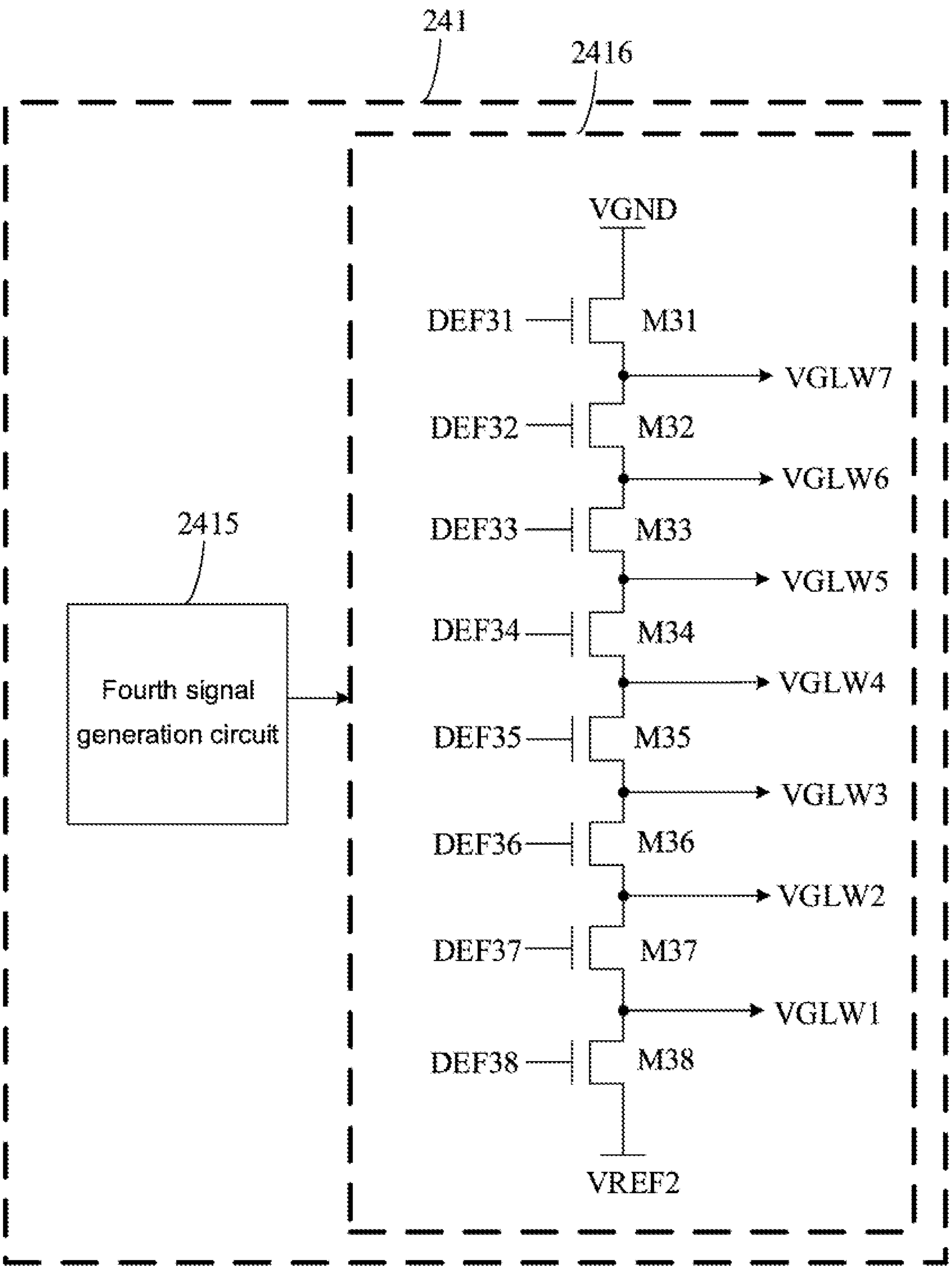
FIG. 19D is a schematic structure diagram of a third reference circuit according to some embodiments of the present disclosure.

Illustratively, as shown in FIG. 19D, the voltage determination circuit 241 may include a fourth signal generation circuit 2415 and a third reference circuit 2416. The fourth signal generation circuit 2415 may generate a third reference control signal in the form of a corresponding digital signal according to the target rate level, and send the generated third reference control signal to the third reference circuit 2416. The third reference circuit 2416 is configured to output a target voltage of a low level that generates a gate scanning signal according to the third reference control signal when the inactive level is the low level. For example, as shown in FIG. 19D, the third reference circuit 2416 includes a plurality of transistors M31-M38 (with seven refresh rate levels as an example). A gate of M31 receives a signal DEF31, a gate of M32 receives a signal DEF32, . . . , a gate of M38 receives a signal DEF38. A source of M31 receives a grounding voltage, a drain of M38 receives a second voltage reference VREF2 (the second voltage reference VREF2 is less than the grounding voltage VGND), and the remaining transistors are successively connected in series. Each of the third reference control signals includes DEF31-DEF38, and at least one of the DEF31-DEF38 may be set to be different from the others, to achieve different rate levels corresponding to different third reference control signals, so as to turn on different transistors to output different target voltages. For example, the third reference control signal corresponding to the refresh rate level Lev1 may control the transistors M31-M37 to be turned on and the remaining transistors to be turned off, and then the third reference circuit 2416 outputs the target voltage VGLW1 corresponding to the refresh rate level Lev1. The third reference control signal corresponding to the refresh rate level Lev2 may control the transistors M31-M36 to be turned on and the remaining transistors to be turned off, and then the third reference circuit 2416 outputs the target voltage VGLW2 corresponding to the refresh rate level Lev2. The third reference control signal corresponding to the refresh rate level Lev3 may control the transistors M31-M35 to be turned on and the remaining transistors to be turned off, and then the third reference circuit 2416 outputs the target voltage VGLW3 corresponding to the refresh rate level Lev3 . . . . The third reference control signal corresponding to the refresh rate level Lev7 may control the transistor M31 to be turned on and the remaining transistors to be turned off, and then the third reference circuit 2416 outputs the target voltage VGLW7 corresponding to the refresh rate level Lev7. Moreover, VGLW1<VGLW2<VGLW3<VGLW4<VGLW5<VGLW6<VGLW7. It is to be noted that the transistors M31-M38 equivalently serve as resistors to divide a voltage between the second voltage reference VREF2 and the grounding voltage VGND, so as to obtain different target voltages.

Figure 26:
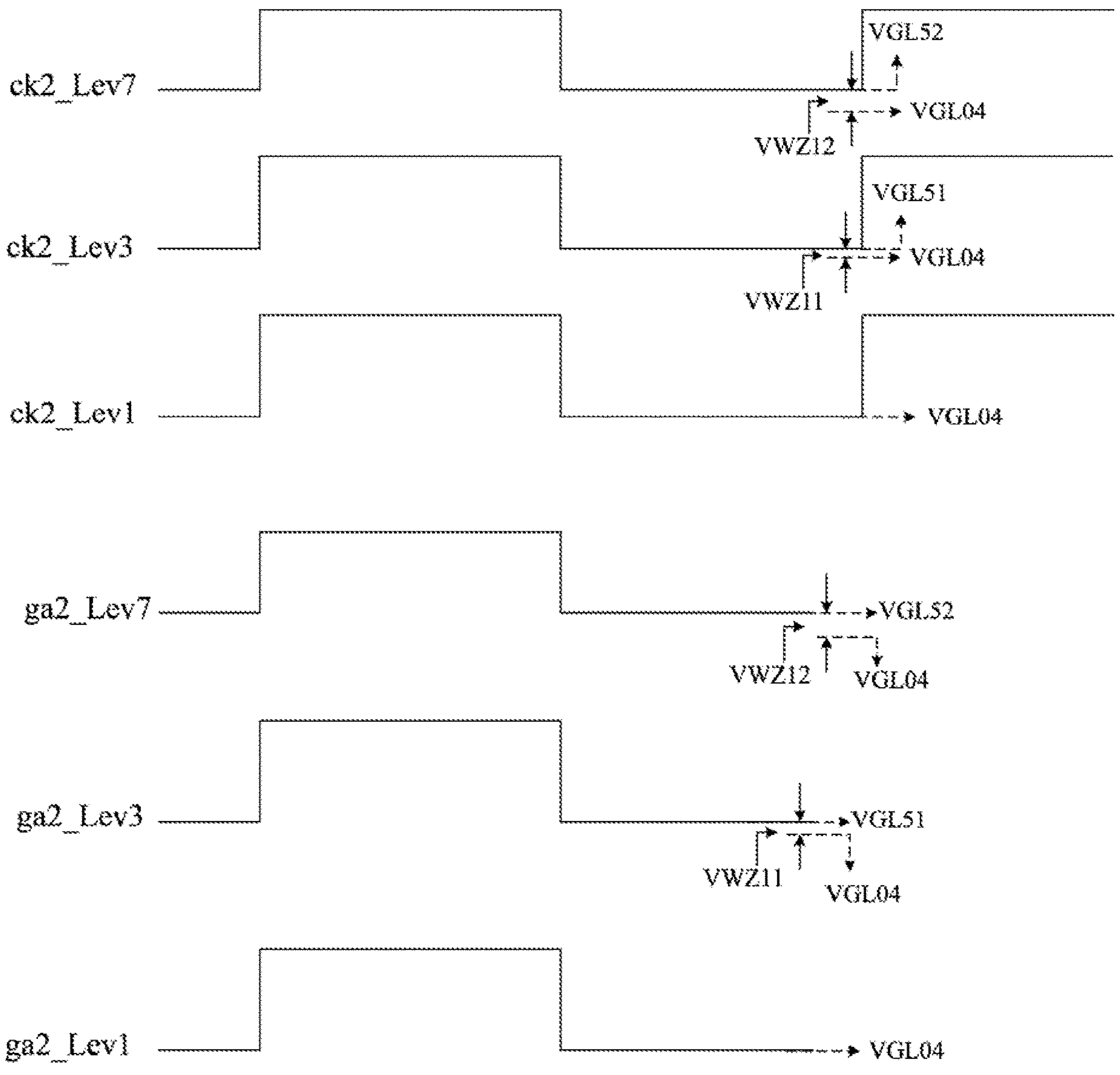
FIG. 26 is a signal timing diagram according to some other embodiments of the present disclosure.

Illustratively, the second reference voltage is a second reference voltage corresponding to a set rate level, when the inactive level is a low level, that is, the second voltage reference VREF2 is adjusted to be the target voltage, the low level of the clock signal output by the level shift circuit 2432 is the target voltage, and thus the voltage of the low level of the gate drive signal is the target voltage. The step of adjusting a second reference voltage of the inactive level that generates the gate scanning signal according to the target rate level, to obtain the target voltage of the inactive level includes: when the set rate level is a minimum rate level and the target rate level is greater than the minimum rate level, increase the second reference voltage by a first inactive adjustment voltage, to obtain the target voltage of the inactive level. As the rate level increases, the corresponding first inactive adjustment voltage increases. Illustratively, in conjunction with FIG. 26, with the clock signal ck2 as an example, ck2_Lev1 represents a signal when the clock signal ck2 corresponds to the rate level Lev1, ck2_Lev3 represents a signal when the clock signal ck2 corresponds to the rate level Lev3, and ck2_Lev7 represents a clock signal when the clock signal ck2 corresponds to the rate level Lev7. ga2_Lev1 represents a gate scanning signal transmitted when the gate line GA2 corresponds to the rate level Lev1, ga2_Lev3 represents a gate scanning signal transmitted when the gate line GA2 corresponds to the rate level Lev3, and ga2_Lev7 represents a gate scanning signal transmitted when the gate line GA2 corresponds to the rate level Lev7. The second reference voltage is a second voltage reference VREF2 of a low level that corresponds to the rate level Lev1 and generates the clock signal cks2_Lev1, that is, a voltage VGL04 (the voltage VGL04 is the above target voltage VGLW1). When the target rate level is the rate level Lev1, the second reference voltage (that is, the voltage VGL04) needs no adjustment, and the second reference voltage (that is, the voltage VGL04) may directly serve as a target voltage corresponding to the rate level Lev1, to output the clock signal ck2_Lev1, such that the voltage of the low level of the signal ga2_Lev1 may be VGL04. When the target rate level is the rate level Lev3, the second reference voltage (that is, the voltage VGL04) is increased by the first inactive adjustment voltage VWZ11, then a target voltage VGL51 corresponding to the rate level Lev3 is obtained (the target voltage VGL51 is the above target voltage VGLW3), and the clock signal ck2_Lev3 is output, such that the voltage of the low level of the signal ga2_Lev3 may be VGL51, that is, the voltage is increased by VWZ11 based on VGL04. When the target rate level is the rate level Lev7, the second reference voltage (that is, the voltage VGL04) is increased by the first inactive adjustment voltage VWZ12, then a target voltage VGL52 corresponding to the rate level Lev7 is obtained (the target voltage VGL52 is the above target voltage VGLW7), and the clock signal ck2_Lev7 is output, such that the voltage of the low level of the signal ga2_Lev7 may be VGL52, that is, the voltage is increased by VWZ12 based on VGL04. Moreover, VWZ12>VWZ11.

Figure 27:
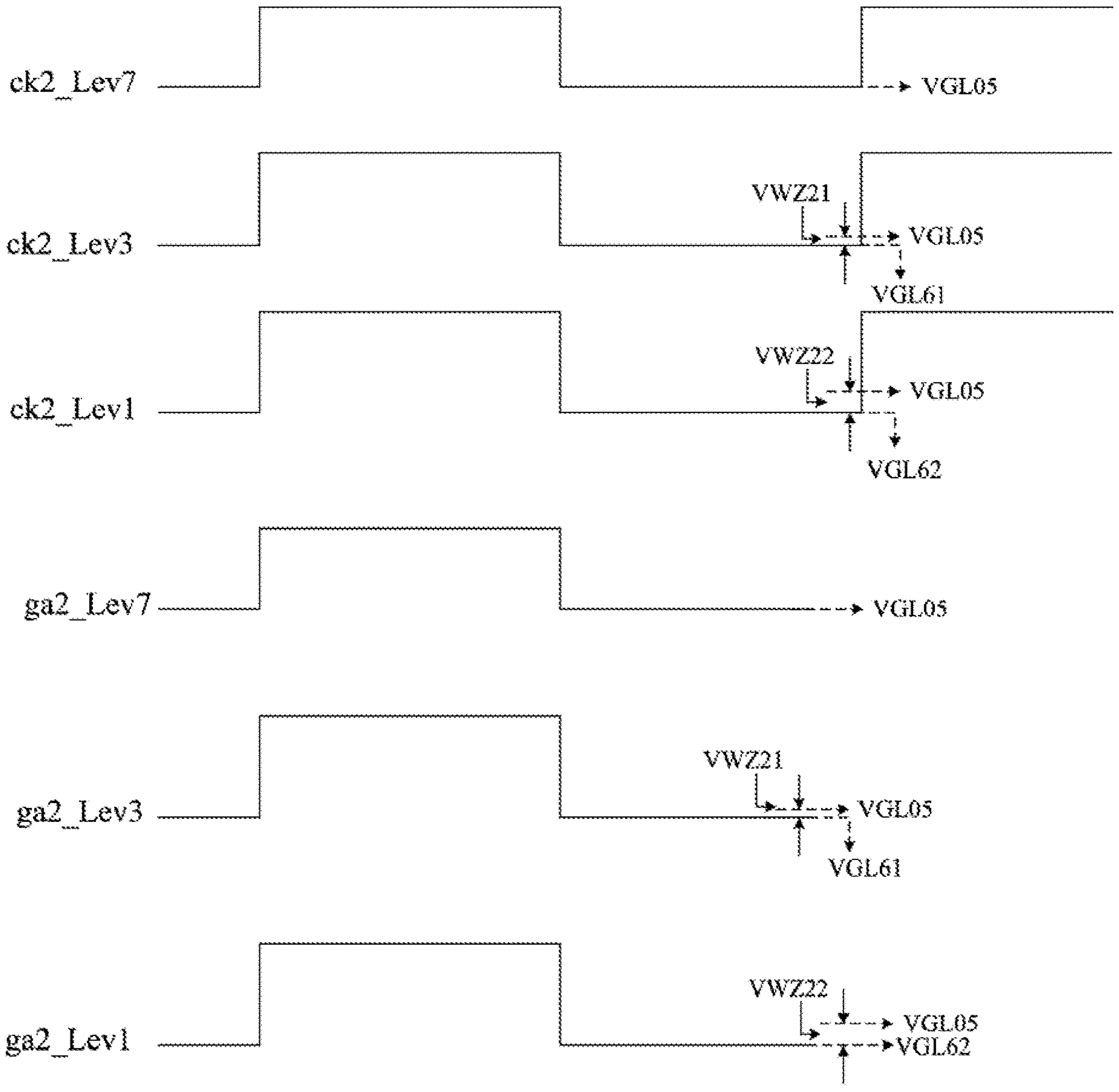
FIG. 27 is a signal timing diagram according to some other embodiments of the present disclosure.

Illustratively, the second reference voltage is a second reference voltage corresponding to a set rate level, when the inactive level is a low level, that is, the second voltage reference VREF2 is adjusted to be the target voltage, the low level of the clock signal output by the level shift circuit 2432 is the target voltage, and thus the voltage of the low level of the gate drive signal is the target voltage. The step of adjusting a second reference voltage of the inactive level that generates the gate scanning signal according to the target rate level, to obtain the target voltage of the inactive level includes: when the set rate level is a maximum rate level and the target rate level is less than the maximum rate level, reduce the second reference voltage by a second inactive adjustment voltage, to obtain the target voltage of the inactive level. As the rate level increases, the corresponding second inactive adjustment voltage decreases. Illustratively, in conjunction with FIG. 27, with the clock signal ck2 as an example, ck2_Lev1 represents a signal when the clock signal ck2 corresponds to the rate level Lev1, ck2_Lev3 represents a signal when the clock signal ck2 corresponds to the rate level Lev3, and ck2_Lev7 represents a clock signal when the clock signal ck2 corresponds to the rate level Lev7. ga2_Lev1 represents a gate scanning signal transmitted when the gate line GA2 corresponds to the rate level Lev1, ga2_Lev3 represents a gate scanning signal transmitted when the gate line GA2 corresponds to the rate level Lev3, and ga2_Lev7 represents a gate scanning signal transmitted when the gate line GA2 corresponds to the rate level Lev7. The second reference voltage is a second voltage reference VREF2 of a low level that corresponds to the rate level Lev7 and generates the clock signal cks2_Lev7, that is, a voltage VGL05 (the voltage VGL05 is the above target voltage VGLW7). When the target rate level is the rate level Lev7, the second reference voltage (that is, the voltage VGL05) needs no adjustment, and the second reference voltage (that is, the voltage VGL05) may directly serve as a target voltage corresponding to the rate level Lev7, to output the clock signal ck2_Lev7, such that the voltage of the low level of the signal ga2_Lev7 may be VGL05. When the target rate level is the rate level Lev3, the second reference voltage (that is, the voltage VGL05) is reduced by the second inactive adjustment voltage VWZ21, then a target voltage VGL61 corresponding to the rate level Lev3 is obtained (the target voltage VGL61 is the above target voltage VGLW3), and the clock signal ck2_Lev3 is output, such that the voltage of the low level of the signal ga2_Lev3 may be VGL61, that is, the voltage is reduced by VWZ21 based on VGL05. When the target rate level is the rate level Lev1, the second reference voltage (that is, the voltage VGL05) is reduced by the second inactive adjustment voltage VWZ22, then a target voltage VGL62 corresponding to the rate level Lev1 is obtained (the target voltage VGL62 is the above target voltage VGLW1), and the clock signal ck2_Lev1 is output, such that the voltage of the low level of the signal ga2_Lev1 may be VGL62, that is, the voltage is reduced by VWZ22 based on VGL05. Moreover, VSZ22>VSZ21.

Figure 28:
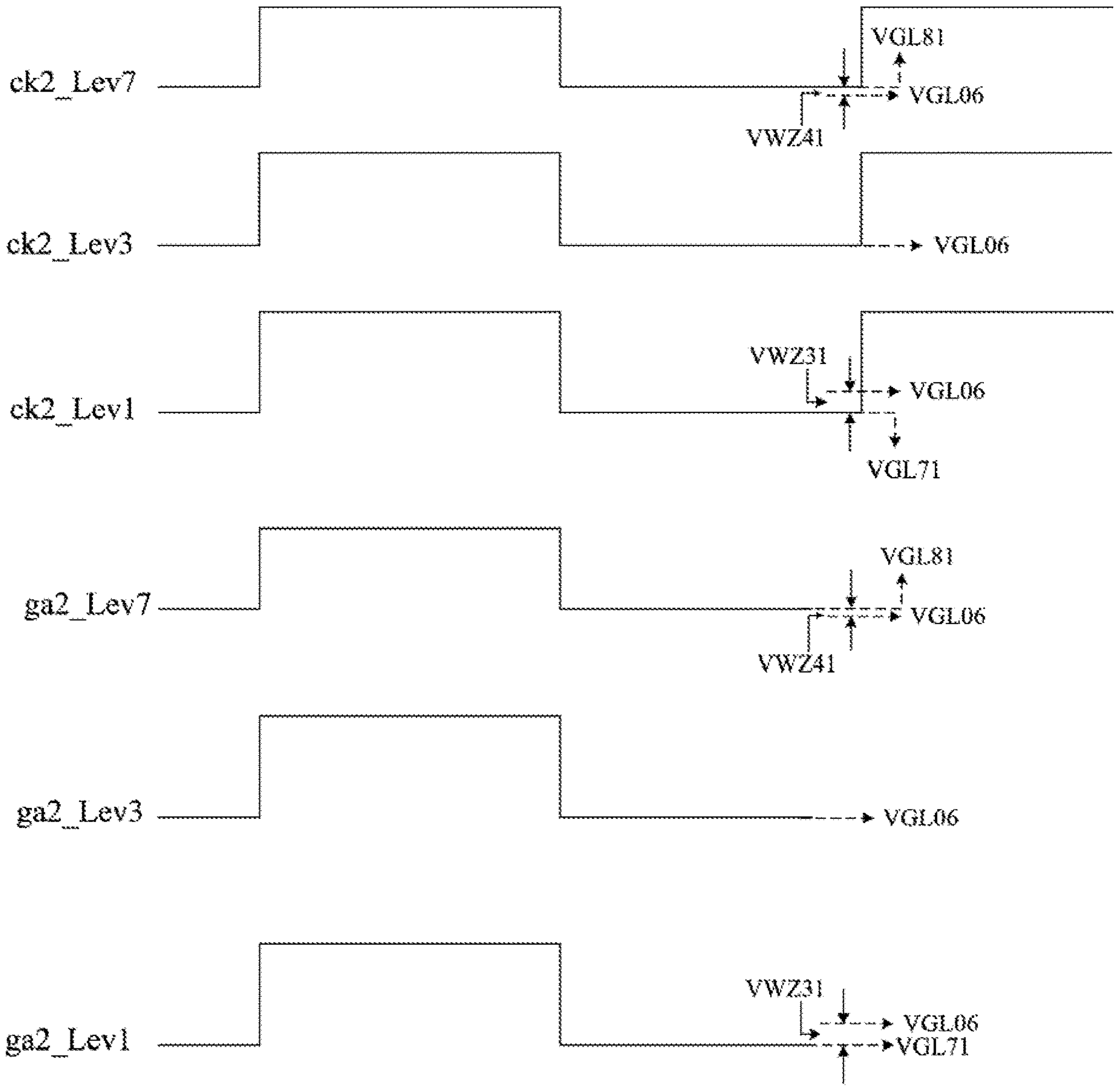
FIG. 28 is a signal timing diagram according to some other embodiments of the present disclosure.

Illustratively, the second reference voltage is a second reference voltage corresponding to a set rate level, when the inactive level is a low level, that is, the second voltage reference VREF2 is adjusted to be the target voltage, the low level of the clock signal output by the level shift circuit 2432 is the target voltage, and thus the voltage of the low level of the gate drive signal is the target voltage. The step of adjusting a second reference voltage of the inactive level that generates the gate scanning signal according to the target rate level, to obtain the target voltage of the inactive level includes: when the set rate level is greater than the minimum rate level and less than the maximum rate level and the target rate level is less than the set rate level, reduce the second reference voltage by a third inactive adjustment voltage, to obtain the target voltage of the inactive level; and when the set rate level is greater than the minimum rate level and less than the maximum rate level and the target rate level is greater than the set rate level, increase the second reference voltage by a fourth inactive adjustment voltage, to obtain the target voltage of the inactive level. As the rate level increases, the corresponding fourth inactive adjustment voltage increases, and the corresponding third inactive adjustment voltage decreases. Illustratively, in conjunction with FIG. 28, with the clock signal ck2 as an example, ck2_Lev1 represents a signal when the clock signal ck2 corresponds to the rate level Lev1, ck2_Lev3 represents a signal when the clock signal ck2 corresponds to the rate level Lev3, and ck2_Lev7 represents a clock signal when the clock signal ck2 corresponds to the rate level Lev7. ga2_Lev1 represents a gate scanning signal transmitted when the gate line GA2 corresponds to the rate level Lev1, ga2_Lev3 represents a gate scanning signal transmitted when the gate line GA2 corresponds to the rate level Lev3, and ga2_Lev7 represents a gate scanning signal transmitted when the gate line GA2 corresponds to the rate level Lev7. The set rate level may be the rate level Lev3 (alternatively, other rate levels may be used as the set rate level, which is not limited herein), the second reference voltage is a second voltage reference VREF2 of a low level that corresponds to the rate level Lev3 and generates the clock signal cks2_Lev3, that is, a voltage VGL06 (the voltage VGL06 is the above target voltage VGLW3). When the target rate level is the rate level Lev3, the second reference voltage (that is, the voltage VGL06) needs no adjustment, and the second reference voltage (that is, the voltage VGL06) may directly serve as a target voltage corresponding to the rate level Lev3, to output the clock signal ck2_Lev3, such that the voltage of the low level of the signal ga2_Lev3 may be VGL03. When the target rate level is the rate level Lev7, the second reference voltage (that is, the voltage VGL06) is increased by the fourth inactive adjustment voltage VWZ41, then a target voltage VGL81 corresponding to the rate level Lev7 is obtained (the target voltage VGL81 is the above target voltage VGLW7), and the clock signal ck2_Lev7 is output, such that the voltage of the low level of the signal ga2_Lev7 may be VGL81, that is, the voltage is increased by VWZ41 based on VGL06. When the target rate level is the rate level Lev1, the second reference voltage (that is, the voltage VGL06) is reduced by the third inactive adjustment voltage VWZ31, then a target voltage VGL71 corresponding to the rate level Lev1 is obtained (the target voltage VGL71 is the above target voltage VGLW1), and the clock signal ck2_Lev1 is output, such that the voltage of the low level of the signal ga2_Lev1 may be VGL71, that is, the voltage is reduced by VWZ31 based on VGL06.

Figure 19E:
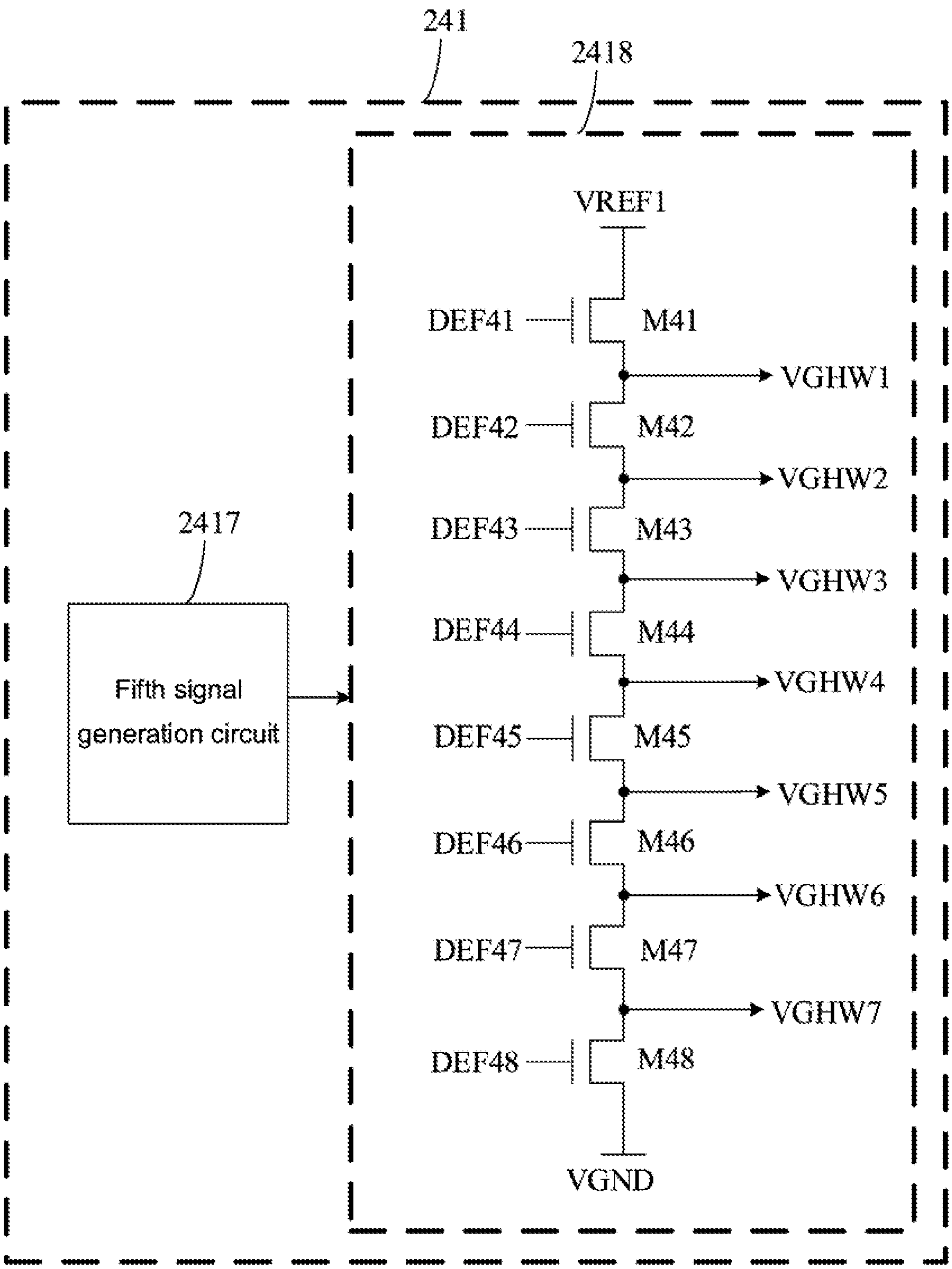
FIG. 19E is a schematic structure diagram of a fourth reference circuit according to some embodiments of the present disclosure.

Illustratively, as shown in FIG. 19E, the voltage determination circuit 241 may include a fifth signal generation circuit 2417 and a fourth reference circuit 2418. The fifth signal generation circuit 2417 may generate a fourth reference control signal in the form of a corresponding digital signal according to the target rate level, and send the generated fourth reference control signal to the fourth reference circuit 2418. The fourth reference circuit 2418 is configured to output a target voltage of a high level that generates a gate scanning signal according to the fourth reference control signal when the inactive level is the high level. For example, as shown in FIG. 19E, the fourth reference circuit 2418 includes a plurality of transistors M41-M48 (with seven refresh rate levels as an example). A gate of M41 receives a signal DEF41, a gate of M42 receives a signal DEF42, . . . , a gate of M48 receives a signal DEF48. A source of M41 receives a first voltage reference VREF1, a drain of M48 receives a grounding voltage VGND (the first voltage reference VREF1 is greater than the grounding voltage VGND), and the remaining transistors are successively connected in series. Each of the fourth reference control signals includes DEF41-DEF48, and at least one of the DEF41-DEF48 may be set to be different from the others, to achieve different rate levels corresponding to different fourth reference control signals, so as to turn on different transistors to output different target voltages. For example, the fourth reference control signal corresponding to the refresh rate level Lev1 may control the transistor M41 to be turned on and the remaining transistors to be turned off, and then the fourth reference circuit 2418 outputs the target voltage VGHW1 of the high level corresponding to the refresh rate level Lev1. The fourth reference control signal corresponding to the refresh rate level Lev2 may control the transistors M41 and M42 to be turned on and the remaining transistors to be turned off, and then the fourth reference circuit 2418 outputs the target voltage VGHW2 of the high level corresponding to the refresh rate level Lev2. The fourth reference control signal corresponding to the refresh rate level Lev3 may control the transistors M41-M43 to be turned on and the remaining transistors to be turned off, and then the fourth reference circuit 2418 outputs the target voltage VGHW3 of the high level corresponding to the refresh rate level Lev3 . . . . The fourth reference control signal corresponding to the refresh rate level Lev7 may control the transistors M41-M47 to be turned on and the remaining transistors to be turned off, and then the fourth reference circuit 2418 outputs the target voltage VGHW7 of the high level corresponding to the refresh rate level Lev7. Moreover, VGHW1>VGHW2>VGHW3>VGHW4>VGHW5>VGHW6>VGHW7. It is to be noted that the transistors M41-M48 equivalently serve as resistors to divide a voltage between the first voltage reference VREF1 and the grounding voltage VGND, so as to obtain different target voltages.

Figure 29:
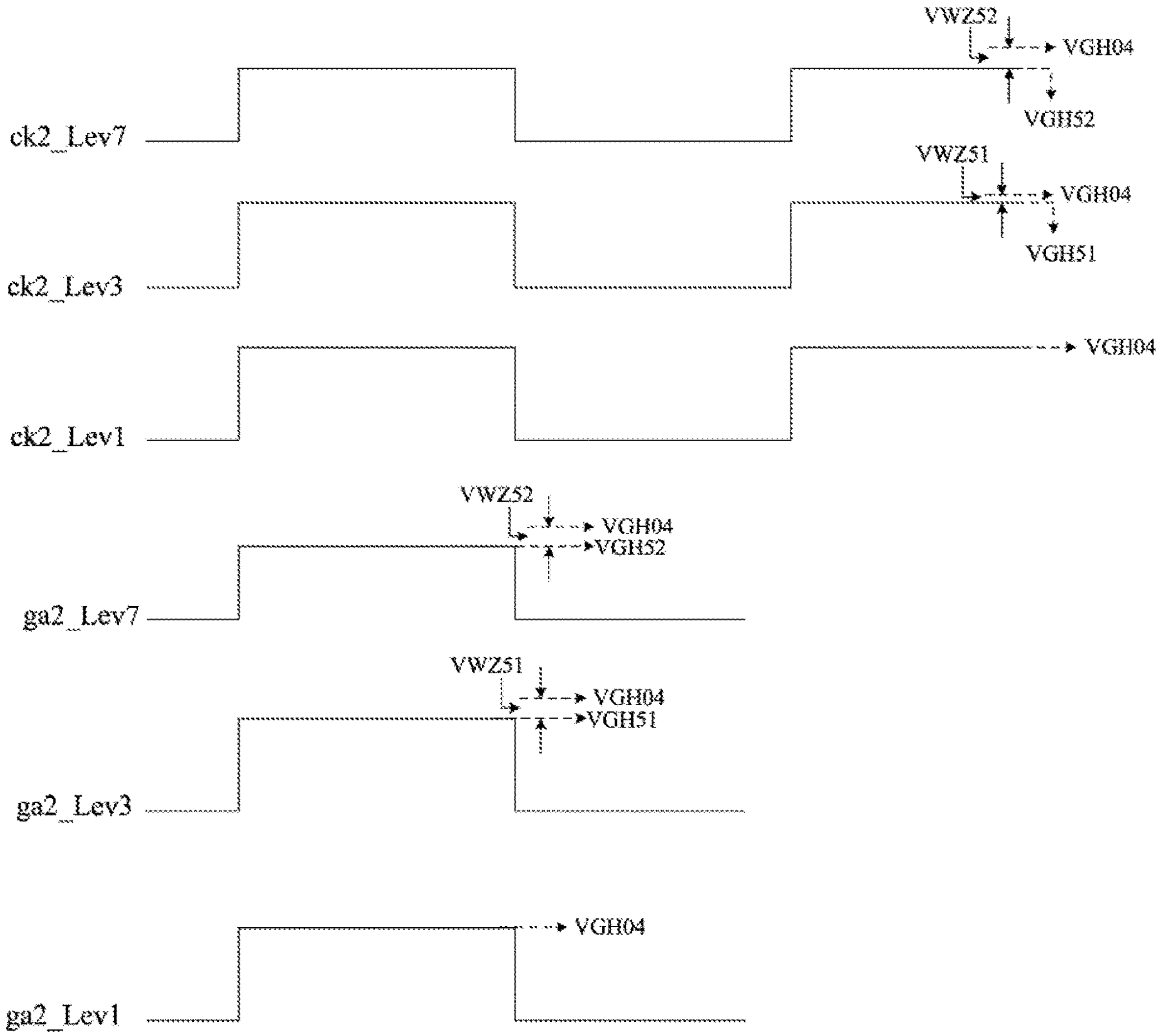
FIG. 29 is a signal timing diagram according to some other embodiments of the present disclosure.

Illustratively, the second reference voltage is a second reference voltage corresponding to the set rate level. The inactive level may also be a high level. That is, the first voltage reference VREF1 is adjusted to be the target voltage, the high level of the clock signal output by the level shift circuit 2432 is the target voltage, and thus the voltage of the high level of the gate drive signal is the target voltage. The step of adjusting a second reference voltage of the inactive level that generates the gate scanning signal according to the target rate level, to obtain the target voltage of the inactive level includes: when the set rate level is a minimum rate level and the target rate level is greater than the minimum rate level, reduce the second reference voltage by a fifth inactive adjustment voltage, to obtain the target voltage of the inactive level. As the rate level increases, the corresponding fifth inactive adjustment voltage increases. Illustratively, in conjunction with FIG. 29, with the clock signal ck2 as an example, ck2_Lev1 represents a signal when the clock signal ck2 corresponds to the rate level Lev1, ck2_Lev3 represents a signal when the clock signal ck2 corresponds to the rate level Lev3, and ck2_Lev7 represents a clock signal when the clock signal ck2 corresponds to the rate level Lev7. ga2_Lev1 represents a gate scanning signal transmitted when the gate line GA2 corresponds to the rate level Lev1, ga2_Lev3 represents a gate scanning signal transmitted when the gate line GA2 corresponds to the rate level Lev3, and ga2_Lev7 represents a gate scanning signal transmitted when the gate line GA2 corresponds to the rate level Lev7. The second reference voltage is a first voltage reference VREF1 of a high level that corresponds to the rate level Lev1 and generates the clock signal cks2_Lev1, that is, a voltage VGH04 (the voltage VGH04 is the above target voltage VGHW7). When the target rate level is the rate level Lev1, the second reference voltage (that is, the voltage VGH04) needs no adjustment, and the second reference voltage (that is, the voltage VGH04) may directly serve as a target voltage corresponding to the rate level Lev1, to output the clock signal ck2_Lev1, such that the voltage of the high level of the signal ga2_Lev1 may be VGH04. When the target rate level is the rate level Lev3, the second reference voltage (that is, the voltage VGH04) is reduced by the fifth inactive adjustment voltage VWZ51, then a target voltage VGH51 corresponding to the rate level Lev3 is obtained (the target voltage VGH51 is the above target voltage VGHW3), and the clock signal ck2_Lev3 is output, such that the voltage of the high level of the signal ga2_Lev3 may be VGH51, that is, the voltage is reduced by VWZ51 based on VGH04. When the target rate level is the rate level Lev7, the second reference voltage (that is, the voltage VGH04) is reduced by the fifth inactive adjustment voltage VWZ52, then a target voltage VGH52 corresponding to the rate level Lev7 is obtained (the target voltage VGH52 is the above target voltage VGHW7), and the clock signal ck2_Lev7 is output, such that the voltage of the high level of the signal ga2_Lev7 may be VGH52, that is, the voltage is reduced by VWZ52 based on VGH04. Moreover, VWZ52>VWZ51.

Figure 30:
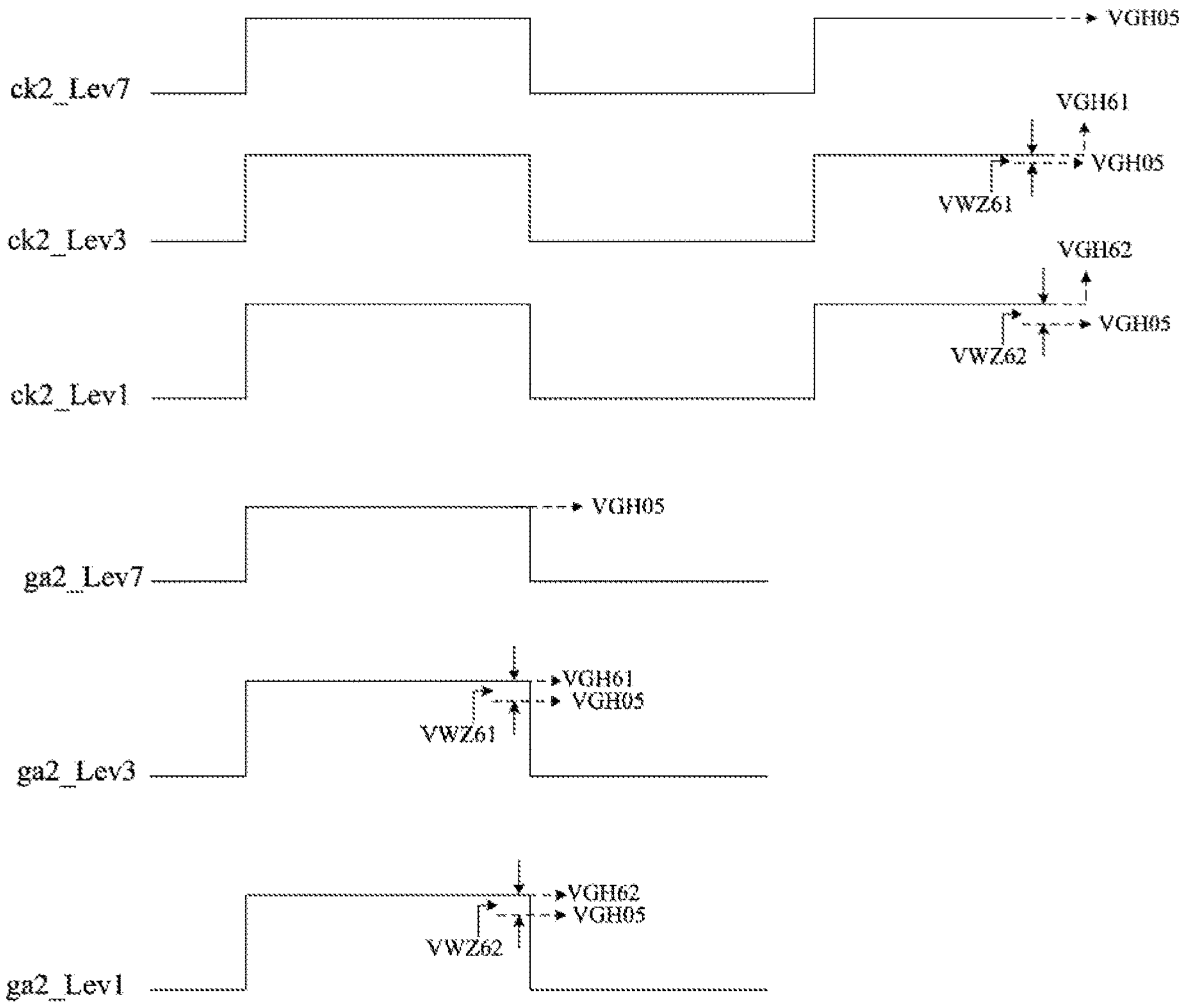
FIG. 30 is a signal timing diagram according to some other embodiments of the present disclosure.

Illustratively, the second reference voltage is a second reference voltage corresponding to the set rate level. The inactive level may also be a high level. That is, the first voltage reference VREF1 is adjusted to be the target voltage, the high level of the clock signal output by the level shift circuit 2432 is the target voltage, and thus the voltage of the high level of the gate drive signal is the target voltage. The step of adjusting a second reference voltage of the inactive level that generates the gate scanning signal according to the target rate level, to obtain the target voltage of the inactive level includes: when the set rate level is a maximum rate level and the target rate level is less than the maximum rate level, increase the second reference voltage by a sixth inactive adjustment voltage, to obtain the target voltage of the inactive level. As the rate level increases, the corresponding sixth inactive adjustment voltage decreases. Illustratively, in conjunction with FIG. 30, with the clock signal ck2 as an example, ck2_Lev1 represents a signal when the clock signal ck2 corresponds to the rate level Lev1, ck2_Lev3 represents a signal when the clock signal ck2 corresponds to the rate level Lev3, and ck2_Lev7 represents a clock signal when the clock signal ck2 corresponds to the rate level Lev7. ga2_Lev1 represents a gate scanning signal transmitted when the gate line GA2 corresponds to the rate level Lev1, ga2_Lev3 represents a gate scanning signal transmitted when the gate line GA2 corresponds to the rate level Lev3, and ga2_Lev7 represents a gate scanning signal transmitted when the gate line GA2 corresponds to the rate level Lev7. The second reference voltage is a first voltage reference VREF1 of a high level that corresponds to the rate level Lev7 and generates the clock signal cks2_Lev7, that is, a voltage VGH05 (the voltage VGH05 is the above target voltage VGHW7). When the target rate level is the rate level Lev1, the second reference voltage (that is, the voltage VGH05) needs no adjustment, and the second reference voltage (that is, the voltage VGH05) may directly serve as a target voltage corresponding to the rate level Lev7, to output the clock signal ck2_Lev7, such that the voltage of the high level of the signal ga2_Lev7 may be VGH05. When the target rate level is the rate level Lev3, the second reference voltage (that is, the voltage VGH05) is increased by the sixth inactive adjustment voltage VWZ61, then a target voltage VGH61 corresponding to the rate level Lev3 is obtained (the target voltage VGH61 is the above target voltage VGHW3), and the clock signal ck2_Lev3 is output, such that the voltage of the high level of the signal ga2_Lev3 may be VGH61, that is, the voltage is increased by VWZ61 based on VGH05. When the target rate level is the rate level Lev1, the second reference voltage (that is, the voltage VGH05) is increased by the sixth inactive adjustment voltage VWZ62, then a target voltage VGH62 corresponding to the rate level Lev1 is obtained (the target voltage VGH62 is the above target voltage VGHW1), and the clock signal ck2_Lev1 is output, such that the voltage of the high level of the signal ga2_Lev1 may be VGH62, that is, the voltage is increased by VWZ62 based on VGH05. Moreover, VWZ62>VWZ61.

Figure 31:
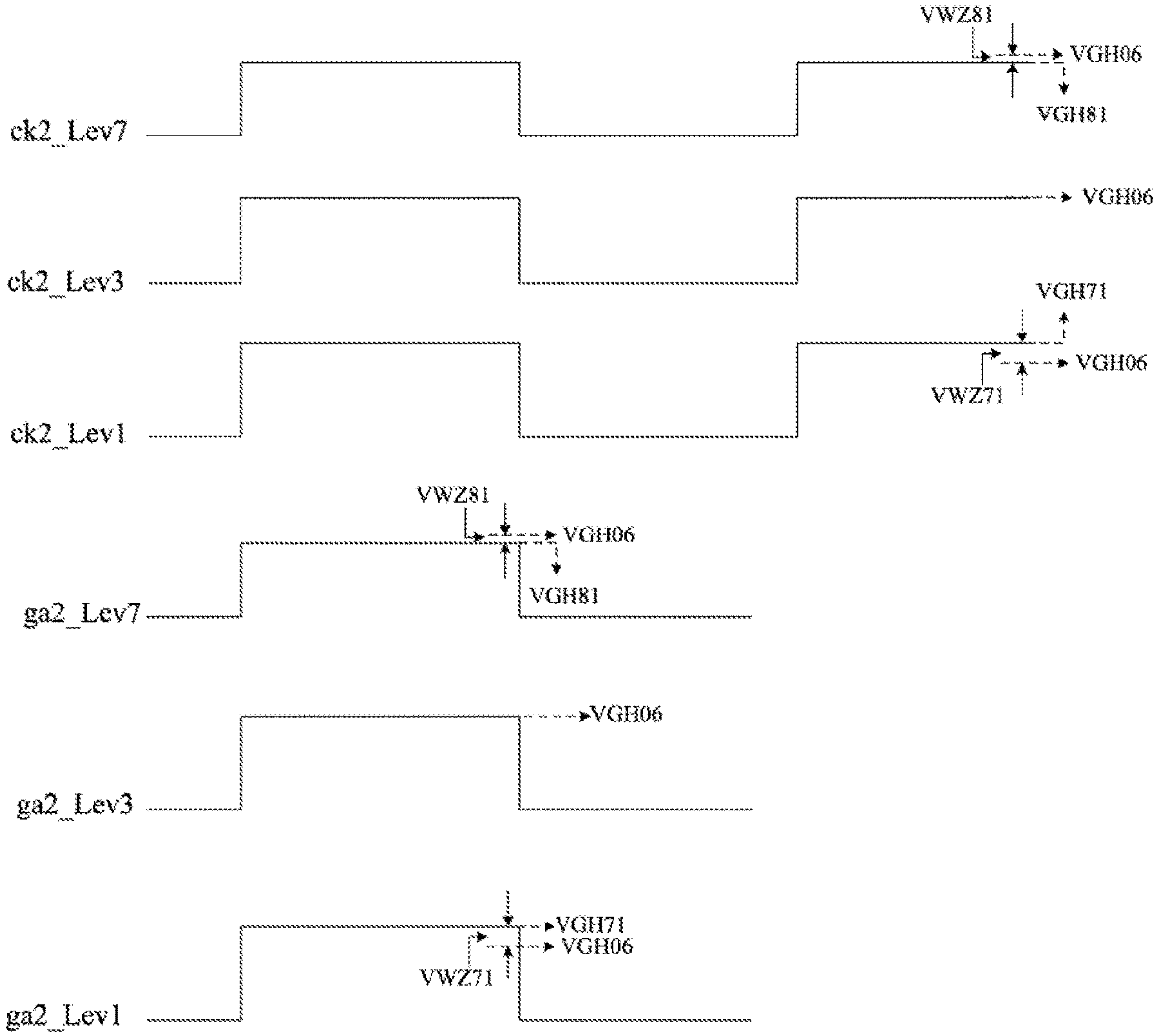
FIG. 31 is a signal timing diagram according to some other embodiments of the present disclosure.

Illustratively, the second reference voltage is a second reference voltage corresponding to the set rate level. The inactive level may also be a high level. That is, the first voltage reference VREF1 is adjusted to be the target voltage, the high level of the clock signal output by the level shift circuit 2432 is the target voltage, and thus the voltage of the high level of the gate drive signal is the target voltage. The step of adjusting a second reference voltage of the inactive level that generates the gate scanning signal according to the target rate level, to obtain the target voltage of the inactive level includes: when the set rate level is greater than the minimum rate level and less than the maximum rate level and the target rate level is less than the set rate level, increase the second reference voltage by a seventh inactive adjustment voltage, to obtain the target voltage of the inactive level; and when the set rate level is greater than the minimum rate level and less than the maximum rate level and the target rate level is greater than the set rate level, reduce the second reference voltage by an eighth inactive adjustment voltage, to obtain the target voltage of the inactive level. As the rate level increases, the corresponding eighth inactive adjustment voltage increases, and the corresponding seventh inactive adjustment voltage decreases. Illustratively, in conjunction with FIG. 31, with the clock signal ck2 as an example, ck2_Lev1 represents a signal when the clock signal ck2 corresponds to the rate level Lev1, ck2_Lev3 represents a signal when the clock signal ck2 corresponds to the rate level Lev3, and ck2_Lev7 represents a clock signal when the clock signal ck2 corresponds to the rate level Lev7. ga2_Lev1 represents a gate scanning signal transmitted when the gate line GA2 corresponds to the rate level Lev1, ga2_Lev3 represents a gate scanning signal transmitted when the gate line GA2 corresponds to the rate level Lev3, and ga2_Lev7 represents a gate scanning signal transmitted when the gate line GA2 corresponds to the rate level Lev7. The set rate level may be the rate level Lev3 (alternatively, other rate levels may be used as the set rate level, which is not limited herein), the second reference voltage is a first voltage reference VREF1 of a high level that corresponds to the rate level Lev3 and generates the clock signal cks2_Lev3, that is, a voltage VGH06 (the voltage VGH06 is the above target voltage VGHW3). When the target rate level is the rate level Lev3, the second reference voltage (that is, the voltage VGH06) needs no adjustment, and the second reference voltage (that is, the voltage VGH06) may directly serve as a target voltage corresponding to the rate level Lev3, to output the clock signal ck2_Lev3, such that the voltage of the high level of the signal ga2_Lev3 may be VGH06. When the target rate level is the rate level Lev7, the second reference voltage (that is, the voltage VGH06) is reduced by the eighth inactive adjustment voltage VWZ81, then a target voltage VGH81 corresponding to the rate level Lev7 is obtained (the target voltage VGH81 is the above target voltage VGHW7), and the clock signal ck2_Lev7 is output, such that the voltage of the high level of the signal ga2_Lev7 may be VGH81, that is, the voltage is reduced by VWZ81 based on VGH06. When the target rate level is the rate level Lev1, the second reference voltage (that is, the voltage VGH06) is increased by the seventh inactive adjustment voltage VWZ71, then a target voltage VGH71 corresponding to the rate level Lev1 is obtained (the target voltage VGH71 is the above target voltage VGHW1), and the clock signal ck2_Lev1 is output, such that the voltage of the high level of the signal ga2_Lev1 may be VGH71, that is, the voltage is increased by VWZ71 based on VGH06.

It is to be noted that the first inactive adjustment voltage to the eighth inactive adjustment voltage are all voltage values, and do not carry a sign. That is, the first inactive adjustment voltage to the eighth inactive adjustment voltage may be equivalent to absolute values of voltages.

Embodiments of the present disclosure provide still some other drive methods for a display panel, which are variations of the implementation modes of the embodiments above. Herein, only the differences between any other embodiment and the above embodiments will be described, and the same portion will not be repeated herein.

Figure 32:
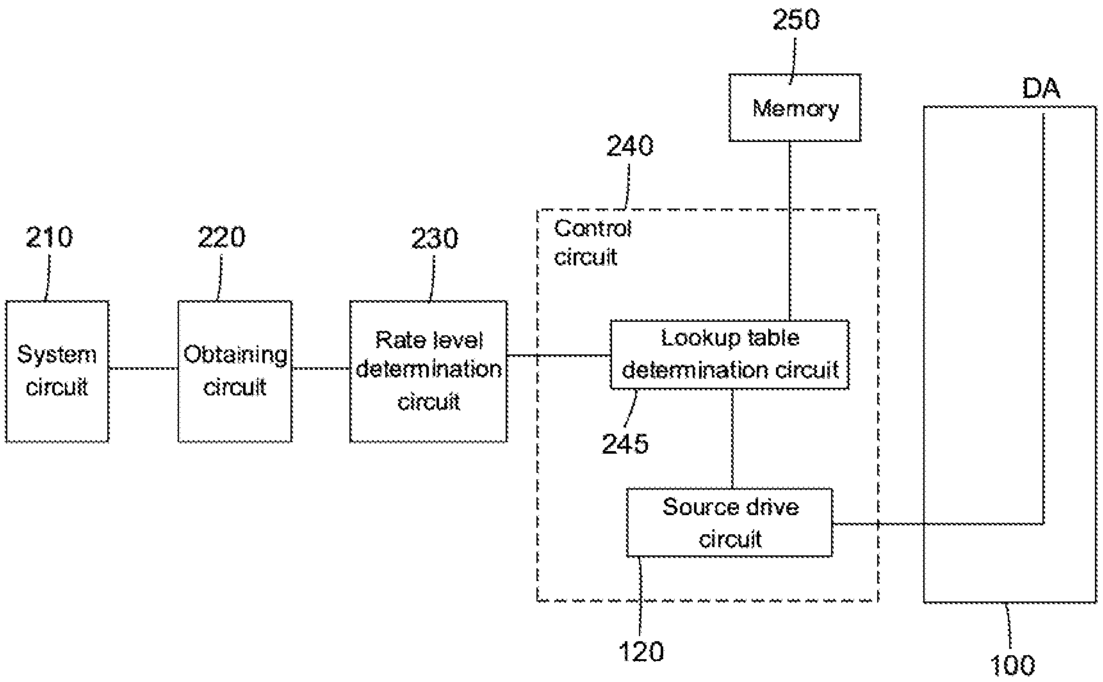
FIG. 32 is a schematic structure diagram of a drive device according to some embodiments of the present disclosure.

In some embodiments of the present disclosure, as shown in FIG. 32, the control circuit may include a lookup table determination circuit 245 and a source drive circuit 120. The lookup table determination circuit 245 is configured to determine, according to the target rate level, a target gray scale lookup table corresponding to the target rate level from prestored gray scale lookup tables corresponding one-to-one to a plurality of different rate levels. The source drive circuit 120 is configured to load the data voltage onto the data line according to the target gray scale lookup table and the display data so as to charge the sub-pixels in the display panel 100 with the data voltage. Each gray scale lookup table includes: a plurality of different first gray scale values, a plurality of different second gray scale values, and target gray scale values corresponding to any one of the first gray scale values and any one of the second gray scale values. As for target gray scale values corresponding to the same first gray scale value and the same second gray scale value in different gray scale lookup tables, the target gray scale values corresponding to different rate levels are different.

Illustratively, the drive device may further include a memory. Gray scale lookup tables corresponding one-to-one to rate levels are prestored in the memory 250. Illustratively, the memory 250 prestores a gray scale lookup table LUT1 corresponding to the rate level Lev1, a gray scale lookup table LUT2 corresponding to the rate level Lev2, a gray scale lookup table LUT3 corresponding to the rate level Lev3, a gray scale lookup table LUT4 corresponding to the rate level Lev4, a gray scale lookup table LUT5 corresponding to the rate level Lev5, a gray scale lookup table LUT6 corresponding to the rate level Lev6, and a gray scale lookup table LUT7 corresponding to the rate level Lev7. As for target gray scale values corresponding to the same first gray scale value and the same second gray scale value in the gray scale lookup tables LUT1-LUT7, these target gray scale values are different from each other. The memory 250 may include: at least one of an electrically erasable programmable read only memory 250 (EEPROM) and a flash memory.

Illustratively, the lookup table determination circuit 245 is configured to call, according to the target rate level, a target gray scale lookup table corresponding to the target rate level from gray scale lookup tables prestored in the memory 250 and corresponding one-to-one to a plurality of different rate levels. Illustratively, under the condition that the target rate level is the rate level Lev1, the lookup table determination circuit 245 calls the gray scale lookup table LUT1 from the memory 250 as the target gray scale lookup table. Illustratively, under the condition that the target rate level is the rate level Lev3, the lookup table determination circuit 245 calls the gray scale lookup table LUT3 from the memory 250 as the target gray scale lookup table. Illustratively, under the condition that the target rate level is the rate level Lev7, the lookup table determination circuit 245 calls the gray scale lookup table LUT7 from the memory 250 as the target gray scale lookup table.

In some embodiments of the present disclosure, step S30 of controlling sub-pixels in the display panel 100 to be charged with a data voltage according to the target rate level and the display data may include: according to the target rate level, determine a target gray scale lookup table corresponding to the target rate level from prestored gray scale lookup tables corresponding one-to-one to a plurality of different rate levels; and load the data voltage onto the data line according to the target gray scale lookup table and the display data, so as to charge the sub-pixels in the display panel 100 with the data voltage. Each gray scale lookup table includes: a plurality of different first gray scale values, a plurality of different second gray scale values, and target gray scale values corresponding to any one of the first gray scale values and any one of the second gray scale values. As for target gray scale values corresponding to the same first gray scale value and the same second gray scale value in different gray scale lookup tables, the target gray scale values corresponding to different rate levels are different. In this way, sub-pixels under different refresh rates may be charged according to different gray scale lookup tables to drive the display panel under different refresh rates, such that a charge rate difference of the sub-pixels in the display frames with different refresh rates is reduced as much as possible, and the problem of poor display of the display panel is alleviated.

Illustratively, as for the target gray scale values corresponding to the same first gray scale value and the same second gray scale value in different gray scale lookup tables, as the rate level increases, the corresponding target gray scale value decreases.

Illustratively, as for the target gray scale values corresponding to the same first gray scale value and the same second gray scale value in different gray scale lookup tables, an absolute value of a difference between target gray scale values corresponding to each two adjacent rate levels is the same.

Illustratively, as for the target gray scale values corresponding to the same first gray scale value and the same second gray scale value in different gray scale lookup tables, the absolute value of the difference between the target gray scale values corresponding to each two adjacent rate levels is sequentially reduced or increased.

Illustratively, each gray scale lookup table may include: a plurality of different first gray scale values, a plurality of different second gray scale values, and target gray scale values corresponding to any one of the first gray scale values and any one of the second gray scale values. Illustratively, the gray scale lookup table has a corresponding number of gray scale bits, that is, the first gray scale value, the second gray scale value, and the target gray scale value in the gray scale lookup table each have a corresponding number of gray scale bits. For example, under the condition that the number of gray scale bits corresponding to the gray scale lookup table is 8 bits, the number of gray scale bits corresponding to the first gray scale value, the second gray scale value and the target gray scale value may be 8 bits. For example, the first gray scale value in the gray scale lookup table may be all the gray scale values from 0 to 255 in 8 bits, and the second gray scale value may be all the gray scale values from 0 to 255 in 8 bits. Alternatively, the first gray scale value in the gray scale lookup table may be some of gray scale values from 0 to 255 in the 8 bits, and the second gray scale value may be some of gray scale values from 0 to 255 in 8 bits.

Illustratively, the gray scale lookup tables may be arranged in a 9*9 form, a 19*19 form, a 30*30 form, or other forms. When each gray scale lookup table is set in the 9*9 form, 9 first gray scale values and 9 second gray scale values may be set separately. When each gray scale lookup table is set in the 19*19 form, 19 first gray scale values and 19 second gray scale values may be set separately. When each gray scale lookup table is set in the 30*30 form, 30 first gray scale values and 30 second gray scale values may be set separately.

Illustratively, as for the target gray scale values corresponding to the same first gray scale value and the same second gray scale value in different gray scale lookup tables, as the rate level increases, the corresponding target gray scale value decreases. For example, with the gray scale lookup tables LUT1, LUT3, and LUT7 as an example, the gray scale lookup tables LUT1, LUT3, and LUT7 may include some first gray scale values and some second gray scale values in 8 bits, and target gray scale values corresponding to these first gray scale values and second gray scale values. FIG. 33 shows the gray scale lookup table LUT1, FIG. 34 shows the gray scale lookup table LUT3, and FIG. 35 shows the grays scale lookup table LUT7. Values (for example, 0, 16, 32, 48, 64, 80, 96, 112, 128, 144, 160, 176, 192, 208, 224, 240, 255) in a first row of FIGS. 33-35 represent first gray scale values, values (for example, 0, 16, 32, 48, 64, 80, 96, 112, 128, 144, 160, 176, 192, 208, 224, 240, 255) in a first column represent second gray scale values, and remaining values (for example, L1-1 to L17-17 in FIG. 33, Z1-1 to Z17-17 in FIG. 34, H1-1 to H17-17 in FIG. 35) represent target gray scale values. When the first gray scale value is 0 and the second gray scale value is 32, the target gray scale value in FIG. 33 is L3-1, the target gray scale value in FIG. 34 is Z3-1, and the target gray scale value in FIG. 35 is H3-1. Moreover, L3-1>Z3-1>H3-1. The same applies hereinafter and will not be repeated herein.

It is to be noted that the particular numerical values of the first gray scale value and the second gray scale value illustrated in FIGS. 33 to 35 are merely examples. In practical applications, it may be determined according to requirements of the practical applications, which is not limited herein.

In some examples, the step of loading the data voltage onto the data line according to the target gray scale lookup table and the display data includes: determine a target gray scale value corresponding to a current row of sub-pixels from the target gray scale lookup table according to an original gray scale value of display data corresponding to a previous row of sub-pixels and an original gray scale value of display data corresponding to the current row of sub-pixels in the same column in the display data; and load the data voltage onto the data line according to the determined target gray scale value. The target gray scale value corresponding to the current row of sub-pixels is greater than the original gray scale value corresponding to the current row of sub-pixels. Illustratively, the numerical value in the first row of the gray scale lookup table may correspond to the original gray scale value of the display data corresponding to the previous row of sub-pixels, and the numerical value in the first column of the gray scale lookup table may correspond to the original gray scale value of the display data corresponding to the current row of sub-pixels, such that a corresponding target gray scale value may be found, so as to load a data voltage onto the data line according to the found target gray scale value.

Illustratively, in conjunction with FIG. 33, under the condition that the target rate level is the rate level Lev1, the lookup table determination circuit 245 calls the gray scale lookup table LUT1 from the memory 250 as the target gray scale lookup table, and sends the called target gray scale lookup table to the source drive circuit 120. According to the received display data, under the condition that a red sub-pixel R21 is the current row of sub-pixel, an original gray scale value corresponding to the red sub-pixel R11 is 0, and an original gray scale value corresponding to a red sub-pixel R21 is 32, and then the source drive circuit 120 determines from the gray scale lookup table LUT1 that a target gray scale value corresponding to the red sub-pixel R21 is L3-1, and loads a data voltage onto the data line DA1 according to the target gray scale value L3-1, such that a data voltage corresponding to the target gray scale value L3-1 is input into the red sub-pixel R21. The same applies hereinafter and will not be repeated herein.

Illustratively, in conjunction with FIG. 34, under the condition that the target rate level is the rate level Lev3, the lookup table determination circuit 245 calls the gray scale lookup table LUT3 from the memory 250 as the target gray scale lookup table, and sends the called target gray scale lookup table to the source drive circuit 120. According to the received display data, under the condition that a red sub-pixel R21 is the current row of sub-pixel, an original gray scale value corresponding to the red sub-pixel R11 is 0, and an original gray scale value corresponding to a red sub-pixel R21 is 32, and then the source drive circuit 120 determines from the gray scale lookup table LUT3 that a target gray scale value corresponding to the red sub-pixel R21 is Z3-1, and loads a data voltage onto the data line DA1 according to the target gray scale value Z3-1, such that a data voltage corresponding to the target gray scale value Z3-1 is input into the red sub-pixel R21. The same applies hereinafter and will not be repeated herein.

Illustratively, in conjunction with FIG. 36, under the condition that the target rate level is the rate level Lev7, the lookup table determination circuit 245 calls the gray scale lookup table LUT7 from the memory 250 as the target gray scale lookup table, and sends the called target gray scale lookup table to the source drive circuit 120. According to the received display data, under the condition that a red sub-pixel R21 is the current row of sub-pixels, an original gray scale value corresponding to the red sub-pixel R11 is 0, and an original gray scale value corresponding to a red sub-pixel R21 is 32, and then the source drive circuit 120 determines from the gray scale lookup table LUT7 that a target gray scale value corresponding to the red sub-pixel R21 is H3-1, and loads a data voltage onto the data line DA1 according to the target gray scale value H3-1, such that a data voltage corresponding to the target gray scale value H3-1 is input into the red sub-pixel R21. The same applies hereinafter and will not be repeated herein.

It is to be noted that the embodiments in the present disclosure can be combined with each other. That is, the step of determining a target voltage of a target level that generates a gate scanning signal according to the target rate level, controlling the display panel to load the gate scanning signal onto a gate according to the target voltage, and loading the data voltage onto a data line according to the display data, so as to charge the sub-pixels in the display panel with the data voltage, the step of controlling the display panel to load the gate scanning signal onto the gate according to the target rate level and the display data, and loading the data voltage onto the data line in the display panel such that a time interval between an end moment of a slew edge when the data line starts to load the data voltage and a start moment of a data charging phase corresponding to the sub-pixels charged with the data voltage is a time interval corresponding to the target rate level, and the step of determining, according to the target rate level, a target gray scale lookup table corresponding to the target rate level from prestored gray scale lookup tables corresponding one-to-one to a plurality of different rate levels, where each gray scale lookup table includes: a plurality of different first gray scale values, a plurality of different second gray scale values, and target gray scale values corresponding to any one of the first gray scale values and any one of the second gray scale values, and loading the data voltage onto the data line according to the target gray scale lookup table and the display data so as to charge the sub-pixels in the display panel with the data voltage, may be combined randomly, which is not specifically repeated herein.

Those skilled in the art will appreciate that embodiments of the present disclosure can be provided as a method, system, or computer program product. Thus, the present disclosure can take the form of an entire hardware embodiment, an entire software embodiment or an embodiment combining software and hardware aspects. Furthermore, the present disclosure can take the form of a computer program product implemented on one or more computer-available storage media (including but not limited to a magnetic disk memory, a compact disc read-only memory (CD-ROM) an optical memory, etc.) encompassing computer-available program codes.

The present disclosure is described with reference to flowcharts and/or block diagrams of a method, an apparatus (system), and a computer program product according to the embodiments of the present disclosure. It will be understood that each flow and/or block of the flowcharts and/or block diagrams, and combinations of flows and/or blocks in the flowcharts and/or block diagrams can be implemented by computer program instructions. These computer program instructions can be provided for a processor of a general purpose computer, a special purpose computer, an embedded processor, or other programmable data processing devices to generate a machine, such that the instructions, which are executed by the processor of the computer or other programmable data processing devices, can generate apparatuses for implementing functions specified in one or more flows in the flowcharts and/or one or more blocks in the block diagrams.

These computer program instructions can also be stored in a computer-readable memory that can direct the computers or other programmable data processing devices to work in a particular manner, such that the instructions stored in the computer-readable memory generate an article of manufacture including an instruction apparatus that implements the functions specified in one or more flows in the flowcharts and/or one or more blocks in the block diagrams.

These computer program instructions can also be loaded onto the computers or other programmable data processing devices to execute a series of operational steps on the computers or other programmable devices so as to generate a process implemented by the computers, such that the instructions that are executed by the computers or other programmable devices provide steps for implementing the functions specified in one or more flows in the flowcharts and/or one or more blocks in the block diagrams.

While the preferred embodiments of the present disclosure have been described, additional alterations and modifications to those embodiments may be made by those skilled in the art once the basic inventive concept is apparent to those skilled in the art. Thus, it is intended that the appended claims is to be interpreted to include the preferred embodiments and all alterations and modifications that fall within the scope of the present disclosure.

It will be apparent to those skilled in the art that various modifications and variations can be made to the embodiments of the present disclosure without departing from the spirit and scope of the embodiments of the present disclosure. Thus, if modifications and variations to the embodiments of the present disclosure fall within the scope of the appended claims of the present disclosure and their equivalents, it is intended that the present disclosure encompass such modifications and variations as well.

What is claimed is:

1. A drive method for a display panel, comprising:
- obtaining display data corresponding to a current display frame, and a current refresh rate;
- determining a target rate level corresponding to the current refresh rate according to the current refresh rate and prestored rate levels corresponding one-to-one to different refresh rate intervals; and
- controlling sub-pixels in the display panel to be charged with a data voltage according to the target rate level and the display data;
- wherein the controlling of the sub-pixels in the display panel to be charged with the data voltage according to the target rate level and the display data comprises:
  - determining, according to the target rate level, a target voltage of a target level that generates a gate scanning signal, wherein target voltages, generating the gate scanning signal, corresponding to different rate levels are different; and
  - controlling the display panel to load the gate scanning signal onto a gate according to the target voltage, and loading the data voltage onto a data line according to the display data, so as to charge the sub-pixels in the display panel with the data voltage;
  - wherein the target level comprises an active level;
  - the determining, according to the target rate level, of the target voltage that generates the gate scanning signal comprises:
    - adjusting, according to the target rate level, a first reference voltage of the active level that generates the gate scanning signal, to obtain the target voltage of the active level, wherein the target voltages of the active levels corresponding to different rate levels are different; and the controlling of the display panel to load the gate scanning signal onto the gate according to the target voltage comprises:

controlling the display panel to load the gate scanning signal onto the gate according to the obtained target voltage of the active level.

2. The drive method for the display panel according to claim 1, wherein the first reference voltage is a first reference voltage corresponding to a set rate level; the active level is a high level; and the adjusting, according to the target rate level, of the first reference voltage of the active level that generates the gate scanning signal, to obtain the target voltage of the active level comprises:

when the set rate level is a minimum rate level and the target rate level is greater than the minimum rate level, reducing the first reference voltage by a first active adjustment voltage, to obtain the target voltage of the active level, wherein as the rate level increases, the corresponding first active adjustment voltage increases;

when the set rate level is a maximum rate level and the target rate level is less than the maximum rate level, increasing the first reference voltage by a second active adjustment voltage, to obtain the target voltage of the active level, wherein as the rate level increases, the corresponding second active adjustment voltage decreases;

when the set rate level is greater than the minimum rate level and less than the maximum rate level and the target rate level is less than the set rate level, increasing the first reference voltage by a third active adjustment voltage, to obtain the target voltage of the active level, wherein as the rate level increases, the corresponding third active adjustment voltage decreases; and when the set rate level is greater than the minimum rate level and less than the maximum rate level and the target rate level is greater than the set rate level, reducing the first reference voltage by a fourth active adjustment voltage, to obtain the target voltage of the active level, wherein as the rate level increases, the corresponding fourth active adjustment voltage increases.

3. The drive method for the display panel according to claim 1, wherein the first reference voltage is a first reference voltage corresponding to a set rate level; the active level is a low level; and the adjusting, according to the target rate level, of the first reference voltage of the active level that generates the gate scanning signal, to obtain the target voltage of the active level comprises:

when the set rate level is a minimum rate level and the target rate level is greater than the minimum rate level, increasing the first reference voltage by a fifth active adjustment voltage, to obtain the target voltage of the active level, wherein as the rate level increases, the corresponding fifth active adjustment voltage increases;

when the set rate level is a maximum rate level and the target rate level is less than the maximum rate level, reducing the first reference voltage by a sixth active adjustment voltage, to obtain the target voltage of the active level, wherein as the rate level increases, the corresponding sixth active adjustment voltage decreases;

when the set rate level is greater than the minimum rate level and less than the maximum rate level and the target rate level is less than the set rate level, reducing the first reference voltage by a seventh active adjustment voltage, to obtain the target voltage of the active level, wherein as the rate level increases, the corresponding seventh active adjustment voltage decreases; and when the set rate level is greater than the minimum rate level and less than the maximum rate level and the target rate level is greater than the set rate level, increasing the first reference voltage by an eighth active adjustment voltage, to obtain the target voltage of the active level, wherein as the rate level increases, the corresponding eighth active adjustment voltage increases.

4. The drive method for the display panel according to claim 1, wherein the controlling of the sub-pixels in the display panel to be charged with the data voltage according to the target rate level and the display data comprises:

controlling the display panel to load a gate scanning signal onto a gate and loading the data voltage onto a data line in the display panel according to the target rate level and the display data, such that a time interval between an end moment of a slew edge when the data line starts to load the data voltage and a start moment of a data charging phase corresponding to the sub-pixels charged with the data voltage is a time interval corresponding to the target rate level;

wherein as the refresh rate of the refresh rate interval increases, the corresponding rate level increases, and the corresponding time interval increases.

5. The drive method for the display panel according to claim 4, wherein the loading of the data voltage onto the data line in the display panel comprises:

loading the data voltage onto the data line in the display panel according to a slew rate of the slew edge corresponding to the target rate level, to adjust the time interval, wherein as the rate level increases, the corresponding slew rate decreases.

6. The drive method for the display panel according to claim 5, wherein the loading of the data voltage onto the data line in the display panel according to the slew rate of the slew edge corresponding to the target rate level comprises:

gating an output impedance corresponding to the target rate level according to the target rate level, to load the data voltage onto the data line after the data voltage passes through the output impedance, wherein as the rate level increases, the output impedance increases, and the corresponding slew rate decreases.

7. The drive method for the display panel according to claim 4, wherein a start moment of the slew edge when the data line starts to load the data voltage is after the start moment of the data charging phase corresponding to the sub-pixels charged with the data voltage, and a conversion time period is provided between the start moment of the slew edge when the data line starts to load the data voltage and the start moment of the data charging phase corresponding to the sub-pixels charged with the data voltage; and the controlling of the display panel to load the gate scanning signal onto the gate comprises:

controlling the display panel to load the gate scanning signal onto the gate according to the conversion time period corresponding to the target rate level, to adjust the time interval, wherein as the rate level increases, the corresponding conversion time period increases.

8. The drive method for the display panel according to claim 7, wherein the controlling of the display panel to load the gate scanning signal onto the gate according to the conversion time period corresponding to the target rate level comprises:

adjusting a first reference output time of a set level of a reference clock control signal according to the target rate level, to obtain a first target output time, wherein as the rate level increases, the corresponding first target output time is earlier; and outputting the set level of the reference clock control signal according to the first target output time, and controlling the display panel to load the gate scanning signal onto the gate.

9. The drive method for the display panel according to claim 8, wherein the first reference output time is an output time corresponding to a set rate level; and the adjusting of the output time of the set level of the reference clock control signal according to the target rate level, to obtain the first target output time comprises:

when the set rate level is a minimum rate level and the target rate level is greater than the minimum rate level, advancing the first reference output time by a first clock adjustment time period, to obtain the first target output time, wherein as the rate level increases, the corresponding first clock adjustment time period increases;

when the set rate level is a maximum rate level and the target rate level is less than the maximum rate level, delaying the first reference output time by a second clock adjustment time period, to obtain the first target output time, wherein as the rate level increases, the corresponding second clock adjustment time period decreases;

when the set rate level is greater than the minimum rate level and less than the maximum rate level and the target rate level is less than the set rate level, delaying the first reference output time by a third clock adjustment time period, to obtain the first target output time, wherein as the rate level increases, the corresponding third clock adjustment time period decreases; and when the set rate level is greater than the minimum rate level and less than the maximum rate level and the target rate level is greater than the set rate level, advancing the first reference output time by a fourth clock adjustment time period, to obtain the first target output time, wherein as the rate level increases, the corresponding fourth clock adjustment time period increases.

10. The drive method for the display panel according to claim 4, wherein the loading of the data voltage onto the data line comprises:

adjusting a second reference output time of the data voltage according to the target rate level, to obtain a second target output time, wherein the second target output times corresponding to different rate levels are different, and as the rate level increases, the corresponding second target output time is later; and loading the data voltage onto the data line according to the second target output time, to adjust the time interval.

11. The drive method for the display panel according to claim 10, wherein the second reference output time is an output time corresponding to a set rate level; and the adjusting of the second reference output time of the data voltage according to the target rate level, to obtain the second target output time comprises:

when the set rate level is a minimum rate level and the target rate level is greater than the minimum rate level, delaying the second reference output time by a first data adjustment time period, to obtain the second target output time, wherein as the rate level increases, the corresponding first data adjustment time period increases;

when the set rate level is a maximum rate level and the target rate level is less than the maximum rate level, advancing the second reference output time by a second data adjustment time period, to obtain the second target output time, wherein as the rate level increases, the corresponding second data adjustment time period decreases;

when the set rate level is greater than the minimum rate level and less than the maximum rate level and the target rate level is less than the set rate level, advancing the second reference output time by a third data adjustment time period, to obtain the second target output time, wherein as the rate level increases, the corresponding third data adjustment time period decreases; and when the set rate level is greater than the minimum rate level and less than the maximum rate level and the target rate level is greater than the set rate level, delaying the second reference output time by a fourth data adjustment time period, to obtain the second target output time, wherein as the rate level increases, the corresponding fourth data adjustment time period increases.

12. The drive method for the display panel according to claim 1, wherein the controlling of the sub-pixels in the display panel to be charged with the data voltage according to the target rate level and the display data comprises:

according to the target rate level, determining a target gray scale lookup table corresponding to the target rate level from prestored gray scale lookup tables corresponding one-to-one to a plurality of different rate levels, wherein the gray scale lookup table comprises: a plurality of different first gray scale values, a plurality of different second gray scale values, and target gray scale values corresponding to any one of the first gray scale values and any one of the second gray scale values, and as for target gray scale values corresponding to a same first gray scale value and a same second gray scale value in different gray scale lookup tables, the target gray scale values corresponding to different rate levels are different; and loading the data voltage onto the data line according to the target gray scale lookup table and the display data, so as to charge the sub-pixels in the display panel with the data voltage.

13. The drive method for the display panel according to claim 12, wherein the loading of the data voltage onto the data line according to the target gray scale lookup table and the display data comprises:

determining a target gray scale value corresponding to a sub-pixel in a current row and current column from the target gray scale lookup table according to an original gray scale value of display data corresponding to a sub-pixel in a previous row and the current column and an original gray scale value of display data corresponding to the sub-pixel in the current row and current column in the display data, wherein the target gray scale value corresponding to the sub-pixel in the current row and current column is greater than the original gray scale value corresponding to the sub-pixel in the current row and current column; and loading the data voltage onto the data line according to the determined target gray scale value.

14. The drive method for the display panel according to claim 13, wherein as for the target gray scale values corresponding to a same first gray scale value and a same second gray scale value in different gray scale lookup tables, as the rate level increases, the corresponding target gray scale value decreases.

15. A drive device for a display panel, comprising an obtaining circuit, a rate level determination circuit, and a control circuit configured to perform the drive method for the display panel according to claim 1.

16. A drive method for a display panel, comprising:

obtaining display data corresponding to a current display frame, and a current refresh rate;

determining a target rate level corresponding to the current refresh rate according to the current refresh rate and prestored rate levels corresponding one-to-one to different refresh rate intervals; and controlling sub-pixels in the display panel to be charged with a data voltage according to the target rate level and the display data;

wherein the controlling of the sub-pixels in the display panel to be charged with the data voltage according to the target rate level and the display data comprises:

determining, according to the target rate level, a target voltage of a target level that generates a gate scanning signal, wherein target voltages, generating the gate scanning signal, corresponding to different rate levels are different; and controlling the display panel to load the gate scanning signal onto a gate according to the target voltage, and loading the data voltage onto a data line according to the display data, so as to charge the sub-pixels in the display panel with the data voltage;

wherein the target level comprises an inactive level;

the determining, according to the target rate level, of the target voltage that generates the gate scanning signal comprises:

adjusting, according to the target rate level, a second reference voltage of the inactive level that generates the gate scanning signal, to obtain the target voltage of the inactive level, wherein the target voltages of the inactive levels corresponding to different rate levels are different; and the controlling of the display panel to load the gate scanning signal onto the gate according to the target voltage comprises:

controlling the display panel to load the gate scanning signal onto the gate according to the obtained target voltage of the inactive level.

17. The drive method for the display panel according to claim 16, wherein the second reference voltage is a second reference voltage corresponding to the set rate level; the inactive level is a low level; and the adjusting, according to the target rate level, of the second reference voltage of the inactive level that generates the gate scanning signal, to obtain the target voltage of the inactive level comprises:

when the set rate level is a minimum rate level and the target rate level is greater than the minimum rate level, increasing the second reference voltage by a first inactive adjustment voltage, to obtain the target voltage of the inactive level, wherein as the rate level increases, the corresponding first inactive adjustment voltage increases;

when the set rate level is a maximum rate level and the target rate level is less than the maximum rate level, reducing the second reference voltage by a second inactive adjustment voltage, to obtain the target voltage of the inactive level, wherein as the rate level increases, the corresponding second inactive adjustment voltage decreases;

when the set rate level is greater than the minimum rate level and less than the maximum rate level and the target rate level is less than the set rate level, reducing the second reference voltage by a third inactive adjustment voltage, to obtain the target voltage of the inactive level, wherein as the rate level increases, the corresponding third inactive adjustment voltage decreases; and when the set rate level is greater than the minimum rate level and less than the maximum rate level and the target rate level is greater than the set rate level, increasing the second reference voltage by a fourth inactive adjustment voltage, to obtain the target voltage of the inactive level, wherein as the rate level increases, the corresponding fourth inactive adjustment voltage increases.

18. The drive method for the display panel according to claim 16, wherein the second reference voltage is a second reference voltage corresponding to the set rate level; the inactive level is a high level; and the adjusting, according to the target rate level, of the second reference voltage of the inactive level that generates the gate scanning signal, to obtain the target voltage of the inactive level comprises:

when the set rate level is a minimum rate level and the target rate level is greater than the minimum rate level, reducing the second reference voltage by a fifth inactive adjustment voltage, to obtain the target voltage of the inactive level, wherein as the rate level increases, the corresponding fifth inactive adjustment voltage increases;

when the set rate level is a maximum rate level and the target rate level is less than the maximum rate level, increasing the second reference voltage by a sixth inactive adjustment voltage, to obtain the target voltage of the inactive level, wherein as the rate level increases, the corresponding sixth inactive adjustment voltage decreases;

when the set rate level is greater than the minimum rate level and less than the maximum rate level and the target rate level is less than the set rate level, increasing the second reference voltage by a seventh inactive adjustment voltage, to obtain the target voltage of the inactive level, wherein as the rate level increases, the corresponding seventh inactive adjustment voltage decreases; and when the set rate level is greater than the minimum rate level and less than the maximum rate level and the target rate level is greater than the set rate level, reducing the second reference voltage by an eighth inactive adjustment voltage, to obtain the target voltage of the inactive level, wherein as the rate level increases, the corresponding eighth inactive adjustment voltage increases.

19. The drive method for the display panel according to claim 16, wherein the controlling of the sub-pixels in the display panel to be charged with the data voltage according to the target rate level and the display data comprises:

controlling the display panel to load a gate scanning signal onto a gate and loading the data voltage onto a data line in the display panel according to the target rate level and the display data, such that a time interval between an end moment of a slew edge when the data line starts to load the data voltage and a start moment of a data charging phase corresponding to the sub-pixels charged with the data voltage is a time interval corresponding to the target rate level;

wherein as the refresh rate of the refresh rate interval increases, the corresponding rate level increases, and the corresponding time interval increases.

20. A drive method for a display panel, comprising:

obtaining display data corresponding to a current display frame, and a current refresh rate;

determining a target rate level corresponding to the current refresh rate according to the current refresh rate and prestored rate levels corresponding one-to-one to different refresh rate intervals; and controlling sub-pixels in the display panel to be charged with a data voltage according to the target rate level and the display data;

wherein the controlling of the sub-pixels in the display panel to be charged with the data voltage according to the target rate level and the display data comprises:

controlling the display panel to load a gate scanning signal onto a gate and loading the data voltage onto a data line in the display panel according to the target rate level and the display data, such that a time interval between an end moment of a slew edge when the data line starts to load the data voltage and a start moment of a data charging phase corresponding to the sub-pixels charged with the data voltage is a time interval corresponding to the target rate level;

wherein as the refresh rate of the refresh rate interval increases, the corresponding rate level increases, and the corresponding time interval increases.

* * * * *